US012202139B2

(12) United States Patent
Popp et al.

(10) Patent No.: US 12,202,139 B2
(45) Date of Patent: Jan. 21, 2025

(54) MATERIAL PROCESSING SYSTEM AND METHOD FOR UTILIZING THE SAME

(71) Applicant: Edw. C. Levy Co., Detroit, MI (US)

(72) Inventors: Alton Popp, Trenton, MI (US); Russell D. Burke, Flat Rock, MI (US); Kelly Adams, Tuscaloosa, AL (US); Sean Preston, Canton, MI (US); Katie Renaud, Royal Oak, MI (US)

(73) Assignee: Edw. C. Levy Co., Detroit, MI (US)

( * ) Notice: Subject to any disclaimer, the term of this patent is extended or adjusted under 35 U.S.C. 154(b) by 1070 days.

(21) Appl. No.: 17/125,625

(22) Filed: Dec. 17, 2020

(65) Prior Publication Data

US 2022/0193843 A1 Jun. 23, 2022

(51) Int. Cl.
| | | |
|---|---|---|
| B23Q 7/04 | (2006.01) | |
| B23Q 17/20 | (2006.01) | |
| B25J 5/00 | (2006.01) | |
| B25J 9/12 | (2006.01) | |
| B25J 15/00 | (2006.01) | |
| C21D 1/18 | (2006.01) | |
| C21D 1/60 | (2006.01) | |

(52) U.S. Cl.
CPC ............ B25J 9/126 (2013.01); B25J 5/007 (2013.01); B25J 15/0066 (2013.01); C21D 1/18 (2013.01); C21D 1/60 (2013.01)

(58) Field of Classification Search
CPC ........ B25J 9/126; B25J 5/007; B25J 15/0066; C21D 1/18; C21D 1/60; B23Q 7/048; B23Q 17/20
USPC ..................................... 266/44, 46, 161, 168
See application file for complete search history.

(56) References Cited

U.S. PATENT DOCUMENTS

| | | | | |
|---|---|---|---|---|
| 3,801,255 A | * | 4/1974 | Meyer .................... | B29C 33/36 |
| | | | | 425/453 |
| 4,299,269 A | * | 11/1981 | Friesen .................. | B22D 45/00 |
| | | | | 164/394 |
| 5,354,542 A | * | 10/1994 | Tanaka .................. | B01J 19/004 |
| | | | | 422/561 |
| 6,073,678 A | * | 6/2000 | Garza-Ondarza ...... | B22D 47/00 |
| | | | | 164/136 |

(Continued)

FOREIGN PATENT DOCUMENTS

JP        3171380        *   5/2001   .............   B22D 47/00

OTHER PUBLICATIONS

JP3171380, (Year: 2001).*

*Primary Examiner* — Jessee R Roe
*Assistant Examiner* — Michael Aboagye
(74) *Attorney, Agent, or Firm* — Honigman LLP

(57) ABSTRACT

A system includes a vehicle and at least one rail dividing a field into an unprocessed material field and a processed material field. The vehicle is supported upon at least one rail and (a) at least one primary material-containing bay configured for receiving the quantity of unprocessed material, and (b) a secondary material-containing bay configured for receiving a portion of one or more of a first portion of processed material and a partially processed material from the at least one primary material containing bay. The vehicle is configured for movement upon the at least one rail for transporting one or more of the first portion of processed material and a partially processed material from the at least one primary material containing bay to the secondary material containing bay.

15 Claims, 55 Drawing Sheets

(56) References Cited

U.S. PATENT DOCUMENTS 10,239,114 B2 * 3/2019 Puveendiran .......... B25J 9/0096

* cited by examiner

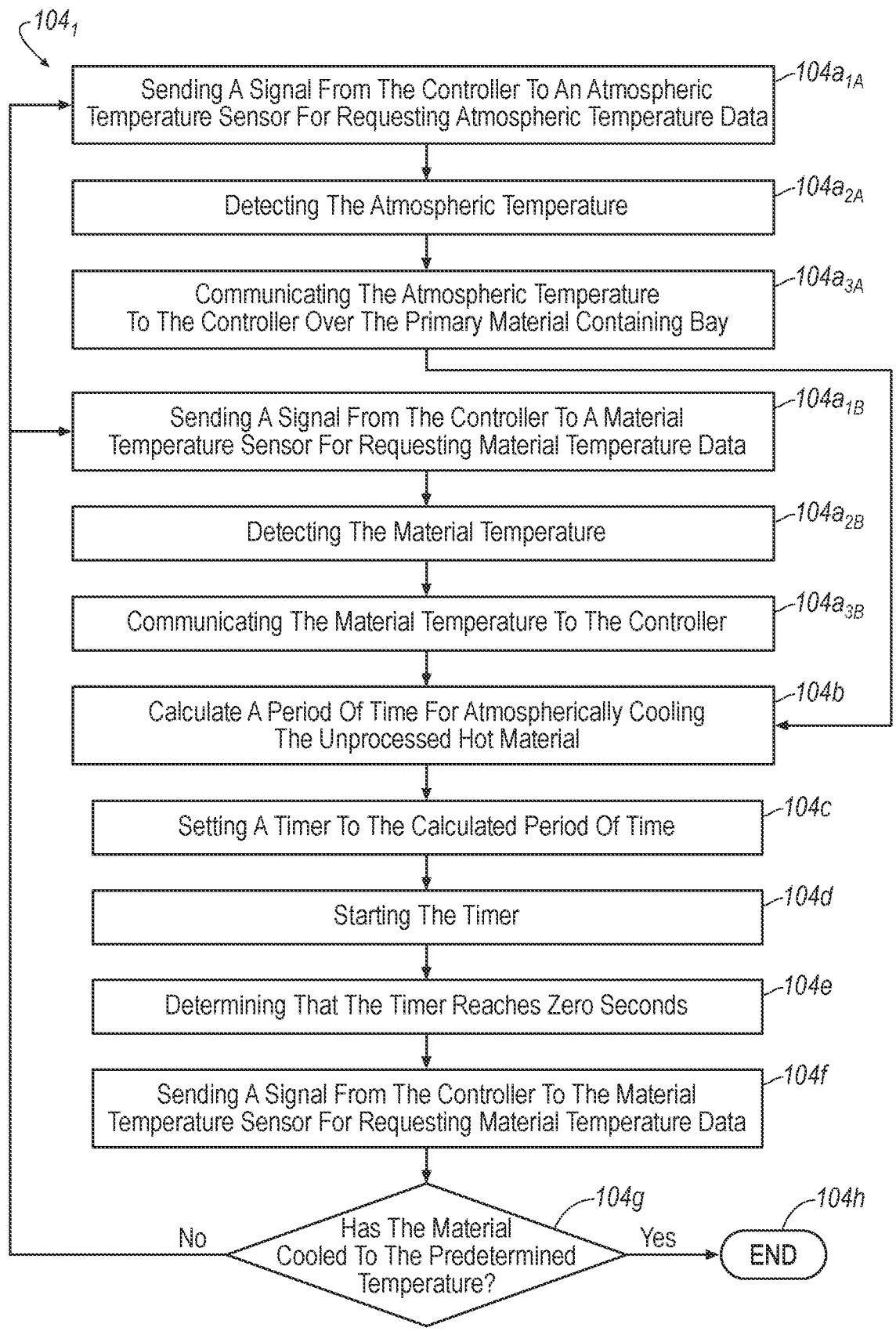
FIG. 5B₁

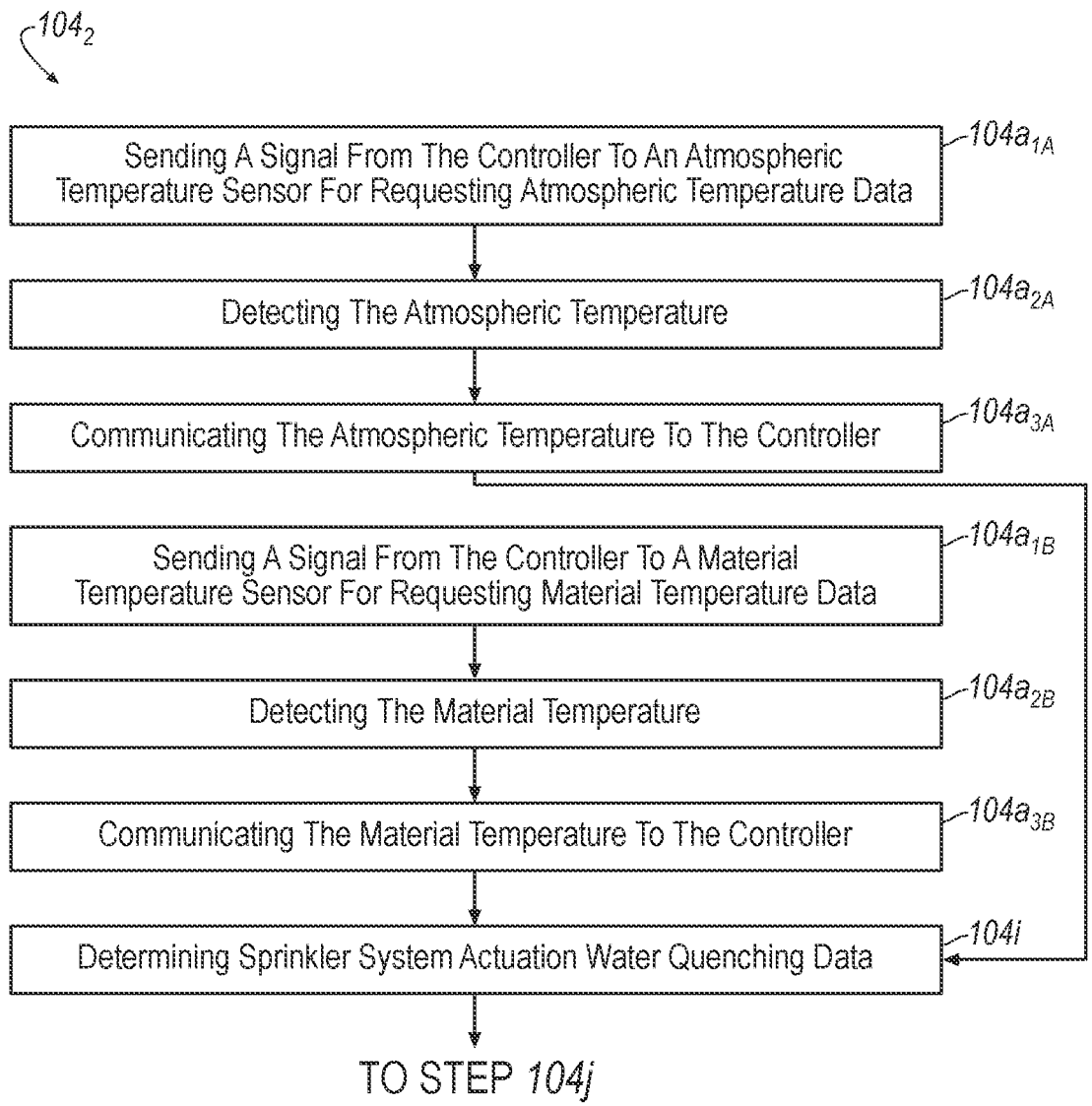
FIG. 5B$_2$

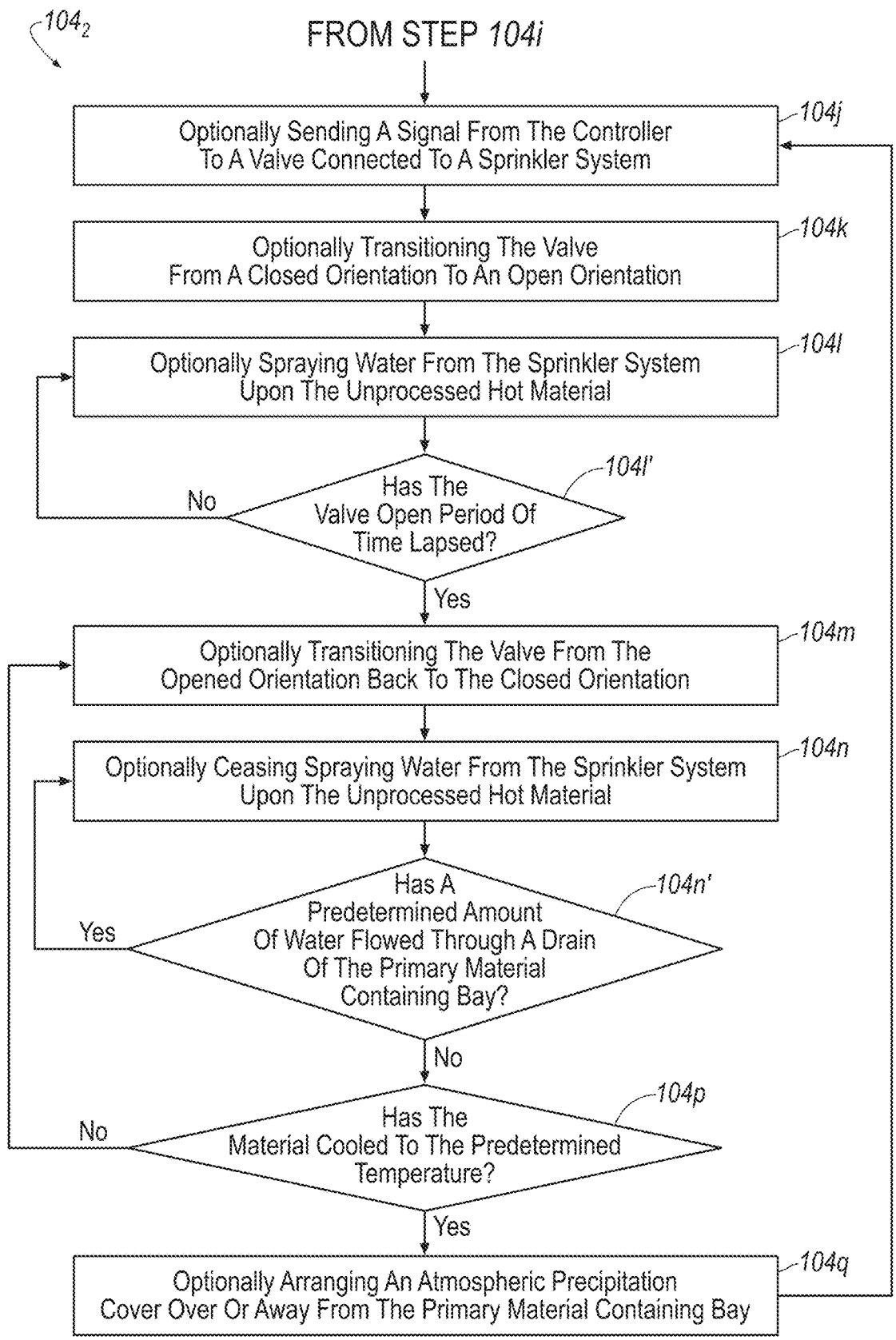
FIG. 5B₃

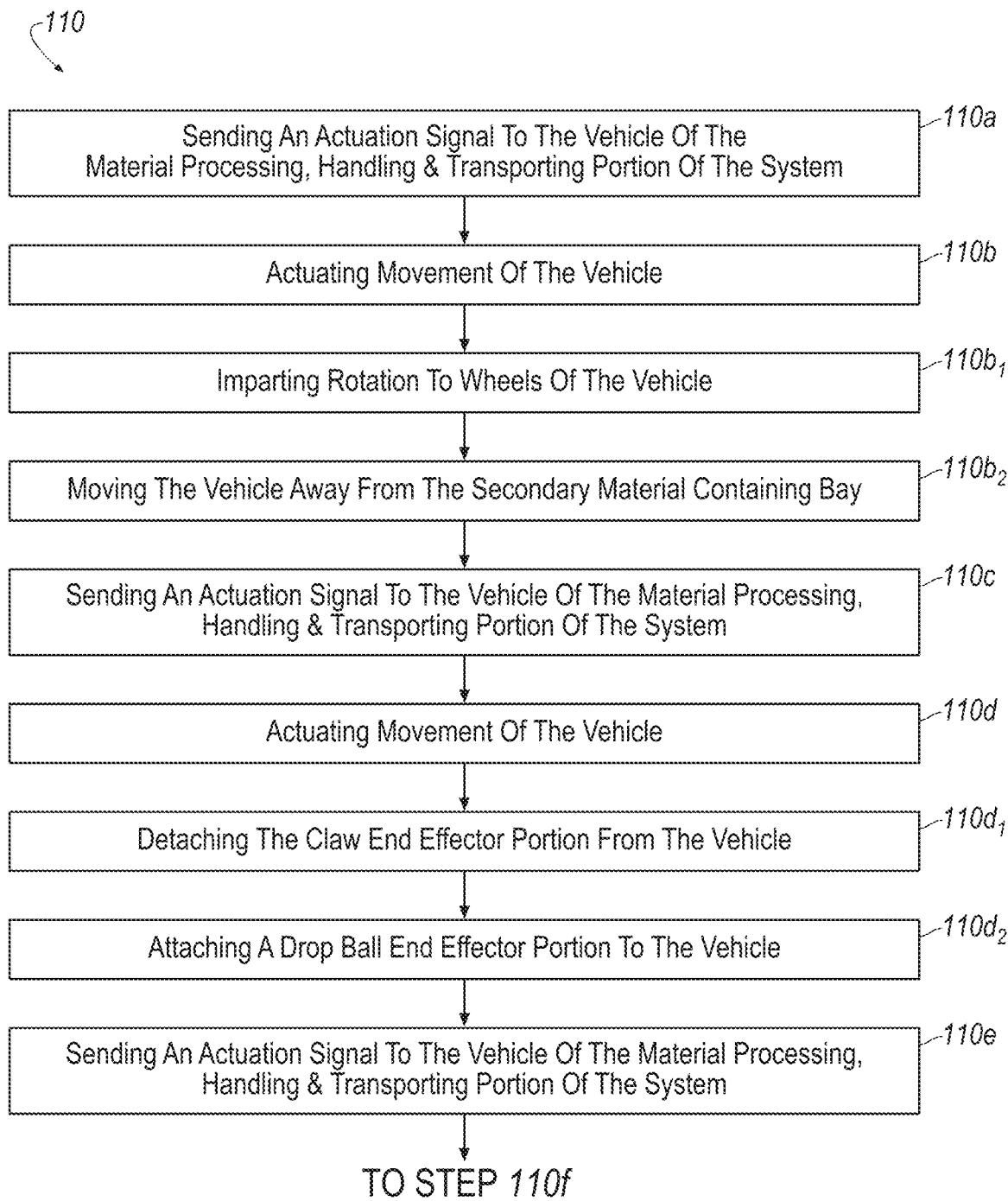
FIG. 5E₁

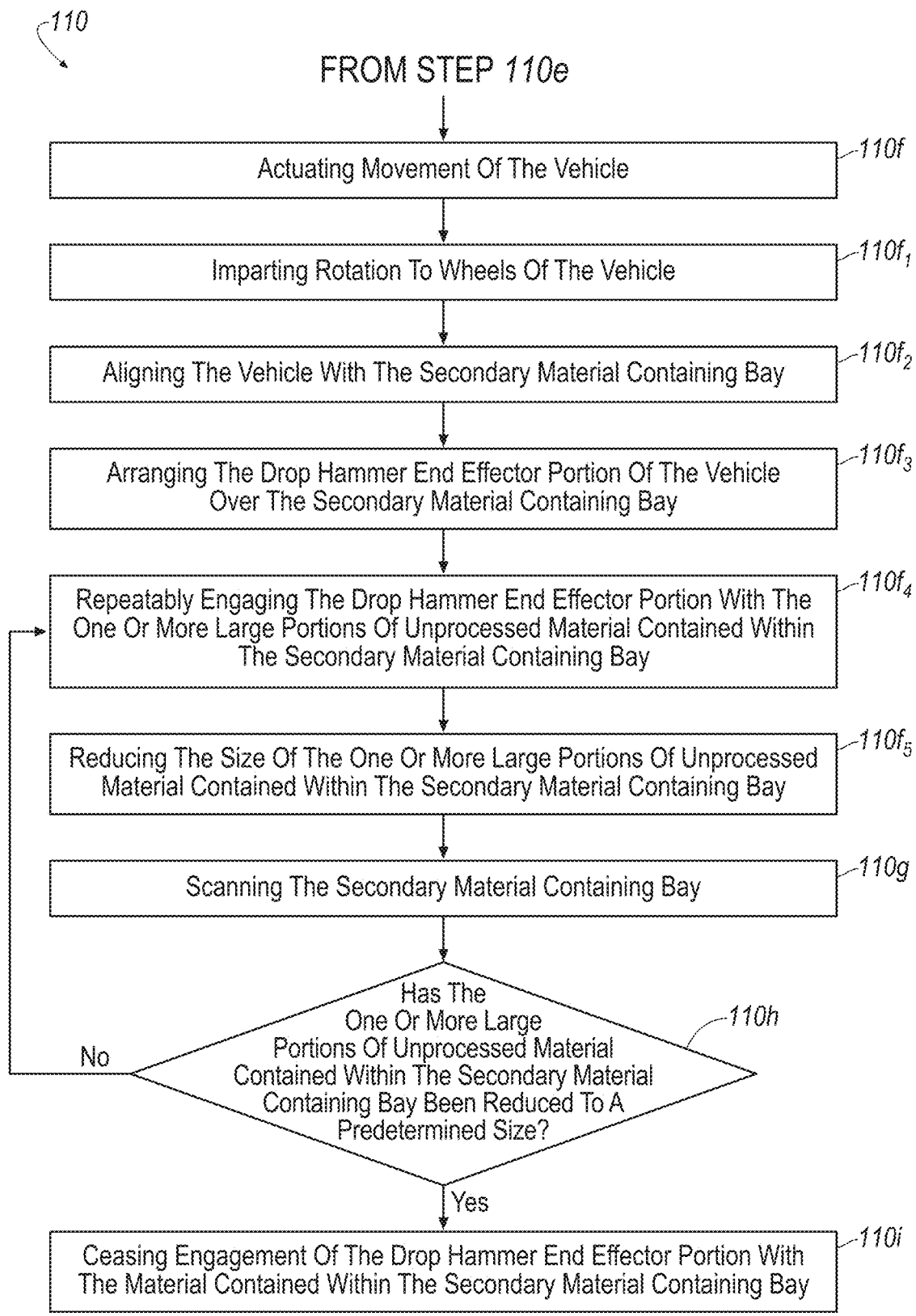
FIG. 5E₂

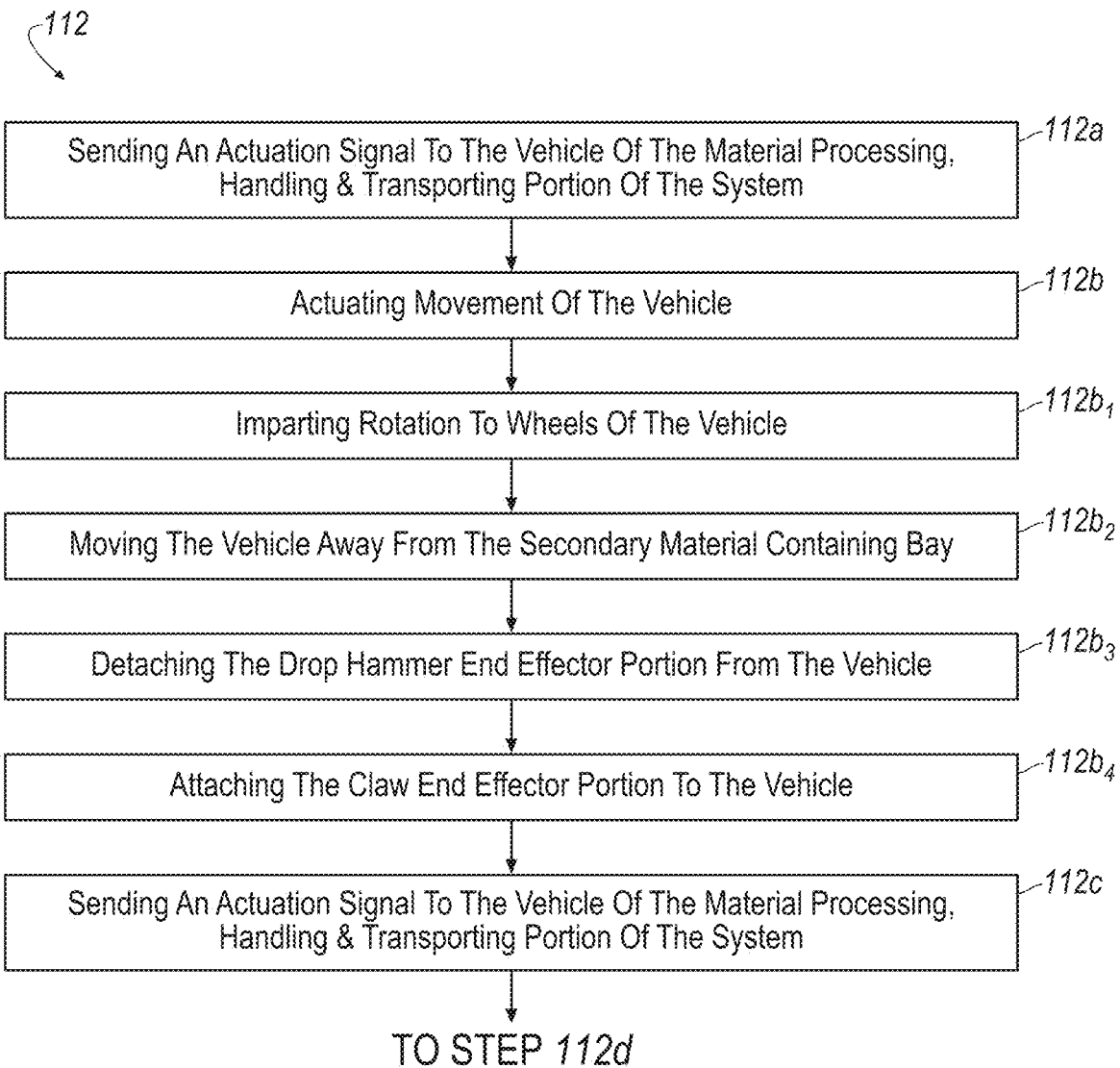
FIG. 5F₁

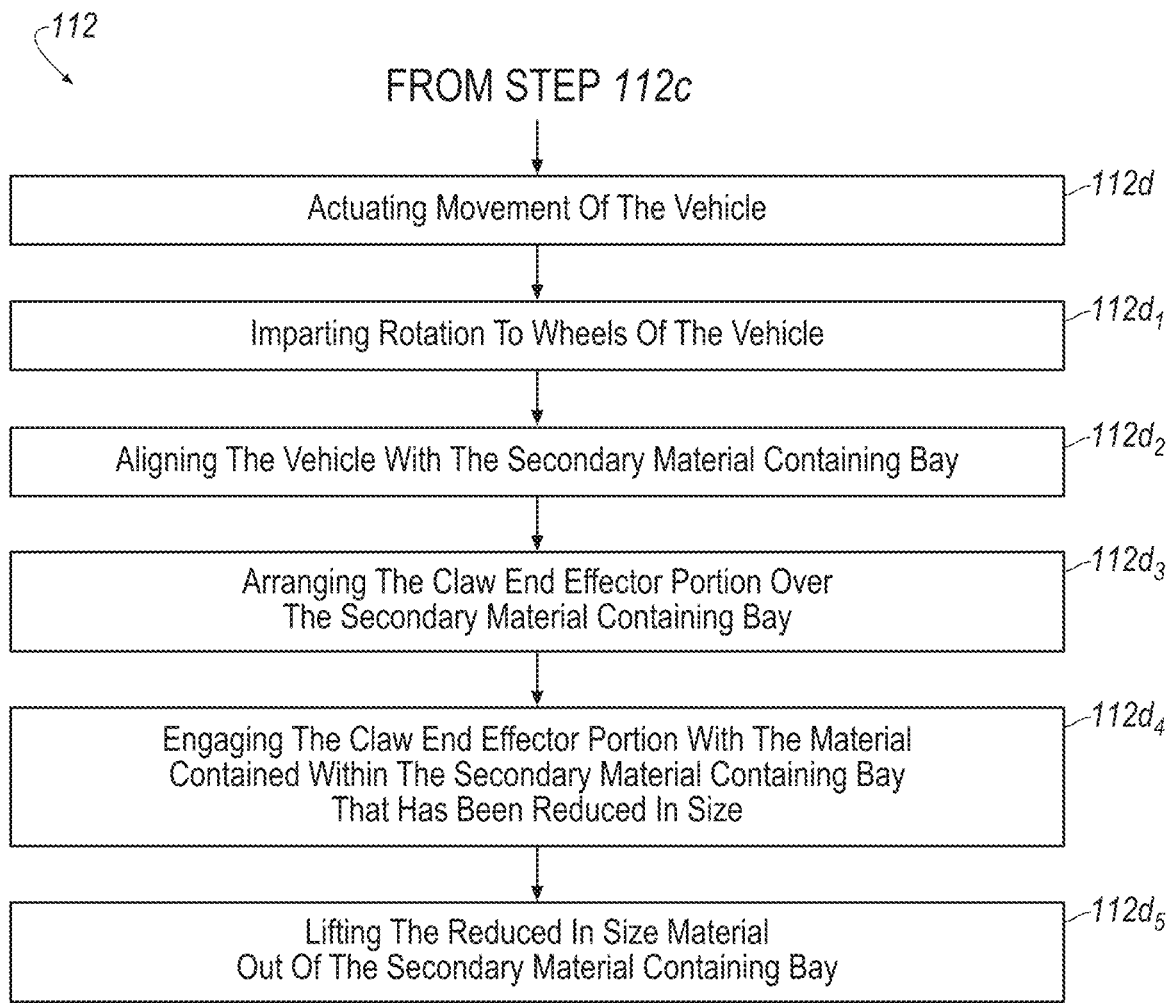
FIG. 5F$_2$

MATERIAL PROCESSING SYSTEM AND METHOD FOR UTILIZING THE SAME

TECHNICAL FIELD

The disclosure relates to a material processing system and a method for utilizing the same.

BACKGROUND

Material processing systems are known. While existing material processing systems perform adequately for their intended purpose, improvements to material processing systems are continuously being sought in order to advance the arts.

SUMMARY

This section provides a general summary of the disclosure, and is not a comprehensive disclosure of its full scope or all of its features.

One aspect of the disclosure provides a system arranged on a field that at least partially processes a quantity of unprocessed material. The system includes at least one rail, a vehicle, and at least two material containing bays. The at least one rail that divides the field into an unprocessed material field and a processed material field. The vehicle may be movably-supported upon the at least one rail. The at least two material containing bays are defined by at least one primary material containing bay and a secondary material containing bay. The at least one primary material containing bay may be configured for receiving the quantity of unprocessed material. The secondary material containing bay may be configured for receiving a portion of one or more of a first portion of processed material and a partially processed material from the at least one primary material containing bay. The vehicle may be configured for movement upon the at least one rail for: transporting the portion of partially processed material from the at least one primary material containing bay to the secondary material containing bay; depositing into and then processing the portion of partially processed material within the secondary material containing bay for defining a portion of processed material; and depositing one or more of the first portion of processed material and the portion of processed material into a material separating or evacuating station.

Implementations of the disclosure may include one or more of the following optional features. In some implementations, the at least two material containing bays at least partially define a material processing station of the system. In other implementations, the at least one rail and the vehicle at least partially define a material handling portion of the system. In yet other implementations, the system further includes a material staging station that may be configured for receiving one or more of the first portion of processed material and the portion of processed material after being processed by the material separating or evacuating station.

In some examples, the vehicle includes an arm portion extending from a body portion supported by one or more wheels arranged upon the at least one rail. The arm portion may be configured for removable attachment of at least two end effector portions of a plurality of end effector portions.

In some instances, the at least two end effector portions include two or more of a grapple end effector portion and a drop ball end effector portion. The grapple end effector portion may be configured for lifting, retaining, or releasing one or more of the first portion of processed material, the partially processed material, and the portion of processed material. The drop ball end effector portion may be configured for breaking or reducing a size of the portion of partially processed material within the secondary material containing bay for defining the portion of processed material.

In other implementations, the system further includes a sprinkler system. The sprinkler system us supported by or arranged near the at least one primary material containing bay. The sprinkler system may be configured for spraying water upon the quantity of unprocessed material for cooling the quantity of unprocessed material. In other implementations, the system may further include a water source pipe fluidly connected to the sprinkler system.

In other examples, the system may further include a controller communicatively coupled to the vehicle for controlling movement of the vehicle. In other examples, the system may also include at least one sensor communicatively-coupled to the controller. In some examples, the at least one sensor includes a material height sensor arranged at least near or supported by the at least one primary material containing bay that may be communicatively-coupled to the controller for detecting that the at least one primary material containing bay has been filled with a predetermined amount of the quantity of unprocessed material. In yet other examples, the at least one sensor includes a material classification locating sensor arranged at least near or supported by the at least one primary material containing bay that may be communicatively-coupled to the controller. In other examples, the at least one sensor includes a material classification locating sensor arranged at least near or supported by the secondary material containing bay that may be communicatively-coupled to the controller. In yet other examples, the at least one sensor includes an atmospheric temperature sensor arranged at least near or supported by the at least one primary material containing bay that may be communicatively-coupled to the controller. In further examples, the at least one sensor includes an atmospheric temperature sensor arranged at least near or supported by the at least one primary material containing bay that may be communicatively-coupled to the controller.

In some instances, the system further includes a valve arranged at least near or supported by the at least one primary material containing bay that may be communicatively-coupled to the controller. The valve may be connected to a sprinkler system supported by or arranged near the at least one primary material containing bay. The controller may be configured to open of close the valve for spraying water upon the quantity of unprocessed material. In other instances, the vehicle may include an electric motor that may be communicatively-coupled to the controller that operates the motor for controlling movement of the vehicle.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5A-5H illustrates exemplary sub-steps of steps of the method of FIG. 5.

Like reference symbols in the various drawings indicate like elements.

DETAILED DESCRIPTION

The figures illustrate exemplary implementations of a material processing system and methodologies for utilizing the same. Based on the foregoing, it is to be generally understood that the nomenclature used herein is simply for convenience and the terms used to describe the invention should be given the broadest meaning by one of ordinary skill in the art.

Figure 1A:
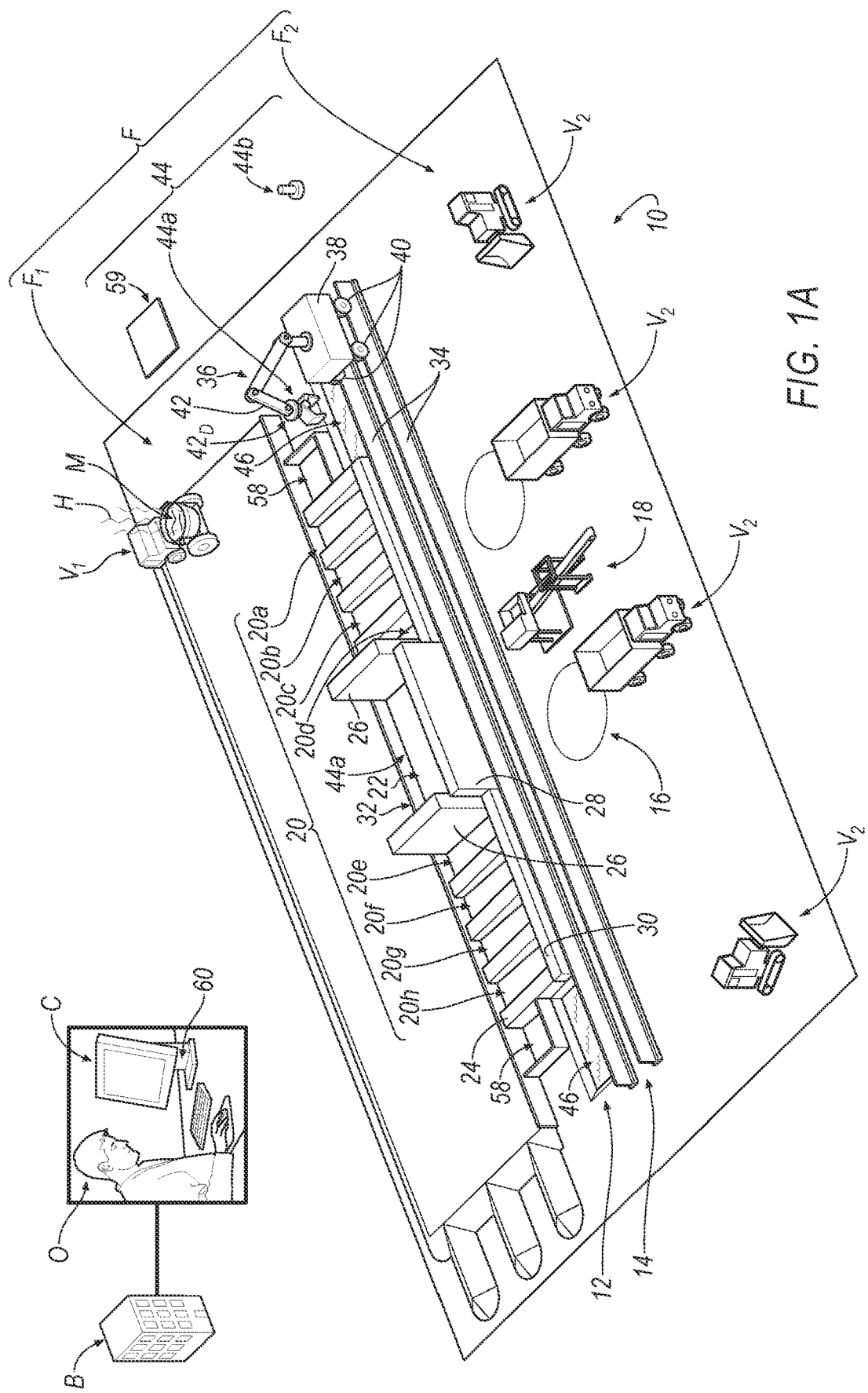
FIGS. 1A-1R are perspective views of a material processing system.
Figure 1B:
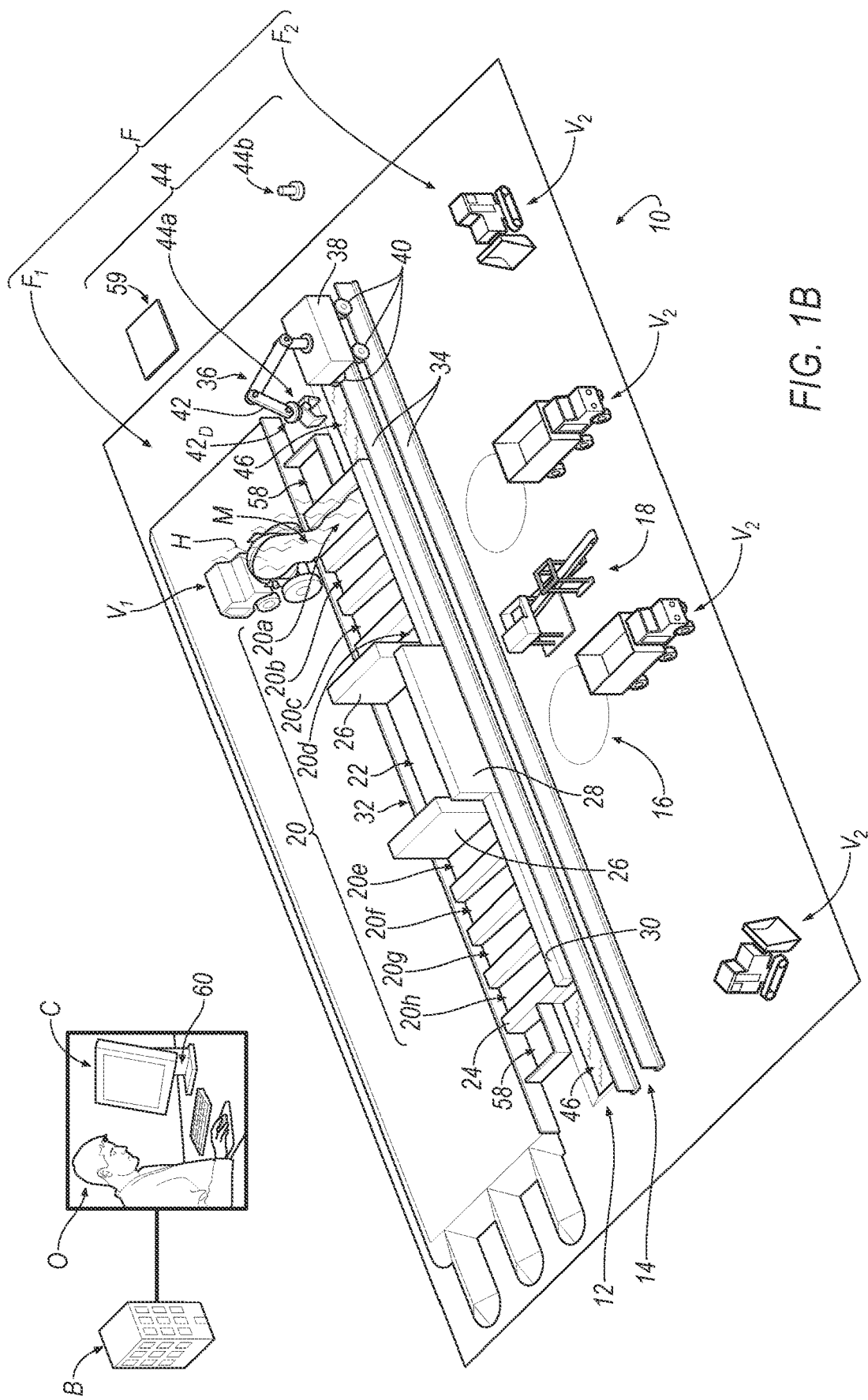
Figure 1C:
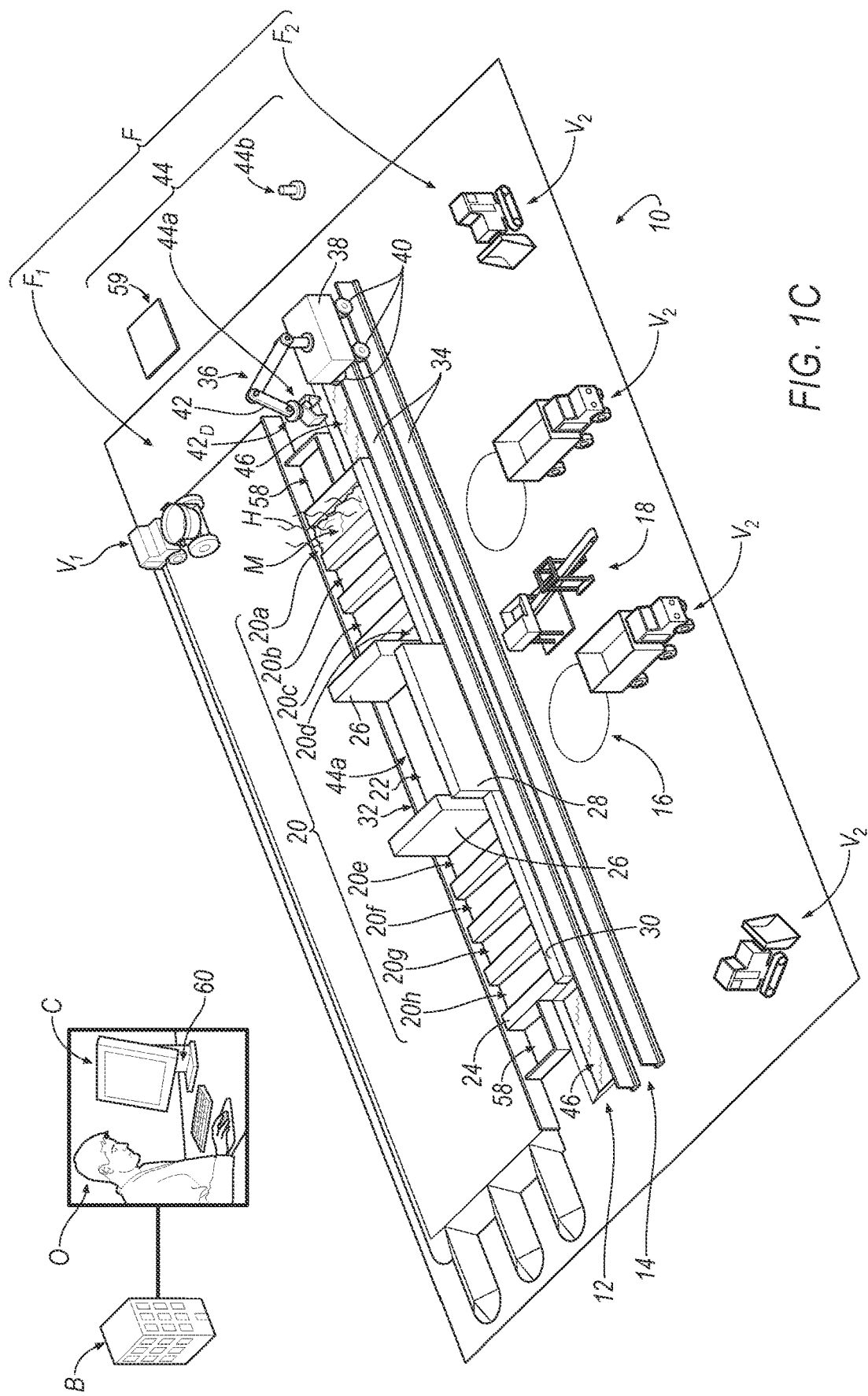
Figure 1D:
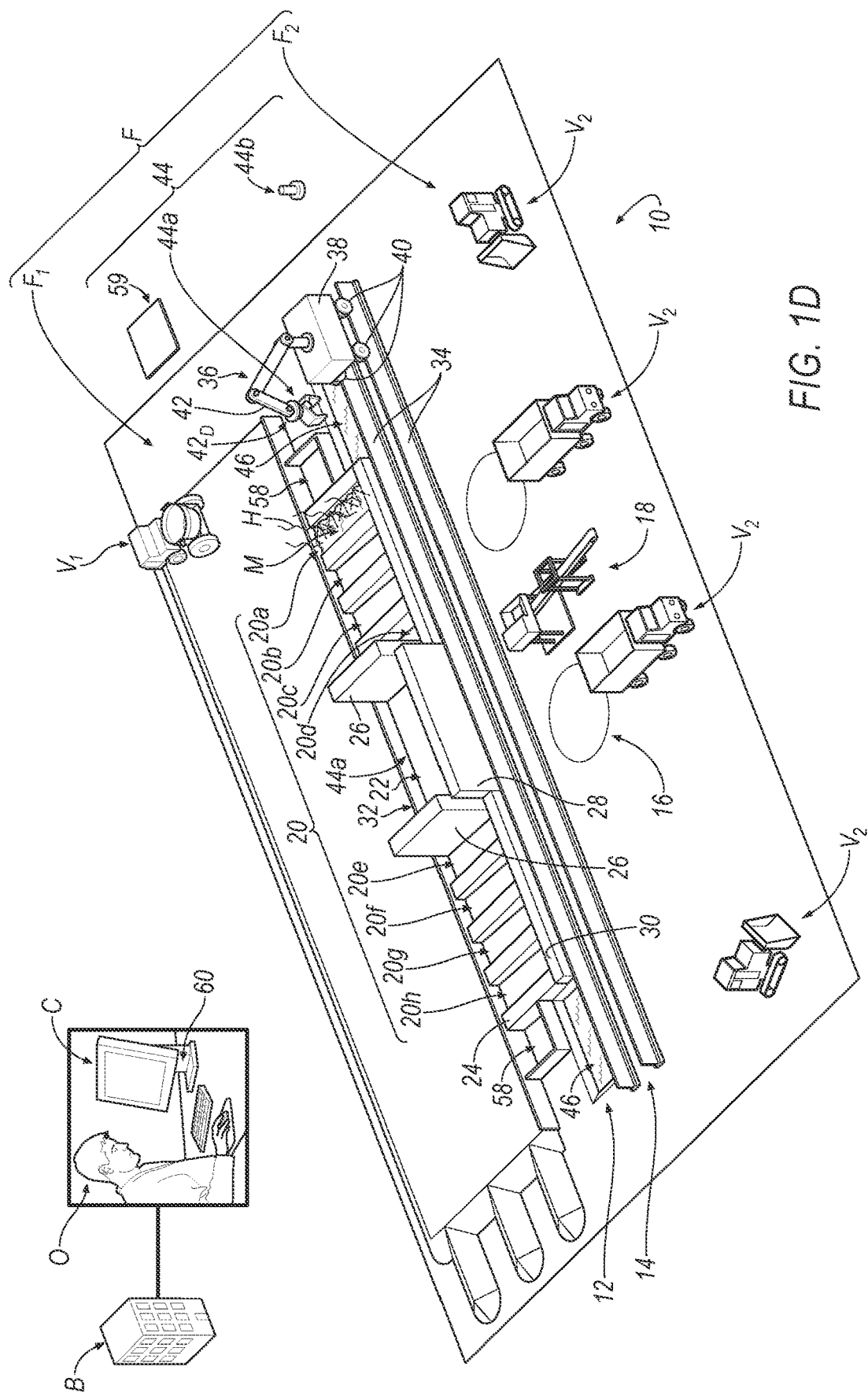
Figure 1E:
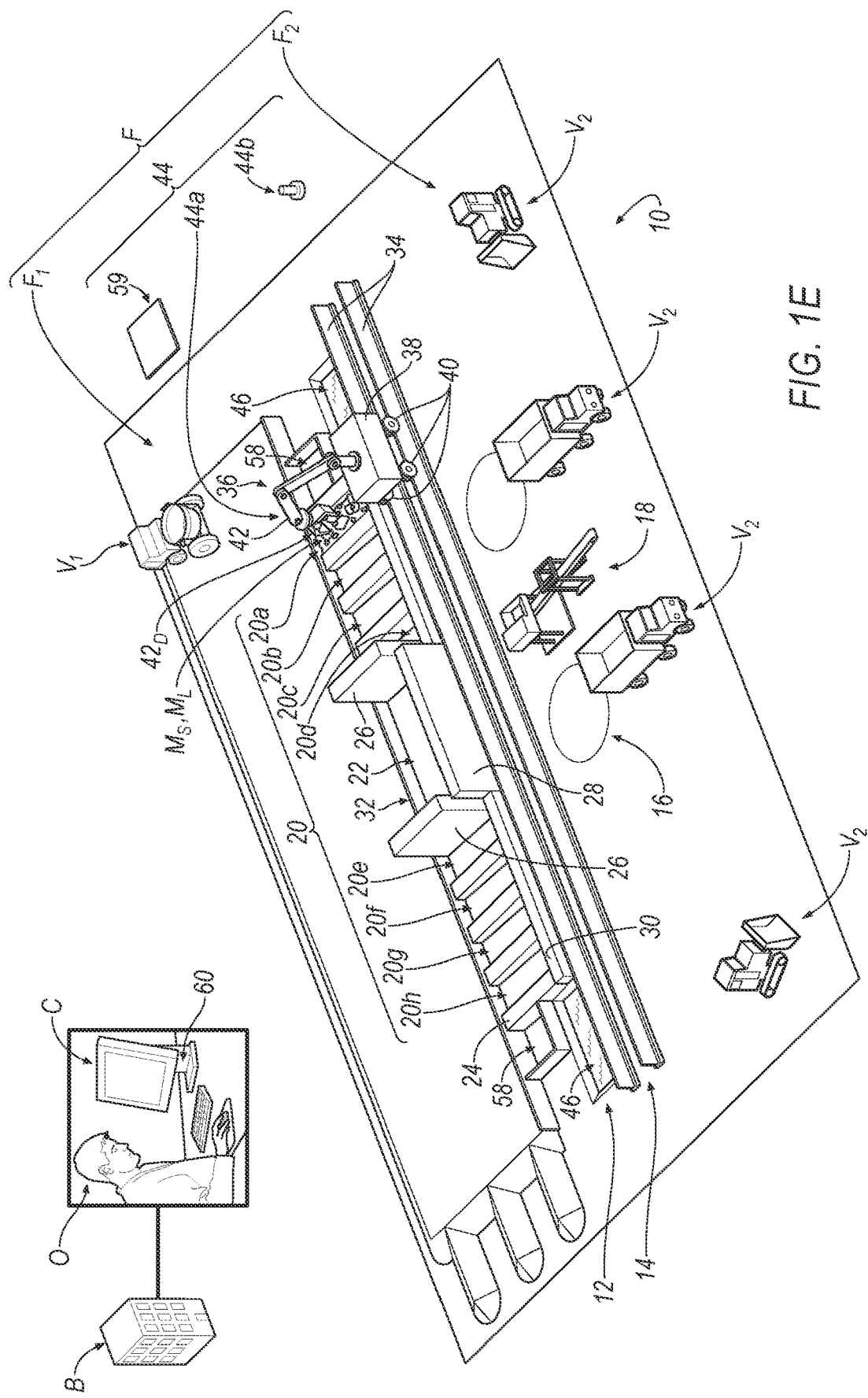
Figure 1F:
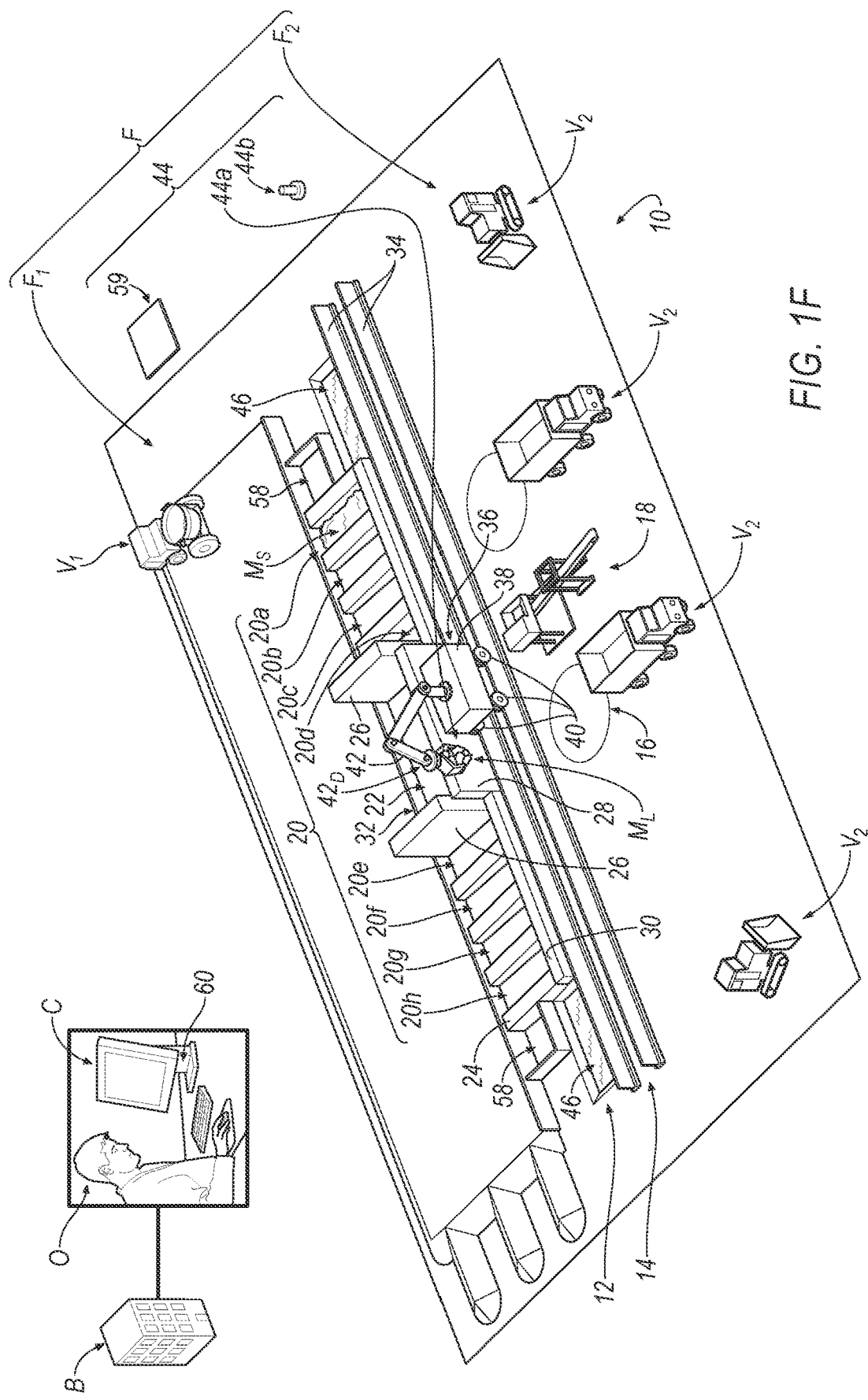
Figure 1G:
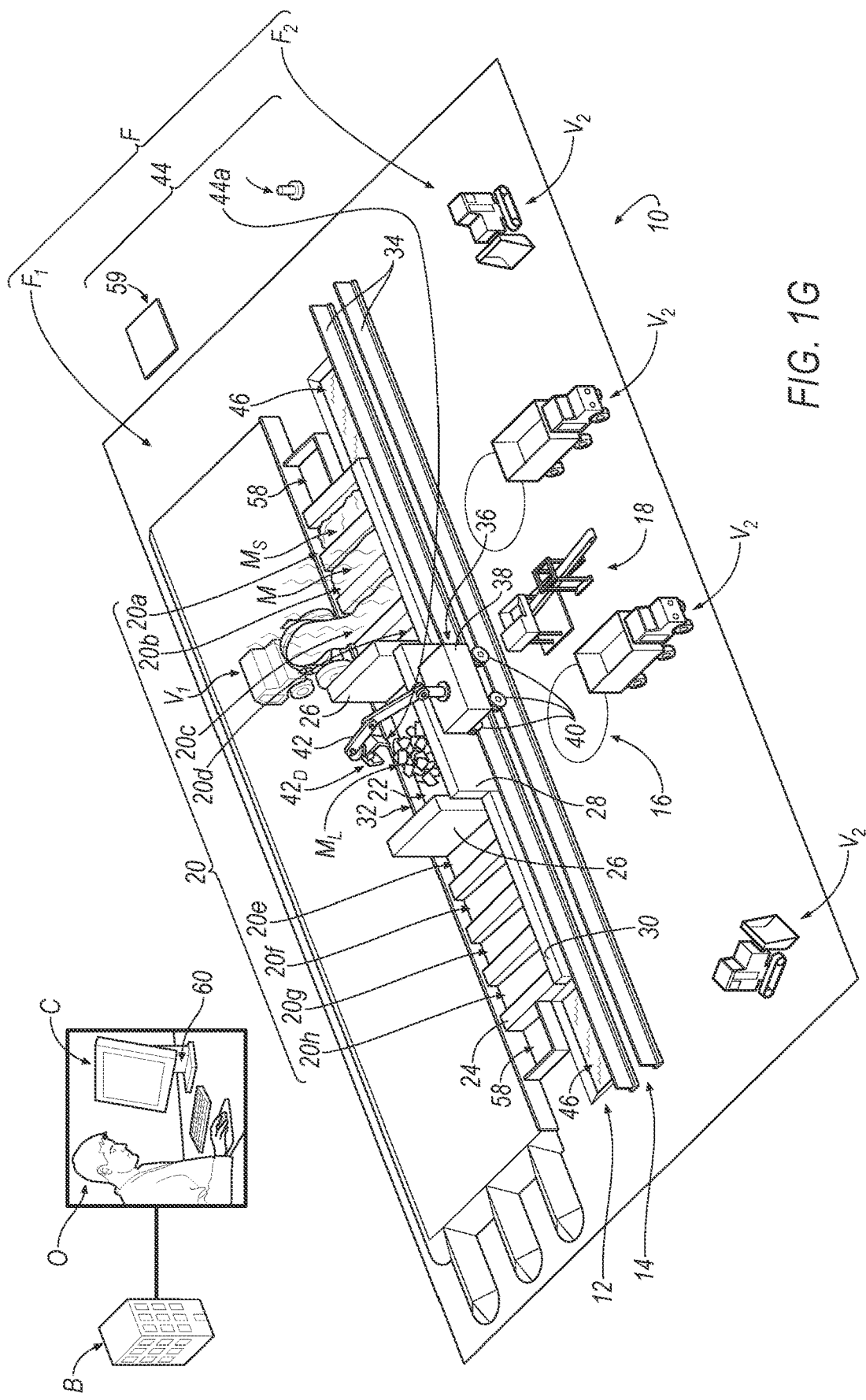
Figure 1H:
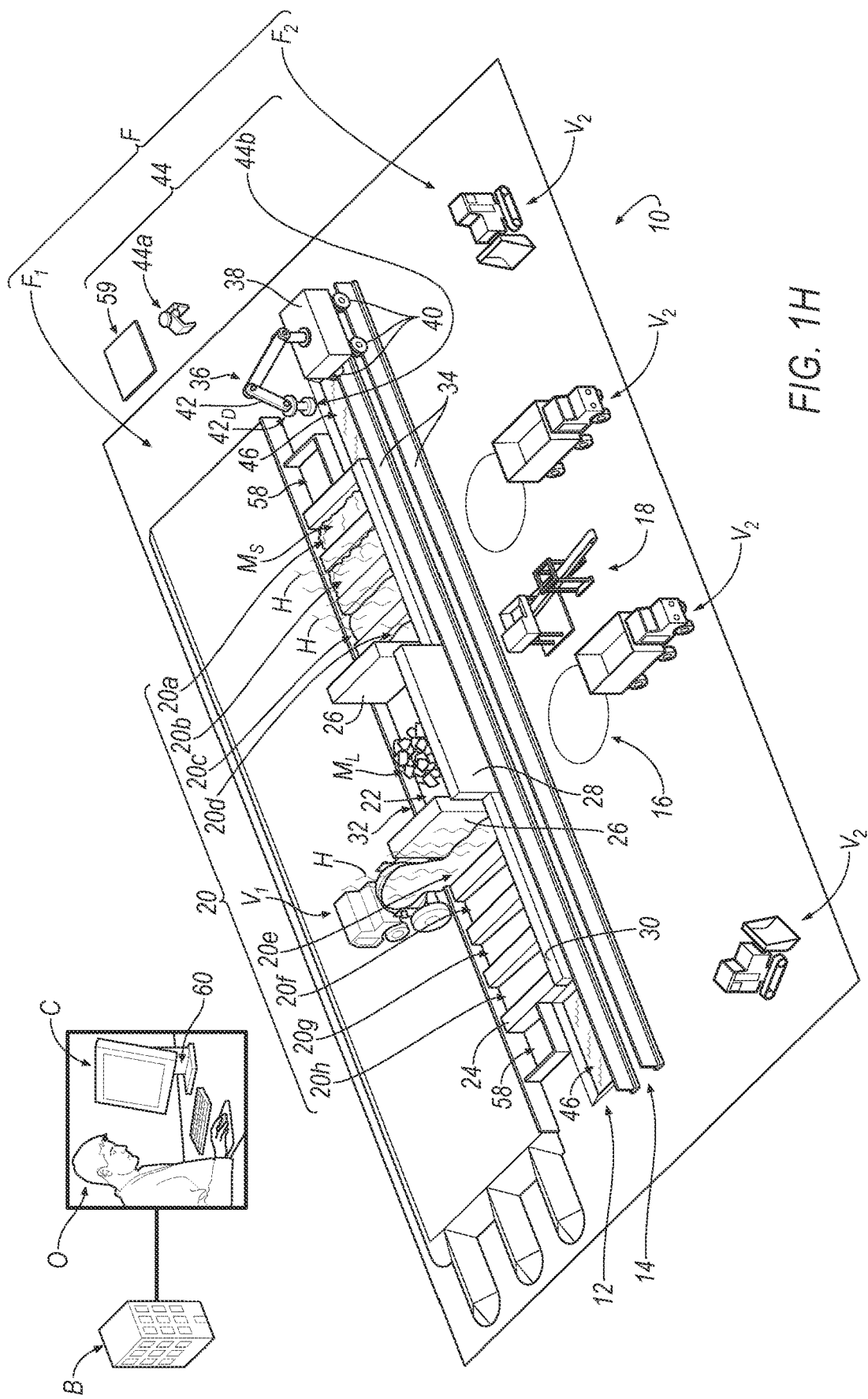
Figure 1I:
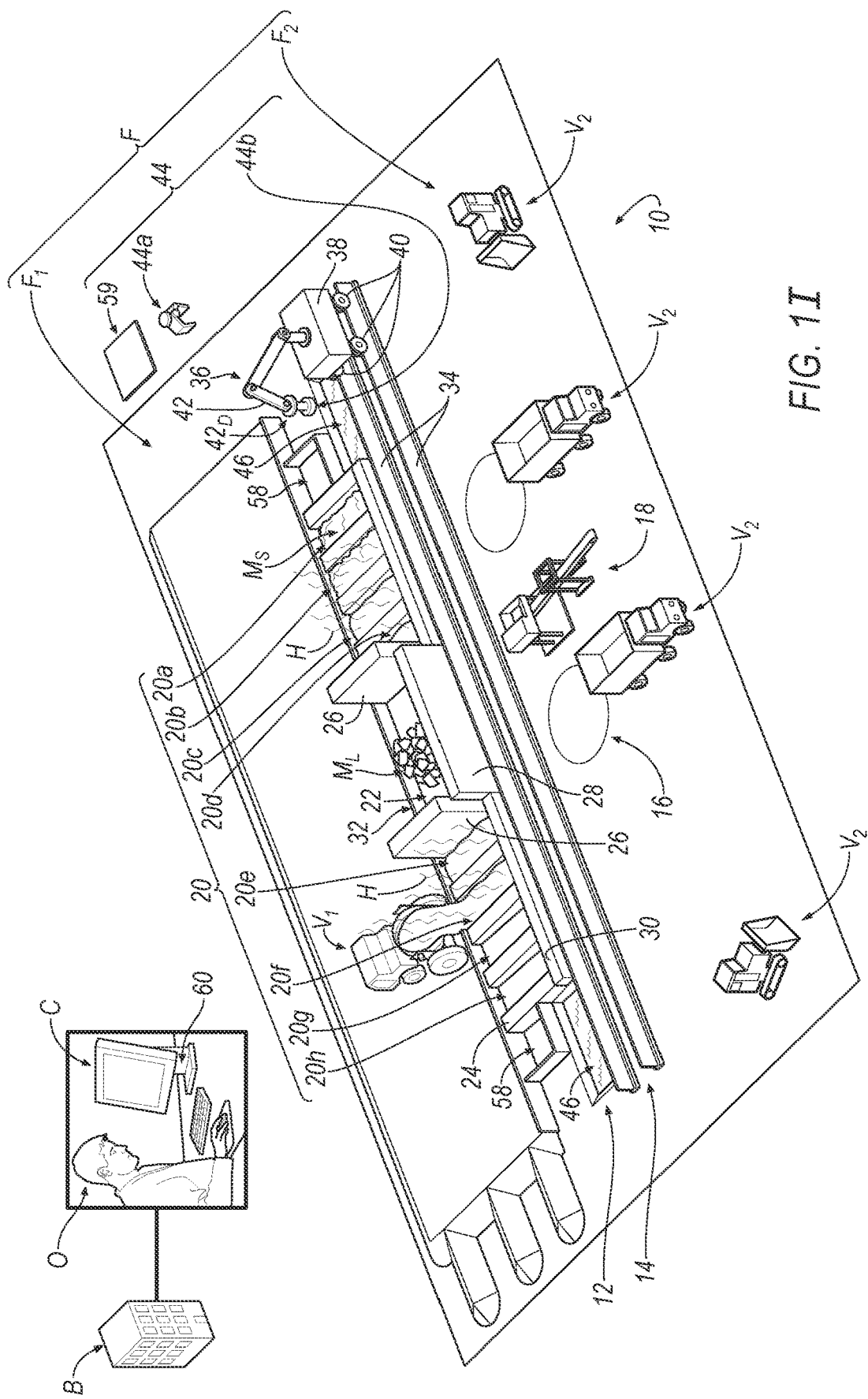
Figure 1J:
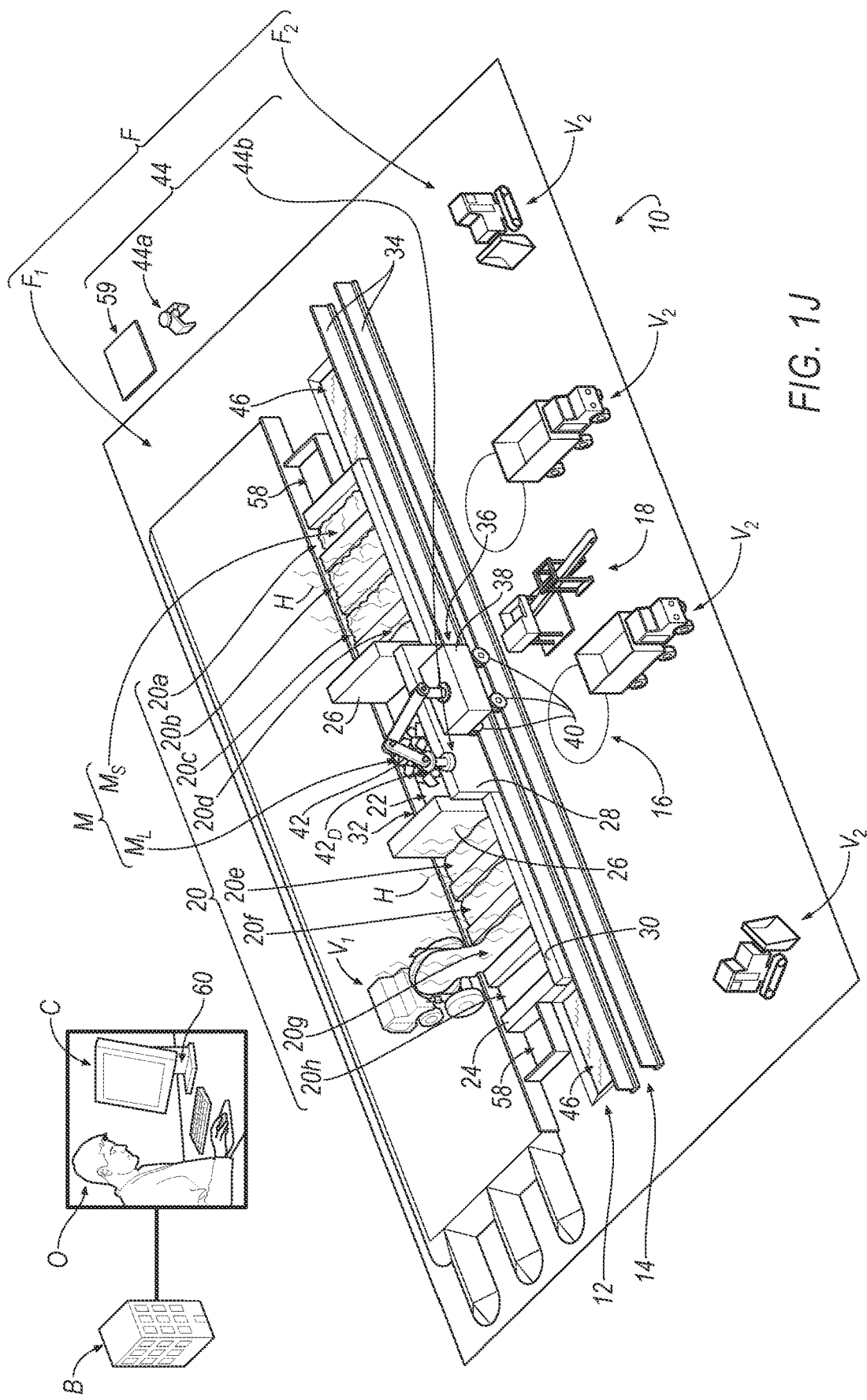
Figure 1K:
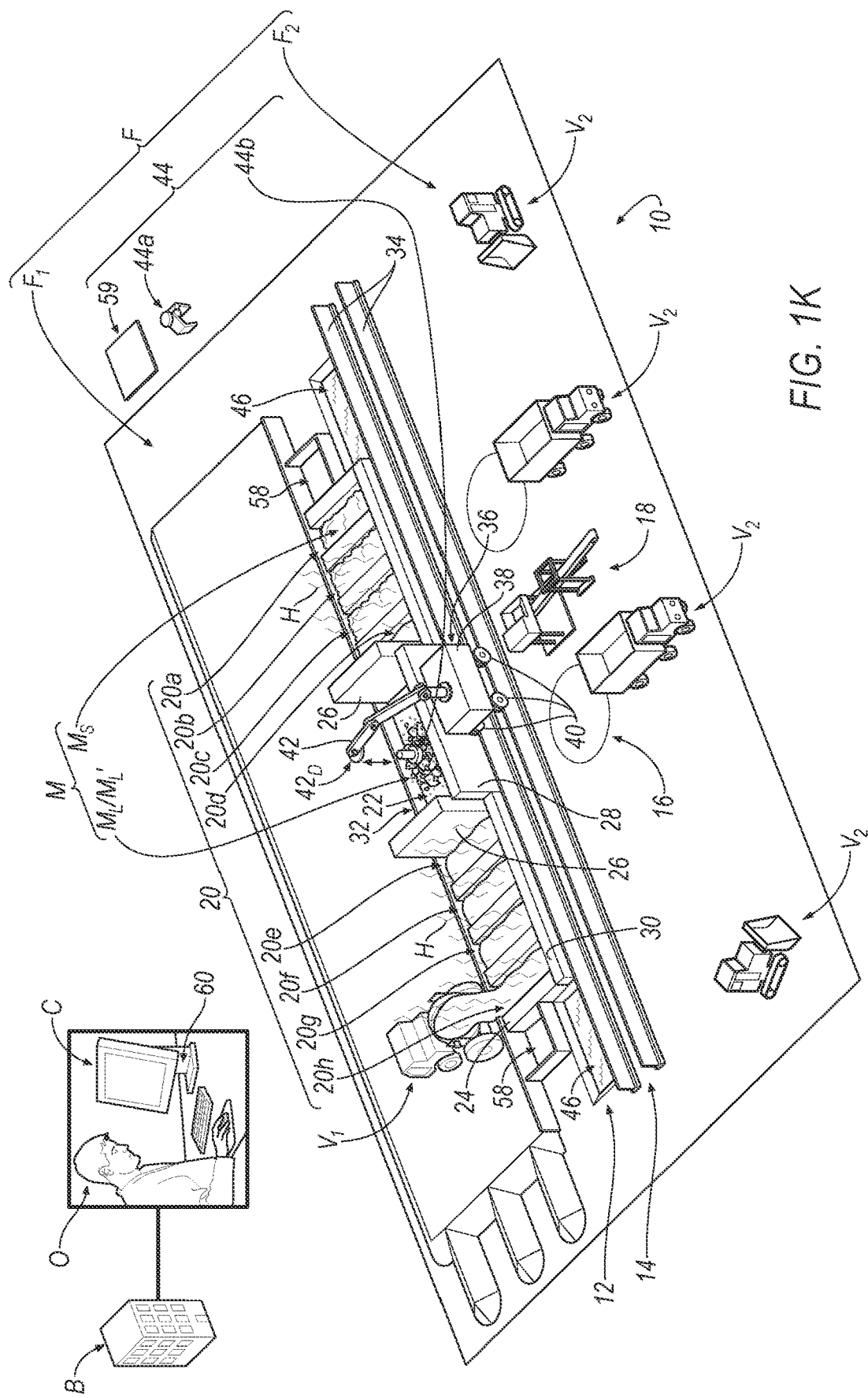
Figure 1L:
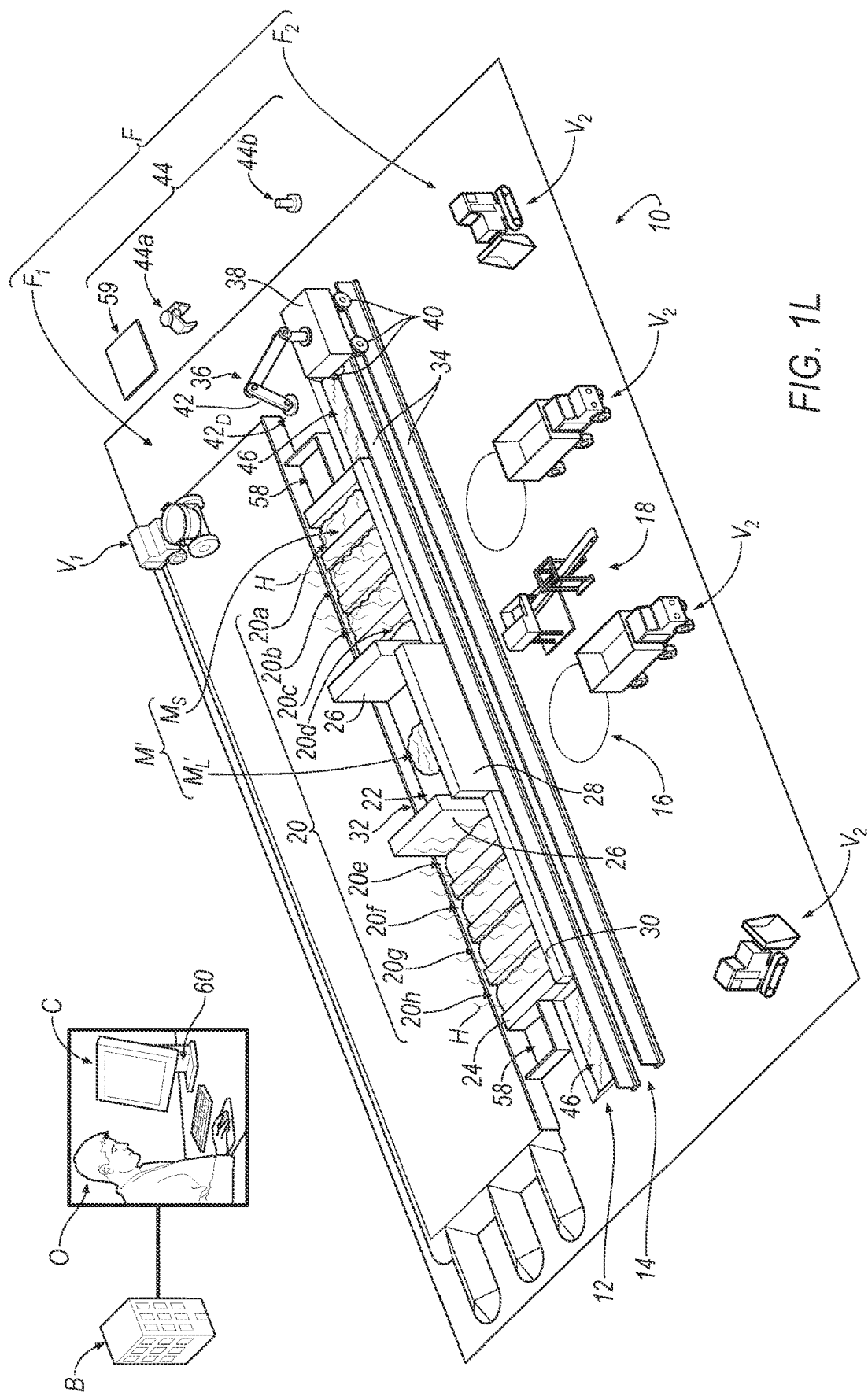
Figure 1M:
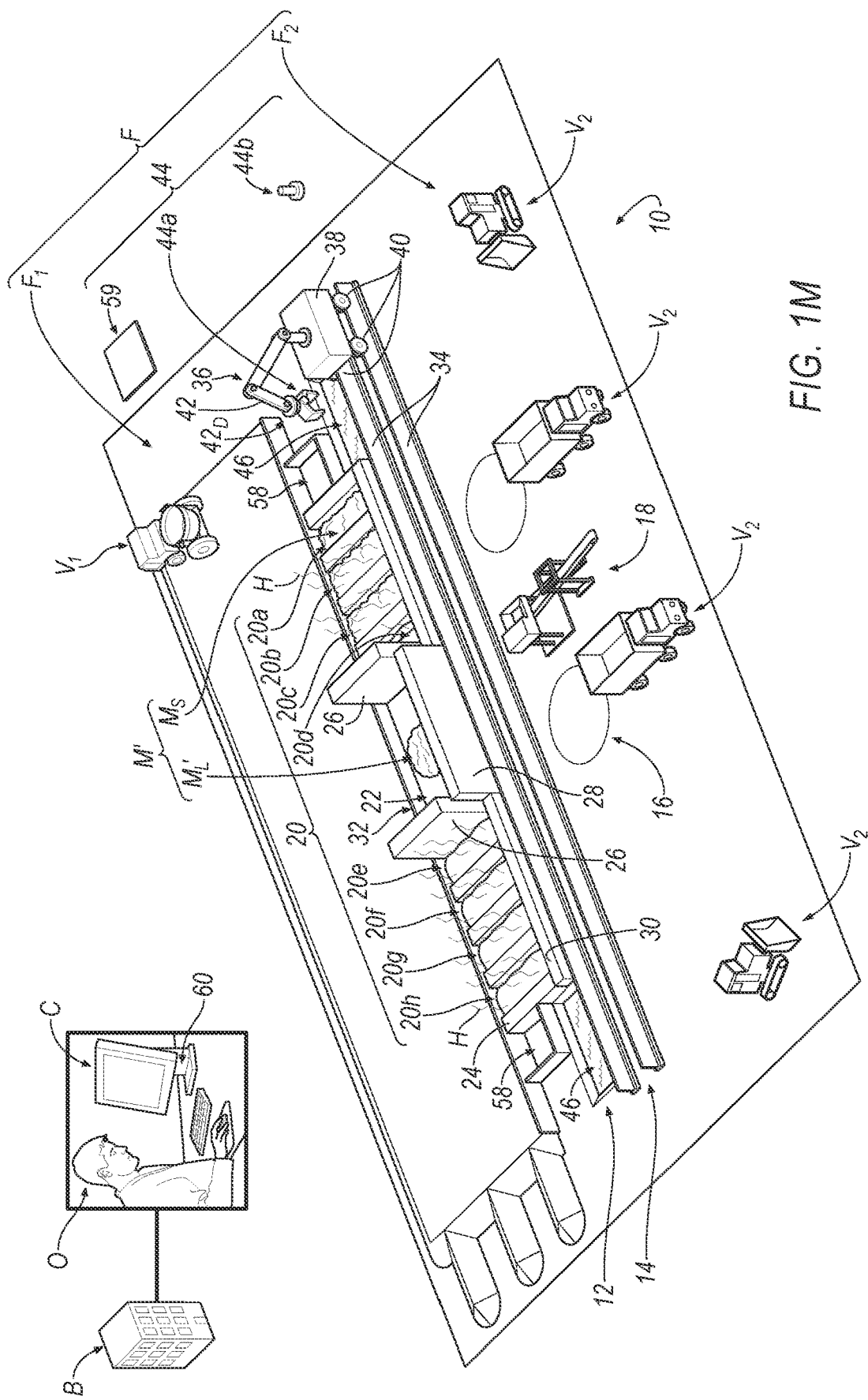
Figure 1N:
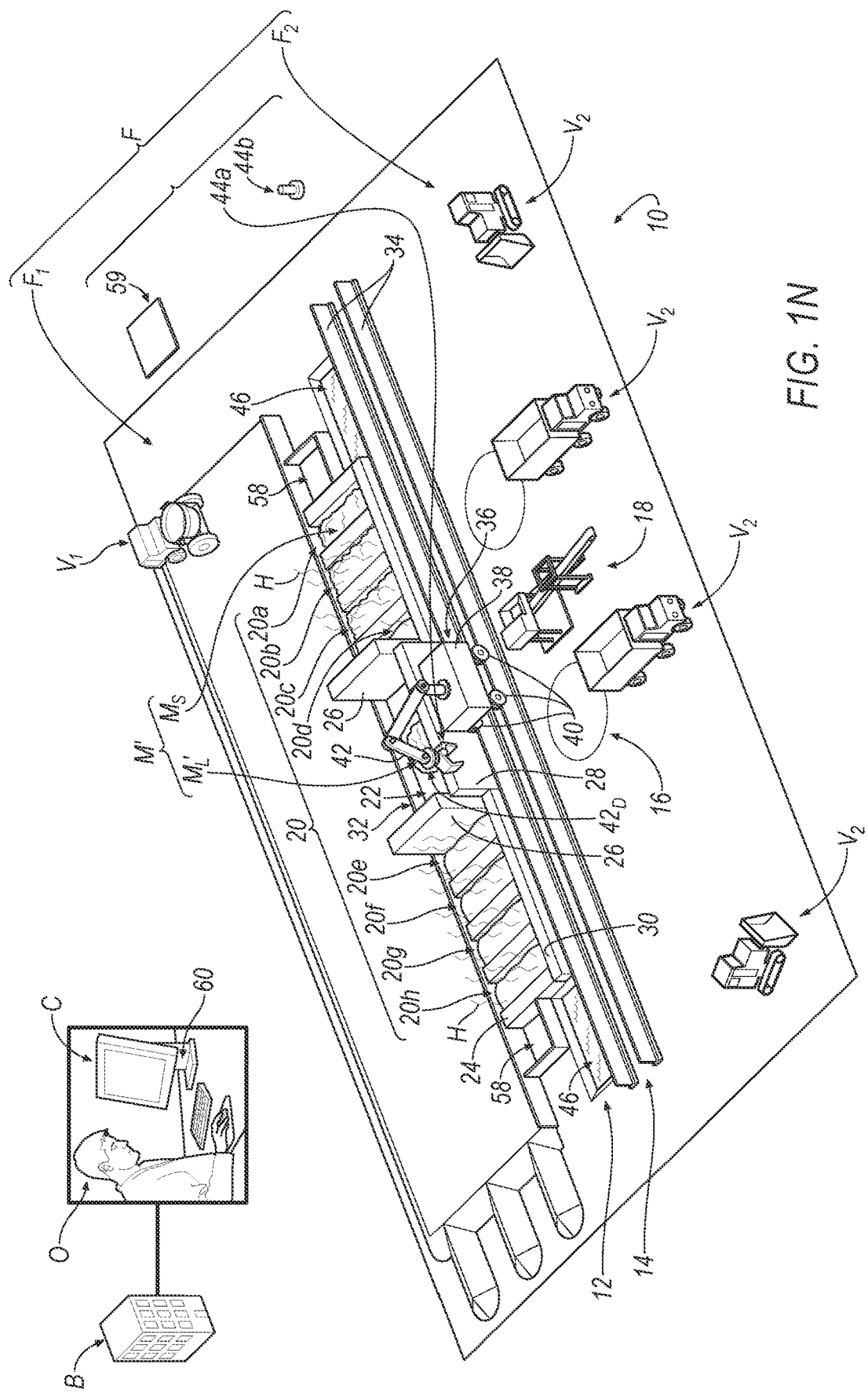
Figure 10:
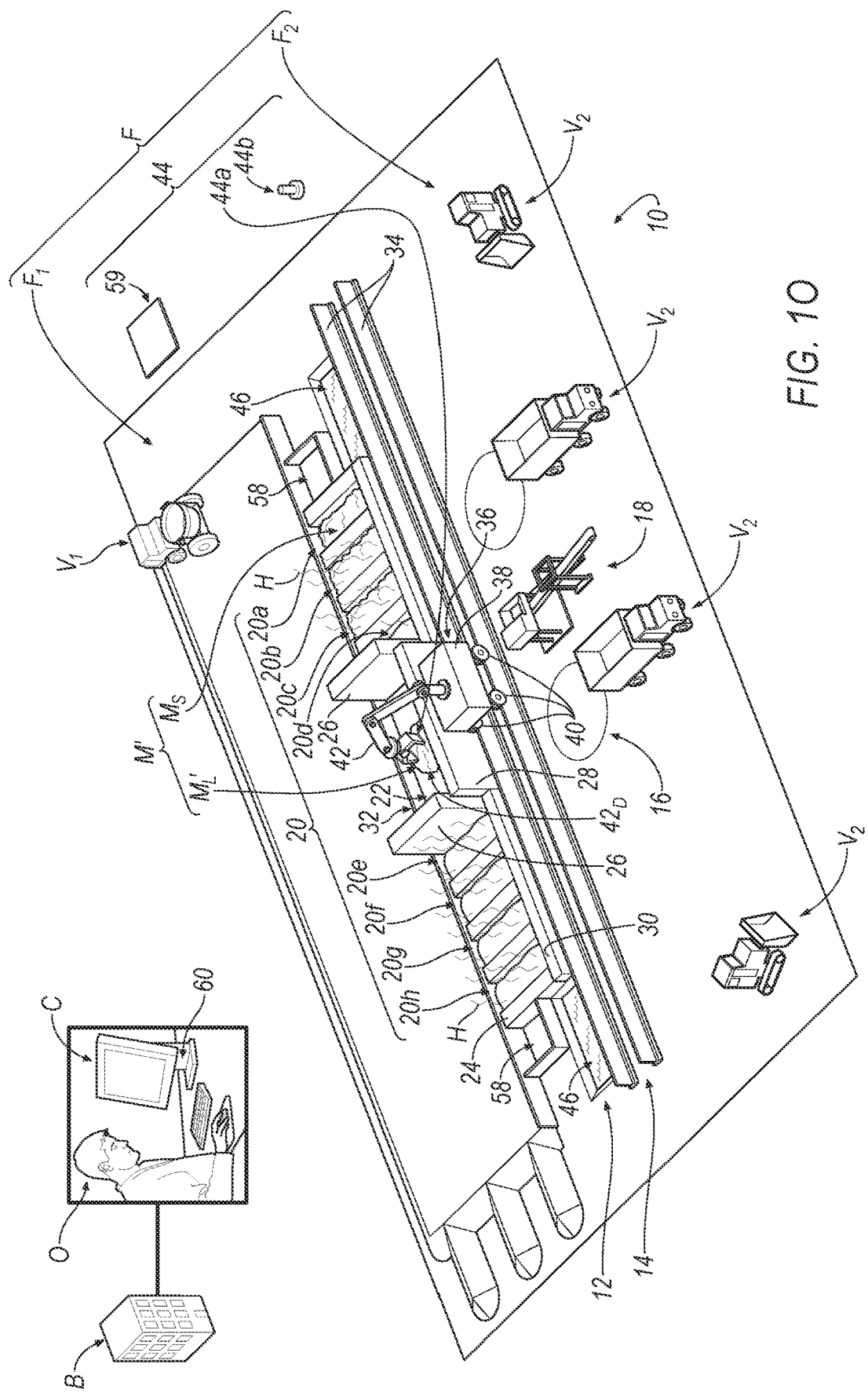
Figure 1P:
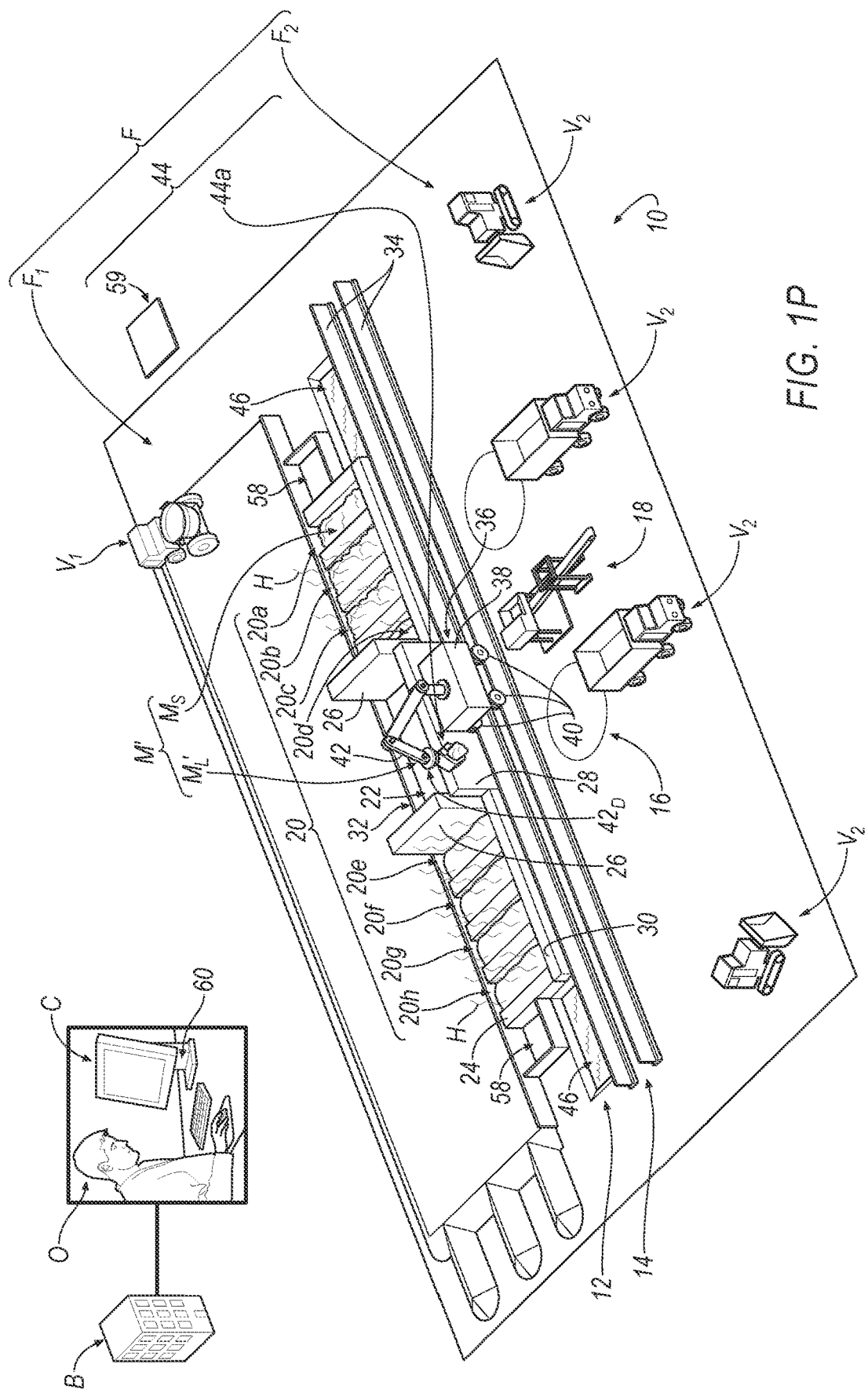
Figure 1Q:
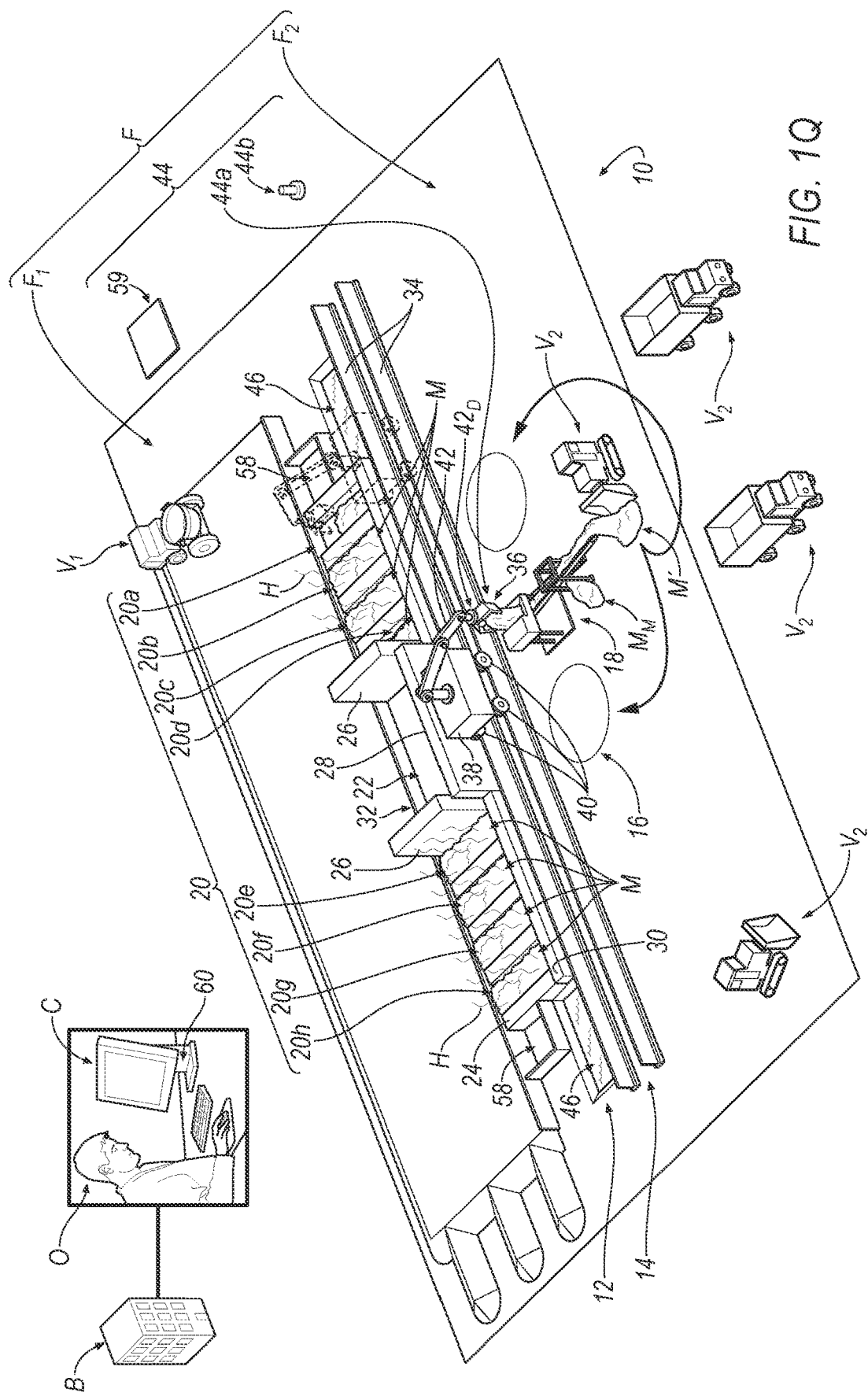
Figure 1R:
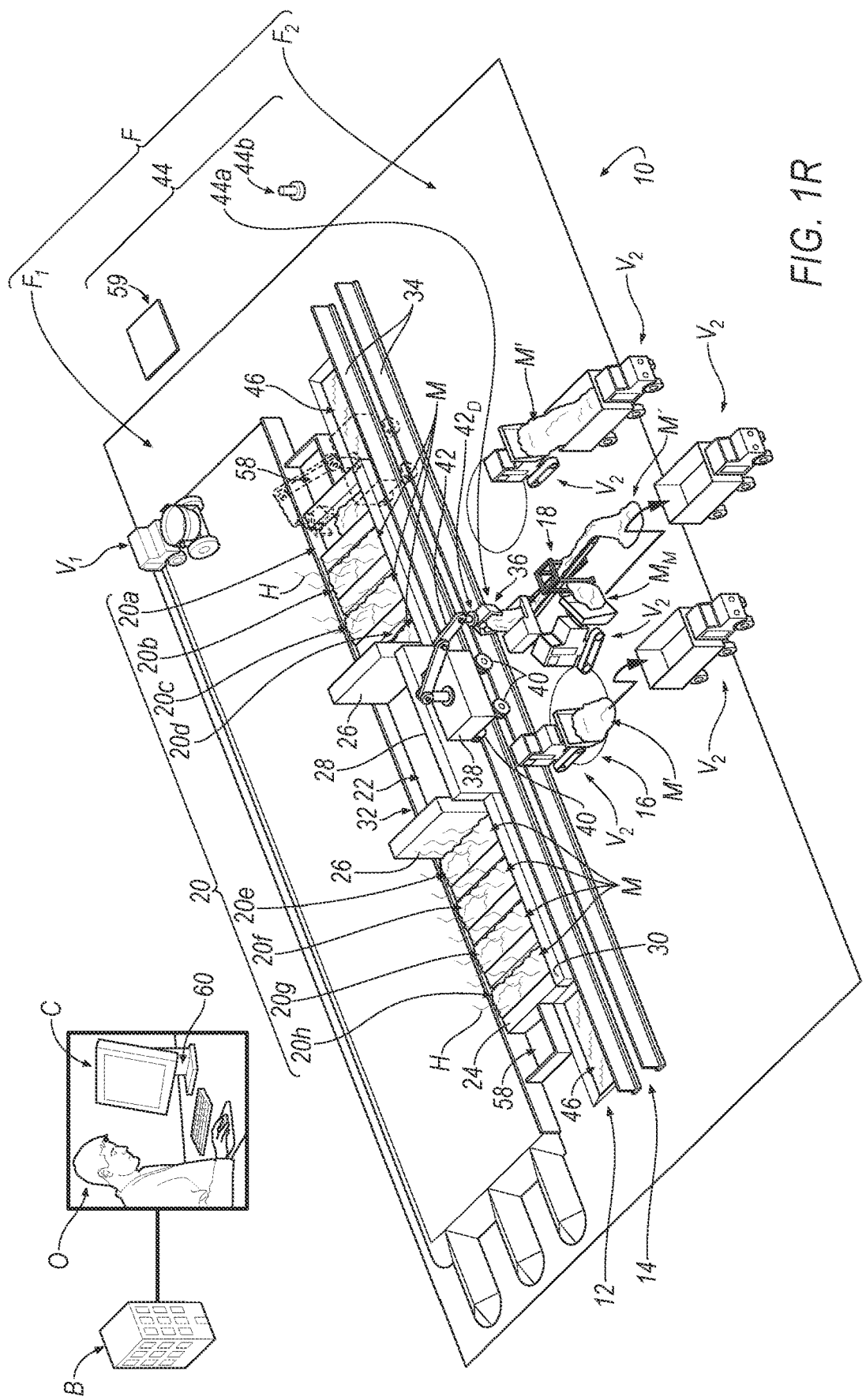

Referring to FIGS. 1A-1R, a system is shown generally at 10. The system 10 is arranged on a field F. In some configurations, the system 10 includes at least a material processing station 12 and a material handling portion 14. In other configurations, the system 10 may optionally include a material staging station 16 and a material separating station and/or evacuating station 18 (hereinafter referred to as a material separating/evacuating station), which may be alternatively referred to as a material processing plant, a metal recovery plant, or the like. As will be discussed in the following disclosure, in some instances, as seen at, for example, FIG. 1Q, the material separating/evacuating station 18 may separate magnetic material (see, e.g., $M_M$ at FIGS. 1Q-1R) from a processed quantity of material (see, e.g., M'); subsequently, the separating/evacuating station 18 may evacuate an amount of separated/magnetic-material-free processed material (i.e., the processed quantity of material M') that may be subsequently transported away from the field F.

With reference to FIG. 1A, one or more portions of the material processing station 12 and the material handling portion 14 generally divide the field F into an unprocessed material field $F_1$ and a processed material field $F_2$. At least one first vehicle $V_1$ such as, for example, a pot carrier vehicle, may contain and transport a quantity of unprocessed material M from a first location upon the unprocessed material field $F_1$ toward one or more material containing bays 20 of the material processing station 12 whereby the at least one first vehicle $V_1$ deposits the quantity of unprocessed material M into the material processing station 12 for subsequent processing. The quantity of unprocessed material M may be processed by one or both of the material processing station 12 and the material handling portion 14 for ultimately transitioning the quantity of unprocessed material M into a processed quantity of material M' defined by cooled and/or processed material $M_S$, $M_L'$ (see, e.g., FIGS. 1L-1P).

With reference to FIGS. 1M-1Q, after the unprocessed material M has been processed by the system 10 for defining the processed quantity of material M' defined by cooled and/or processed material $M_S$, $M_L'$, the material handling portion 14 moves the cooled and/or processed material $M_S$, $M_L'$ from the material processing station 12 toward at least one of the material staging station 16 or the material separating/evacuating station 18 (e.g., a metal recovery plant or a metal crushing and screening plant) that are located on, or about, or near the processed material field $F_2$. In some implementations, the system 10 includes other stations, such as additional breakers (e.g., additional stations arranged at or near the separating/evacuating station 18), screens, conveyors, or the like.

At least one second vehicle $V_2$ (see, e.g., FIGS. 1A-1R) such as, for example, one or more of a dump truck, front loader, or the like may be arranged proximate at least one of the material staging station 16 and the material separating/evacuating station 18 for receiving, moving, loading, and/or depositing the processed quantity of material M' defined by cooled and/or processed material $M_S$, $M_L'$. Once one or more second vehicles $V_2$ has/have been loaded with the processed quantity of material M' defined by cooled and/or processed material $M_S$, $M_L'$, the second vehicle $V_2$ transports the processed quantity of material M' defined by cooled and/or processed material $M_S$, $M_L'$ away from the processed material field $F_2$.

Referring back to FIG. 1A, the material processing station 12 includes at least two material containing bays that are seen generally at 20 and 22. With reference to FIG. 1A, during the course of utilizing the material processing station 12, a primary material containing bay 20 of the at least two material containing bays 20, 22 is configured for receiving the quantity of unprocessed material M.

As seen at FIG. 1A, the at least two material containing bays seen generally at 20 and 22 define, respectively, a plurality of primary material containing bays 20a-20h and one secondary material containing bay 22. The plurality of primary material containing bays 20a-20h include, for example, eight (8) primary material containing bays defined by, for example: a first primary material containing bay 20a; a second primary material containing bay 20b; a third primary material containing bay 20c; a fourth primary material containing bay 20d; a fifth primary material containing bay 20e; a sixth primary material containing bay 20f; a seventh primary material containing bay 20g; and an eighth primary material containing bay 20h.

In some configurations, the plurality of primary material containing bays 20a-20h may be include a first group of first material containing bays 20a-20d and a second group of first material containing bays 20e-20h. The first group of first material containing bays 20a-20d may be defined by, for example: the first primary material containing bay 20a, the second primary material containing bay 20b, the third primary material containing bay 20c, and the fourth primary material containing bay 20d. The second group of first material containing bays 20e-20h may be defined by, for example: the fifth primary material containing bay 20e, the sixth primary material containing bay 20f, the seventh primary material containing bay 20g, and the eighth primary material containing bay 20h. The one secondary material containing bay 22 may be centrally arranged with respect to the plurality of primary material containing bays 20a-20h or arranged between the first group of first material containing bays 20a-20d and the second group of first material containing bays 20e-20h.

Each material containing bay 20a, 20b, 20c, 20d, 20e, 20f, 20g, 20h of the plurality of primary material containing bays 20a-20h is at least partially formed from at least one lateral barrier wall segment, which are seen generally at 24, 26, 28, and 30. The at least one barrier wall segments may include, for example: at least one first lateral barrier wall segment 24; at least one second lateral barrier wall segment 26; an end wall segment 28; and base end wall segment 30.

Further, at least one material containing bay 20a, 20b, 20c, 20d, 20e, 20f, 20g, 20h of the plurality of primary material containing bays 20a-20h and the one secondary material containing bay 22 is at least partially formed from the at least one first lateral barrier wall segment 24 or the at least one second lateral barrier wall segment 26. Even further, the one secondary material containing bay 22 may be at least partially formed from an end wall segment 28. Yet even further, at least one material containing bay 20a, 20b, 20c, 20d, 20e, 20f, 20g, 20h of the plurality of primary material containing bays 20a-20h and the one secondary material containing bay 22 is at least partially formed from a base end wall segment 30. In some configurations, the base end wall segment 30 extends across and is disposed adjacent to or is connected to: (1) ends of at least one or all of the first lateral barrier wall segments 24; and/or (2) ends of at least one or both of the second lateral barrier wall segments 26 for at least partially forming the plurality of primary material containing bays 20a-20h and the one secondary material containing bay 22. In this regard, a height of the end wall segment 30 may be equal to a height of an end wall opposing the end wall segment 30.

In other configurations, one or more portions of a length of the base end wall segment 30 extends across and is disposed adjacent to or is connected to ends of at least one or a pair of the first lateral barrier wall segments 24 for forming some first primary material containing bays (see, e.g., 20a-20c and 20f-20h) of the plurality of primary material containing bays 20a-20h (e.g., for forming each of the first primary material containing bay 20a, the second primary material containing bay 20b, the third primary material containing bay 20c, the sixth primary material containing bay 20f, the seventh primary material containing bay 20g, and the eighth primary material containing bay 20h). In yet other configurations, the fourth primary material containing bay 20d and the fifth primary material containing bay 20e of the plurality of primary material containing bays 20a-20h are each formed by: (1) a first lateral barrier wall segment 24; (2) a second lateral barrier wall segment 26; and (3) a portion of the length of the base end wall segment 30 that extends across and is disposed adjacent to or is connected to ends of the first lateral barrier wall segment 24 and the second lateral barrier wall segment 26). In other configurations, one or both of the end wall segment 28 and a portion of the base end wall segment 30 are arranged opposite and extends across ends of each second lateral barrier wall segment 26 for forming the one secondary material containing bay 22.

In some configurations, the plurality of primary material containing bays 20a-20h and the one secondary material containing bay 22 define a material access opening or material loading opening 32. The material access opening or material loading opening 32 may be arranged opposite one or both of the end wall segment 28 and the base end wall segment 30.

The second lateral barrier wall segments 26 may be defined by a first height that is greater than a second height defined by the end wall segment 28. The first lateral barrier wall segments 24 may be defined by a third height that is less than the second height of the end wall segment 28, which may be less than the first height of the second lateral barrier wall segments 26. The base end wall segment 30 may be defined by a fourth height; the fourth height may be approximately equal to the third height of the first lateral barrier wall segments 24, which may be less than the second height of the end wall segment 28, which, in turn, may be less than the first height of the second lateral barrier wall segments 26.

In some implementations, one or more of the first lateral barrier wall segment 24, the second lateral barrier wall segment 26, the end wall segment 28, and the base end wall segment 30 may be defined by new or used steel shipping containers. In other implementations, one or more of the first lateral barrier wall segment 24, the second lateral barrier wall segment 26, the end wall segment 28, and the base end wall segment 30 may be formed from a corrosive-resistant marine-grade steel. An exemplary corrosive-resistant marine-grade steel may be, for example, a weathering steel. Another exemplary corrosive-resistant marine-grade steel may be, for example, COR-TEN® steel.

If, for example, one or more of the first lateral barrier wall segment 24, the second lateral barrier wall segment 26, the end wall segment 28, and the base end wall segment 30 are defined by steel shipping containers, one or more of the first lateral barrier wall segment 24, the second lateral barrier wall segment 26, the end wall segment 28, and the base end wall segment 30 may be defined by a vertical stack of two or more steel shipping containers (e.g., a vertical stack of two, three, four, five, six or more shipping containers). In other examples, if one or more of the first lateral barrier wall segment 24, the second lateral barrier wall segment 26, the end wall segment 28, and the base end wall segment 30 are defined by steel shipping containers, one or more of the first lateral barrier wall segment 24, the second lateral barrier wall segment 26, the end wall segment 28, and the base end wall segment 30 may be defined by a vertical stack of two or more steel shipping containers (e.g., a vertical stack of two, three, four, five, six or more shipping containers) that is/are supported by a concrete wall.

In some implementations, the first height defined by second lateral barrier wall segments 26 may be defined by, for example, a vertical stack of six (6) steel shipping containers. Furthermore, the second height defined by the end wall segment 28 (that is less than the first height defined by the second lateral barrier wall segments 26) may be defined by, for example, a vertical stack of four (4) steel shipping containers. Yet even further the third height and the fourth height defined, respectively by the first lateral barrier wall segments 24 and the base end wall segment 30 (that is less than the second height defined by the end wall segment 28, which is less than the first height defined by the second lateral barrier wall segments 26) may be defined by, for example, a vertical stack of two (2) steel shipping containers.

As seen at FIGS. 1A-1R, the material processing, handling & transporting portion 14 includes, for example, a pair of rails 34 and a vehicle 36 that is movably-disposed upon the pair of rails 34. The pair of rails 34 extend along all of the plurality of primary material containing bays 20a-20h and the one secondary material containing bay 22 such that the vehicle 36 may be selectively slidably arranged upon the pair of rails 34 near or proximate any of the primary material containing bays 20a-20h and the one secondary material containing bay 22.

The vehicle 36 includes a body portion 38 and a plurality of wheels 40 that support the body portion 38. The pair of rails 34 are sized for receiving the plurality of wheels 40 for permitting movement of the vehicle 36 along the plurality of primary material containing bays 20a-20h and the one secondary material containing bay 22. In some implementations, the vehicle 36 may be an electrically-powered vehicle that powers rotation of the plurality of the wheels 40 with electricity rather than, for example, diesel fuel. Although the vehicle 36 may be electrically-powered as described above, the vehicle 36 is not limited to being electrically-powered, and, as such, may be powered with diesel fuel. Furthermore, the vehicle 36 is not limited to being a rail vehicle, rolling upon rails 34, and, as such may include, for example, rubber tire wheels (not shown) or crawler tracks (not shown) that directly engage the ground surface defined by, for example, the processed material field $F_2F$. Furthermore, although the rails 34 are shown extending above and away from the ground defined by, for example, the processed material field $F_2$, the rails 34 may be recesses into and arranged to be co-planar with an upper surface defined by the ground the processed material field $F_2$.

The vehicle 36 also includes an arm portion 42 and a plurality of end effector portions 44. The plurality of end effector portions 44 include at least, for example, a first end effector portion 44*a* and a second end effector portion 44*b*. Each of the first end effector portion 44*a* and the second end effector portion 44*b* may be selectively attached to the arm portion 42. Although two end effector portions 44*a*, 44*b* are shown and described above, the disclosure is not limited to including two end effector portions 44*a*, 44*b* and may further include, for example, three or more end effector portions.

In an example, the first end effector portion 44*a* may be defined by a grapple portion. In another example, the second end effector portion 44*b* may be defined by a drop ball.

As seen at FIGS. 1A-1R, the material processing station 12 further includes, for example, at least one water reservoir 46 that contains water W. The water W may be, for example, city water, well water, steel mill cooling water (e.g., non-contact cooling water) or atmospherically-obtained water (e.g., rain water, melted snow, or the like). With reference to FIGS. 2A-2E, 2Q-2R, 2N-2O, and 3A-3D, the water reservoir 46 is fluidly-connected to a sprinkler system 48 associated with each primary material containing bay 20*a*, 20*b*, 20*c*, 20*d*, 20*e*, 20*f*, 20*g*, 20*h* of the plurality of primary material containing bays 20*a*-20*h* by a water source pipe 50 (see, e.g., FIGS. 2A-2E, 2Q-2R, and 2N-2O). Furthermore, as seen at FIGS. 2A-2E, 2Q-2R, 2N-2O, and 3A-3D, each primary material containing bay 20*a*, 20*b*, 20*c*, 20*d*, 20*e*, 20*f*, 20*g*, 20*h* of the plurality of primary material containing bays 20*a*-20*h* may optionally include a drain 52 fluidly connected to a drain pipe 54

As seen at FIGS. 1A-1R, the material processing station 12 may further include, for example, at least one steel-lined material steaming bunker 58. The at least one steel-lined material steaming bunker 58 may be fluidly-connected to the at least one water reservoir 46 by a water source pipe (not shown) that supplies the water W to bunker 58 (from, e.g., a sprinkler system, not shown) for steaming the water W. In some instances, the grapple end effector portion 44*a* may be configured to interface with a handle portion of a lid 59 that may be sized for covering the steaming bunker 58. The steaming bunker 58 may be utilized for further reducing the size of the cooled and/or processed material $M_S$, $M_L'$.

While an exemplary implementation of the lid 59 is described above being sized for covering the steaming bunker 58, the lid 59 may be sized for covering one or more of the primary material containing bays 20*a*-20*h*. Once arranged over the steaming bunker 58 or one or more of the primary material containing bays 20*a*-20*h*, the lid 59 traps steam within the bunker 58/bay(s) 20*a*-20*h*, thereby causing the steam to increase the atmospheric pressure within the bunker 58/bay(s) 20*a*-20*h* such that the pressure may be greater than approximately about 1 atmosphere (atm); in such instances, the steam may accelerate hydration of free lime/periclase/free magnesium oxide (MgO) of the material (see, e.g., $M_M$, $M_S$, $M_L$ at FIG. 1E) contained within any of the primary material containing bays 20*a*-20*h*. The steam contained within the bunker 58/bay(s) 20*a*-20*h* may result in a slag product that is not prone to degradation and may be physically more volumetrically stable. In some instances, placement of the lid 59 over the bay(s) 20*a*-20*h* and the resulting 'steaming' action may promote easier removal of the material $M_S$, $M_L$ because slag curing produces physically smaller particles/pieces (see, e.g., $M_S$) of material. Furthermore, in some examples, 'steamed' large particles/pieces (see, e.g., $M_L$) of material may be more efficiently broken (see, e.g., the processing 110 step in FIG. 5E) as a result of the cured large particles/pieces (see, e.g., $M_L$) of material tending to be slightly smaller in size.

As seen at FIGS. 1A-1R, the system 10 may further include a controller 60 (see also FIG. 6) that is communicatively-coupled to one or more sensor 62*a*-62*e* of a plurality of sensors 62 (see, e.g., FIGS. 2A-2R and 3A-3D). The plurality of sensors 62 may include, for example: a poured material sensor 62*a* (e.g., an optical sensor); a material classification locating sensor 62*b*/62*c* (e.g., an optical sensor); and an atmospheric temperature sensor 62*d*/62*e*.

In some implementations, the controller 60 may also be communicatively-coupled to at least one actuator 64*a*-64*c* of a plurality of actuators 64 (see, e.g., FIGS. 2A-2W and 3A-3H). The plurality of actuators 64 may include, for example: one or more plumbing devices (e.g., one or more of a valve, water/fluid flow meter, or the like) 64*a* connected to the sprinkler system 48; an electric motor 64*b* of the vehicle 36; and an electric motor 64*c* of a conveyor 66 (see, e.g., FIGS. 2H and 4B) of the material separating/evacuating station 18.

Figure 2A:
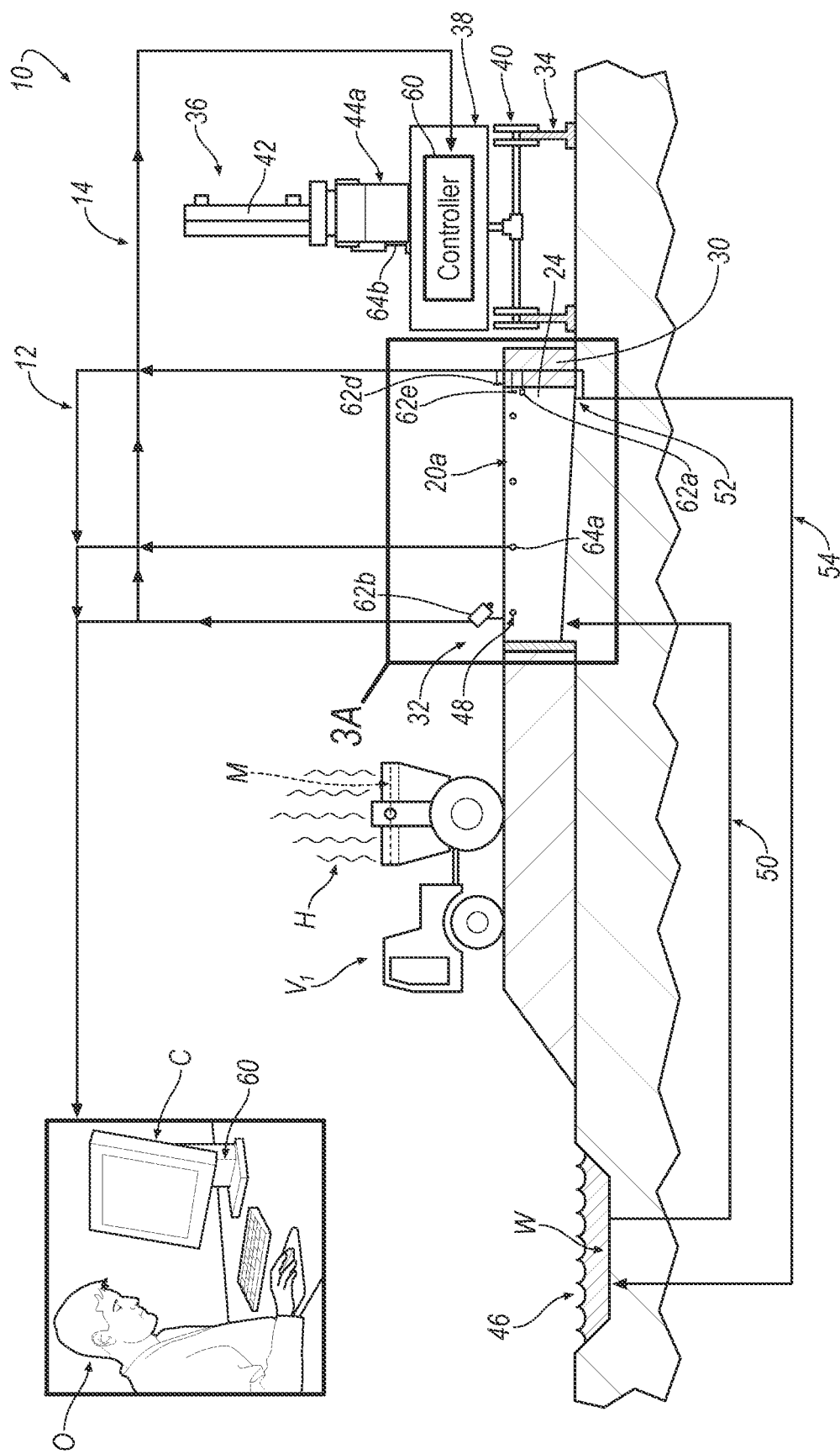
FIGS. 2A-2R are side, partial cross-sectional views of the material processing system that correspond to FIGS. 1A-1R.
Figure 2B:
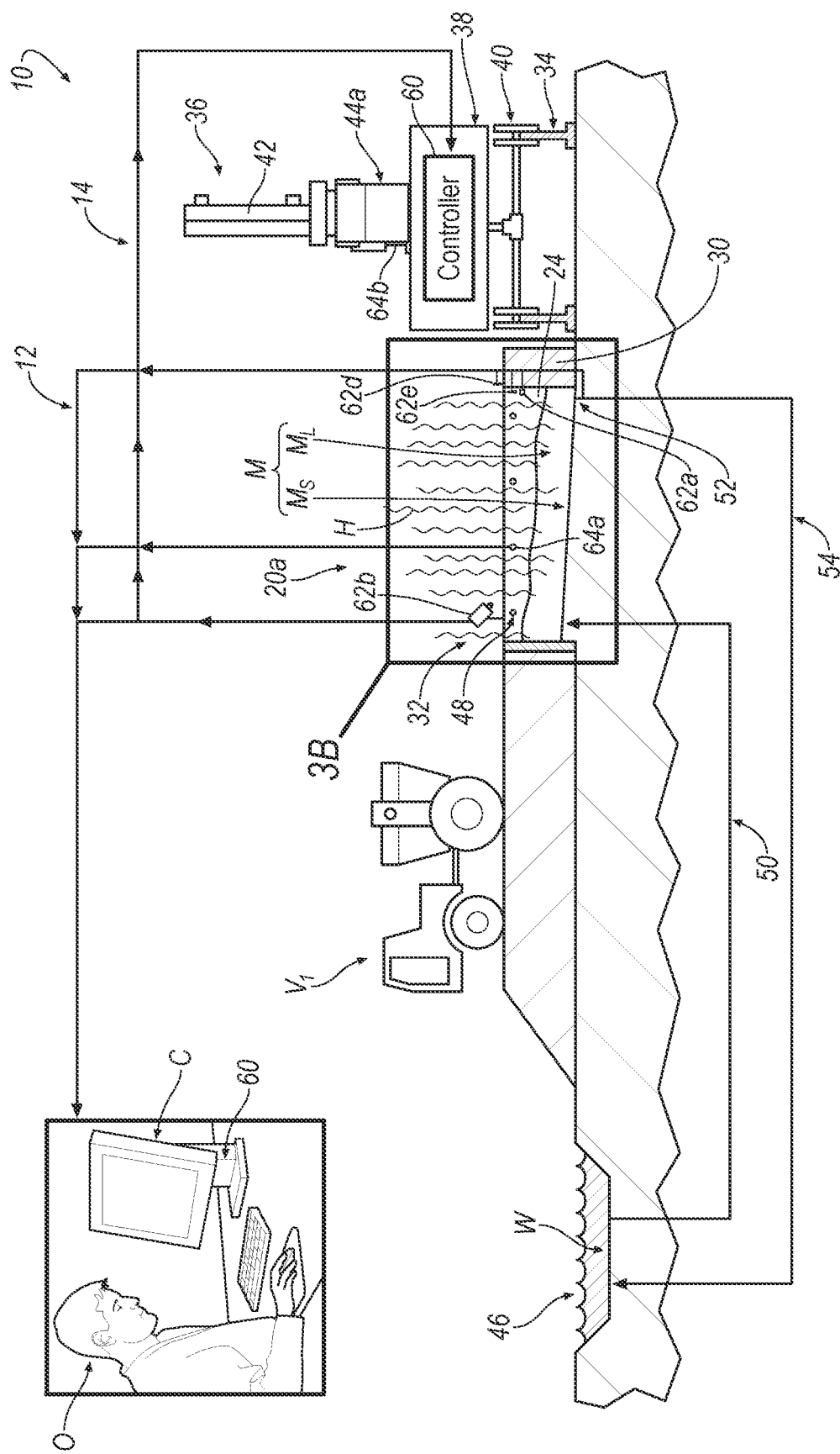
Figure 2C:
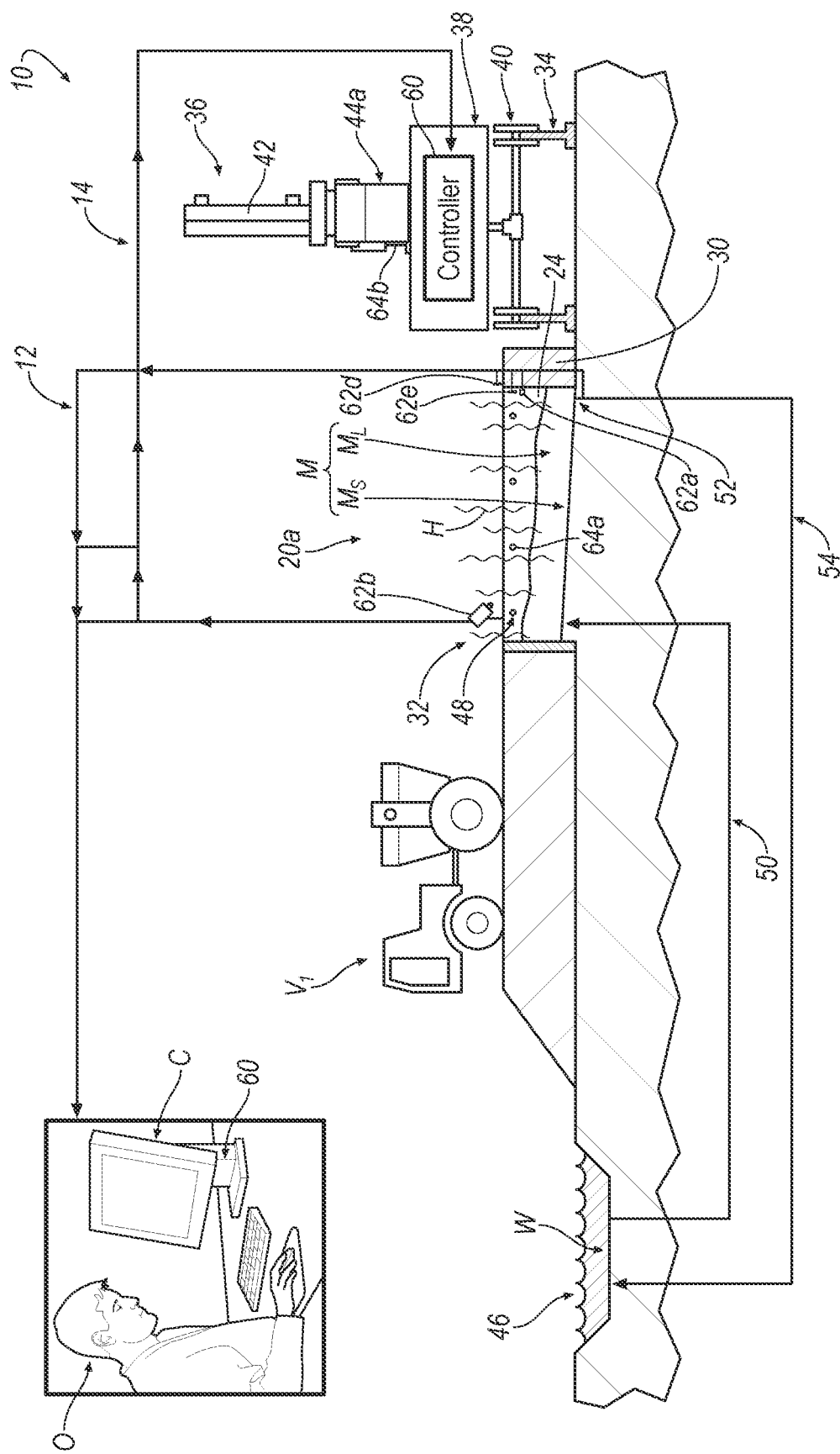
Figure 2D:
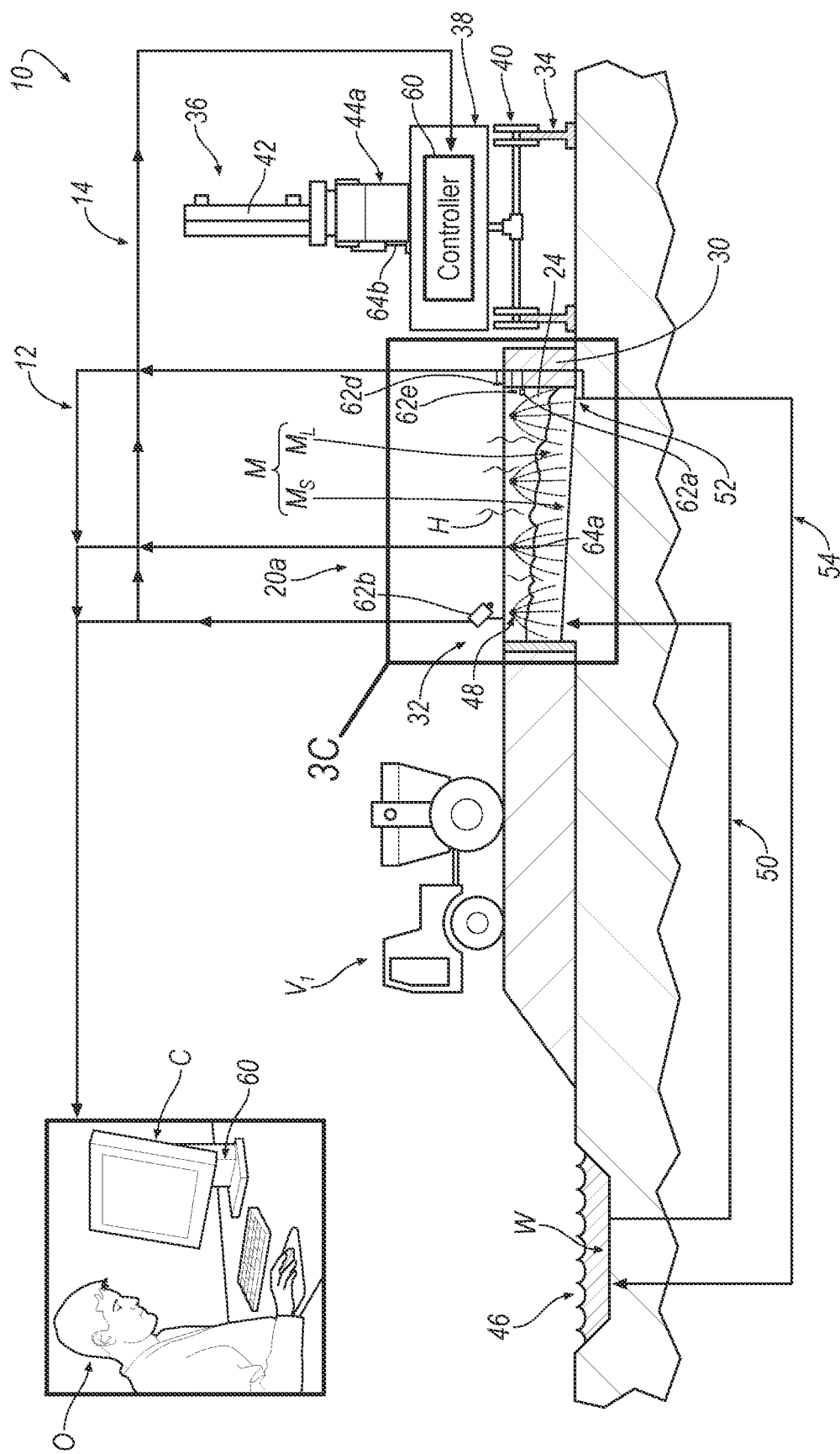

With reference to FIGS. 1A-1R, in some implementations, the controller 60 may be located at, for example, a remote location, such as, for example, an office building B; in some instances, the controller 60 may be a component of a computer workstation C. In other implementations, as seen at FIGS. 2A-2R, the controller 60 may be connected to or disposed within, for example, the body 38 of the vehicle 36.

The controller 60 may render the system 10 as being a fully automated system. However, in some configurations, the system 10 may be a partially automated system whereby an operator O (see, e.g., FIGS. 1A-1R or FIGS. 2A-2R) may retain at least some control or oversight over the operation of the system 10.

In some instances, the operator O may be located proximate the computer workstation C (that may include the controller 60) within the office building B. In other instances, the operator O may be an occupant or passenger within the vehicle 36. In other instances, a first operator O may be located proximate the computer workstation C (that may include the controller 60) within the office building B, and a second operator O may be an occupant or passenger within the vehicle 36. In yet other instances, if, for example, the system 10 is a fully automated system, an operator O is not associated with the system 10; however, in some circumstances, the system may be associated with one or more operators O such as, for example, a first operator O located in the office building B and/or a second operator O located in the vehicle 36 in order to observe operation of a fully automated system that is controlled by the controller 60.

Figure 5:
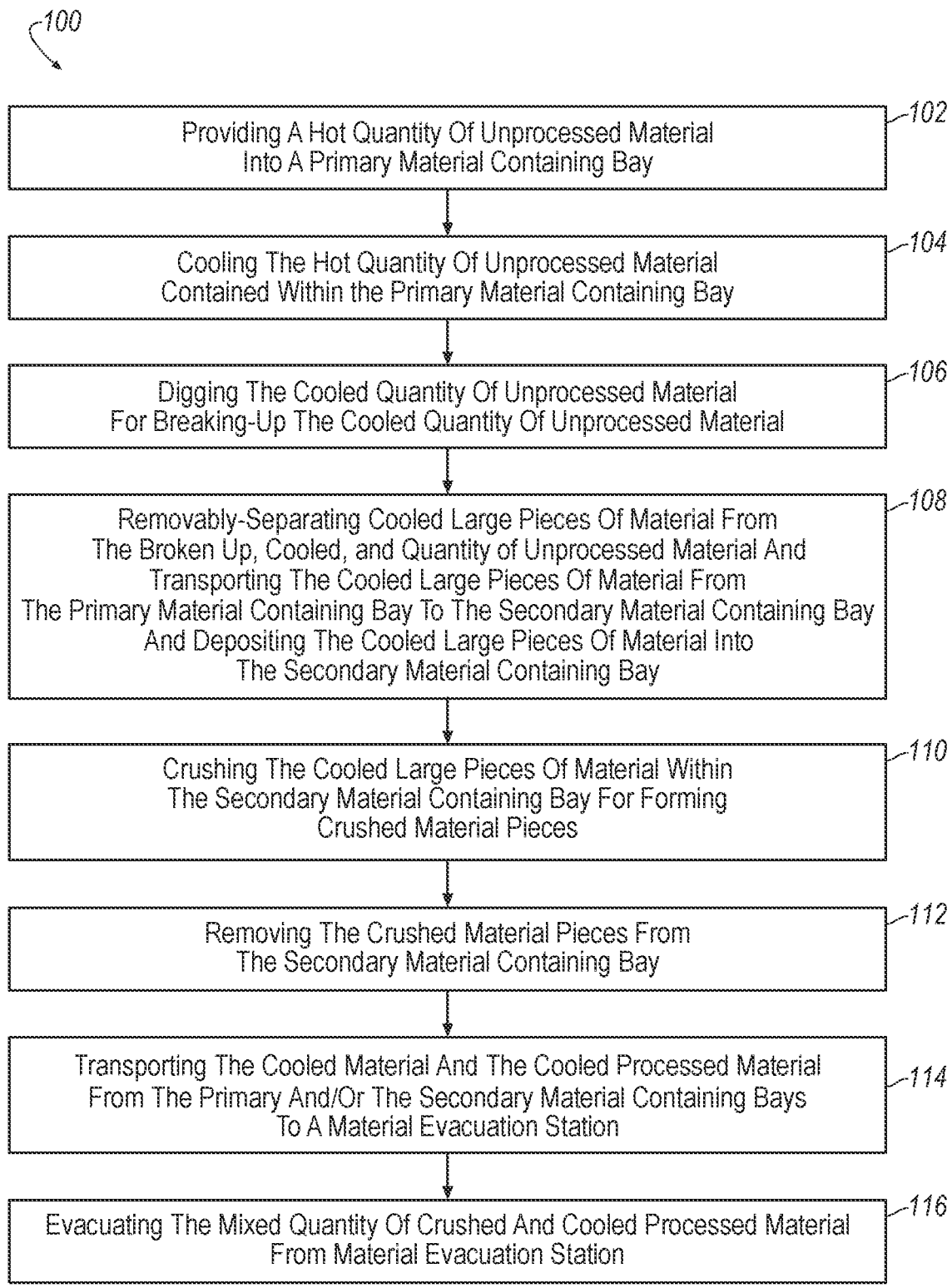
FIG. 5 illustrates an exemplary method for operating the system of FIGS. 1A-1R.

With reference to FIG. 5, a methodology 100, which may include, for example, steps 102-116, for utilizing the system 10 is now described. With reference to FIGS. 1A-1B, a quantity of unprocessed material M is initially transported by a slag pot carrier vehicle $V_1$ from a furnace (not shown) to a location on the field F proximate, for example, the primary material containing bay 20a of the material processing station 12. The pot carrier vehicle $V_1$ then loads or deposits 102 (see, e.g., FIGS. 1B and 2B) the quantity of unprocessed material M into the primary material containing bay 20a such that the system 10 may subsequently contain, handle, transport, and process the quantity of unprocessed material M into further processed material (see, e.g., $M_M$, $M_S$, $M_L$, $M_S+M_L$, $M_L'$).

The field F may be located proximate a metal recovery facility (not shown) including the furnace. The metal recovery facility produces slag aggregates while simultaneously recovering and upgrading the recovered metal. The quantity of unprocessed material M may be a co-product (e.g., slag) that typically results from steel production. In some instances, the quantity of unprocessed material M/co-product may be in a non-solidified/liquid or molten state exceeding, for example, 2000° F. (in some instances, the temperature of the quantity of unprocessed material M/co-product may be approximately equal to about, for example, 2300° F.). Because the quantity of unprocessed material M may significantly exceed room temperature (e.g., the quantity of unprocessed material M may exceed approximately about 23° C./73.4° F.), the quantity of unprocessed material M may be deemed to be very hot (see, e.g., 'wavy lines' H at FIGS. 1A-1D inferring heat).

Figure 5A:
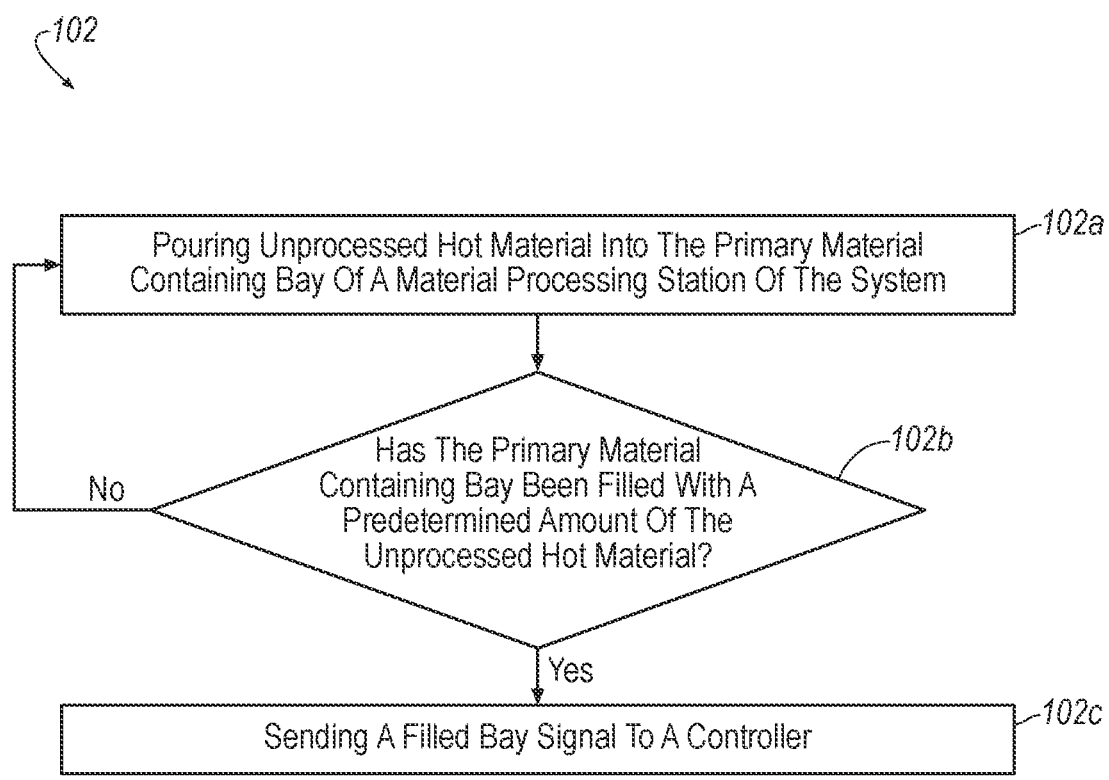

As seen at FIGS. 1A-1B and 2A-2B, the pot carrier vehicle $V_1$ retains a pot containing the hot H quantity of unprocessed material M that may be in, for example, a non-solidified/liquid or molten state. Upon arranging the pot carrier vehicle $V_1$ proximate, for example, the first primary material containing bay 20a, the pot carrier vehicle $V_1$ tilts the pot containing the hot H quantity of unprocessed material M for providing 102 (see, e.g., FIG. 5A) the non-solidified/liquid or molten quantity of unprocessed material M from the pot and into the first primary material containing bay 20a.

Figure 3A:
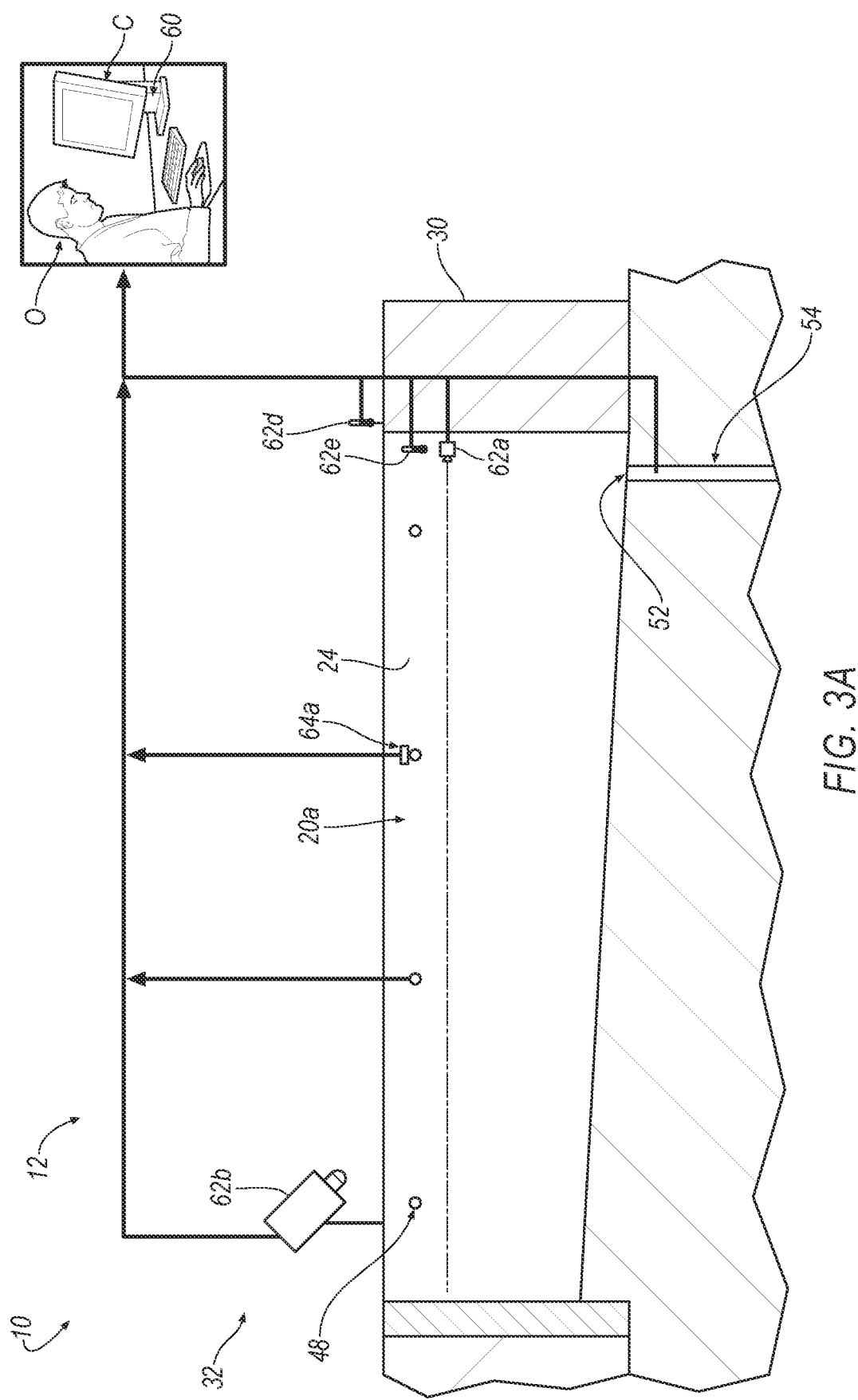
FIG. 3A is an enlarged view of a portion of the material processing system according to line 3A of FIG. 2A.
Figure 3B:
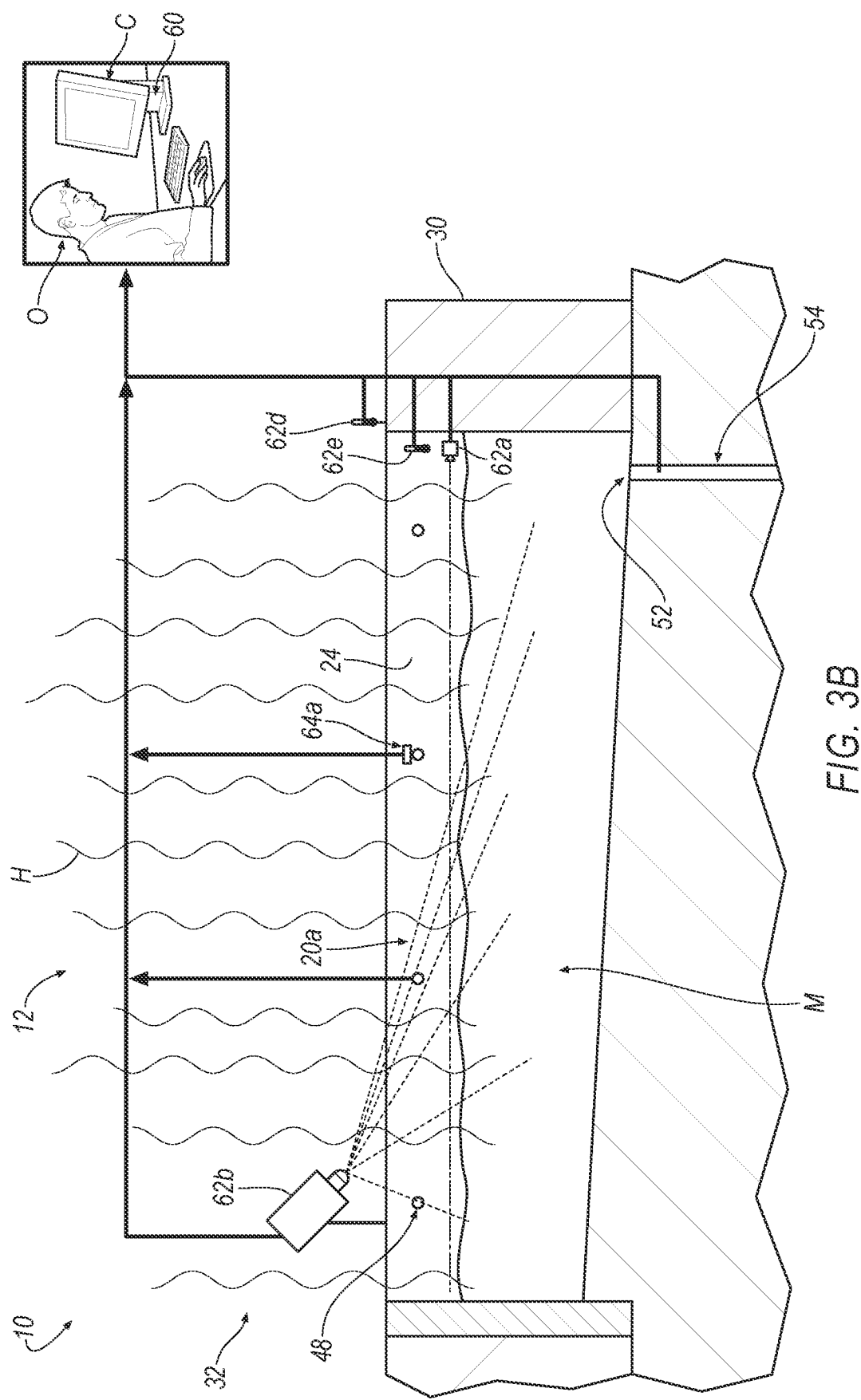
FIG. 3B is another enlarged view of the portion of the material processing system according to line 3B of FIG. 2B.
Figure 3C:
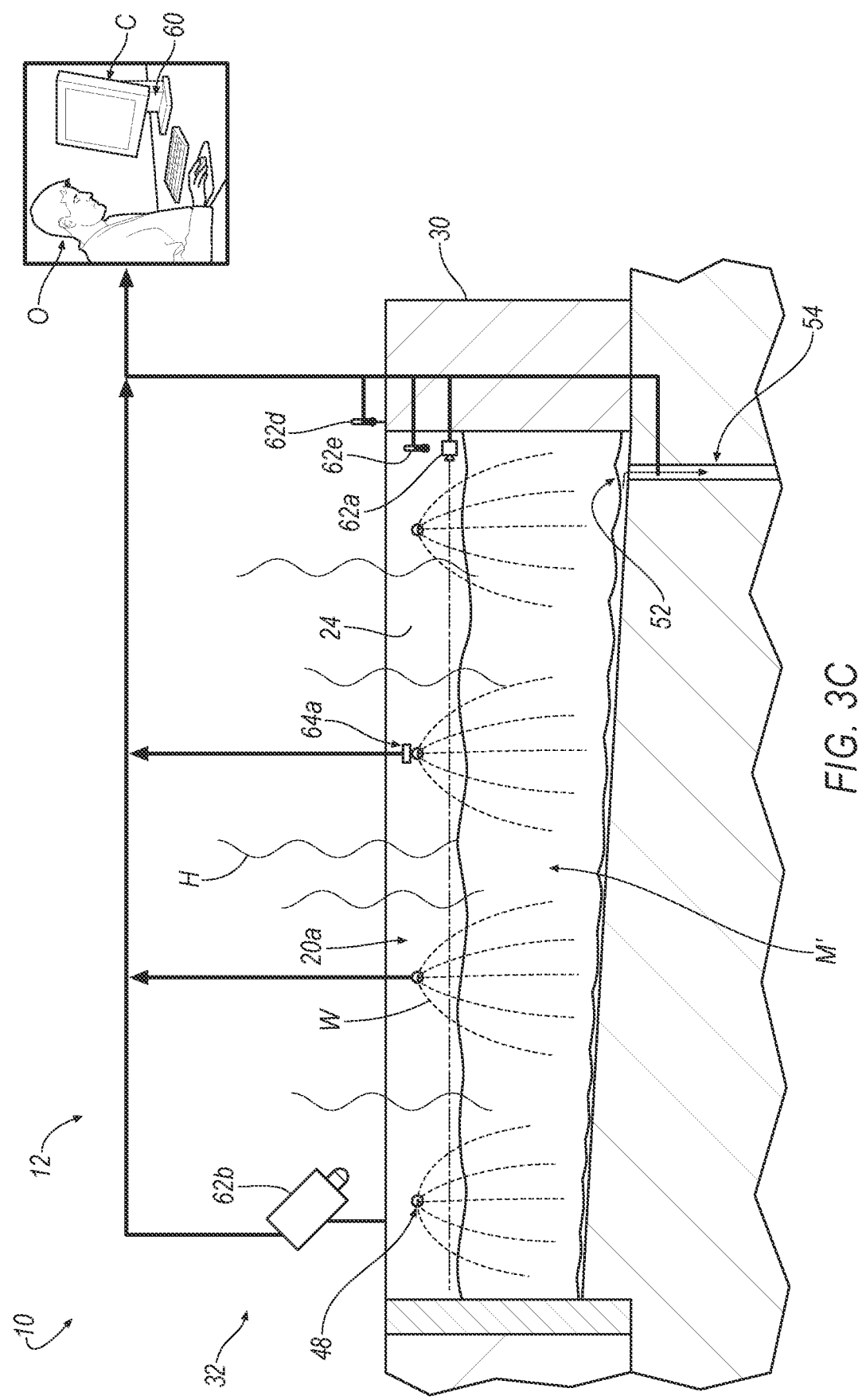
FIG. 3C is another enlarged view of the portion of the material processing system according to line 3C of FIG. 2D.
Figure 4:
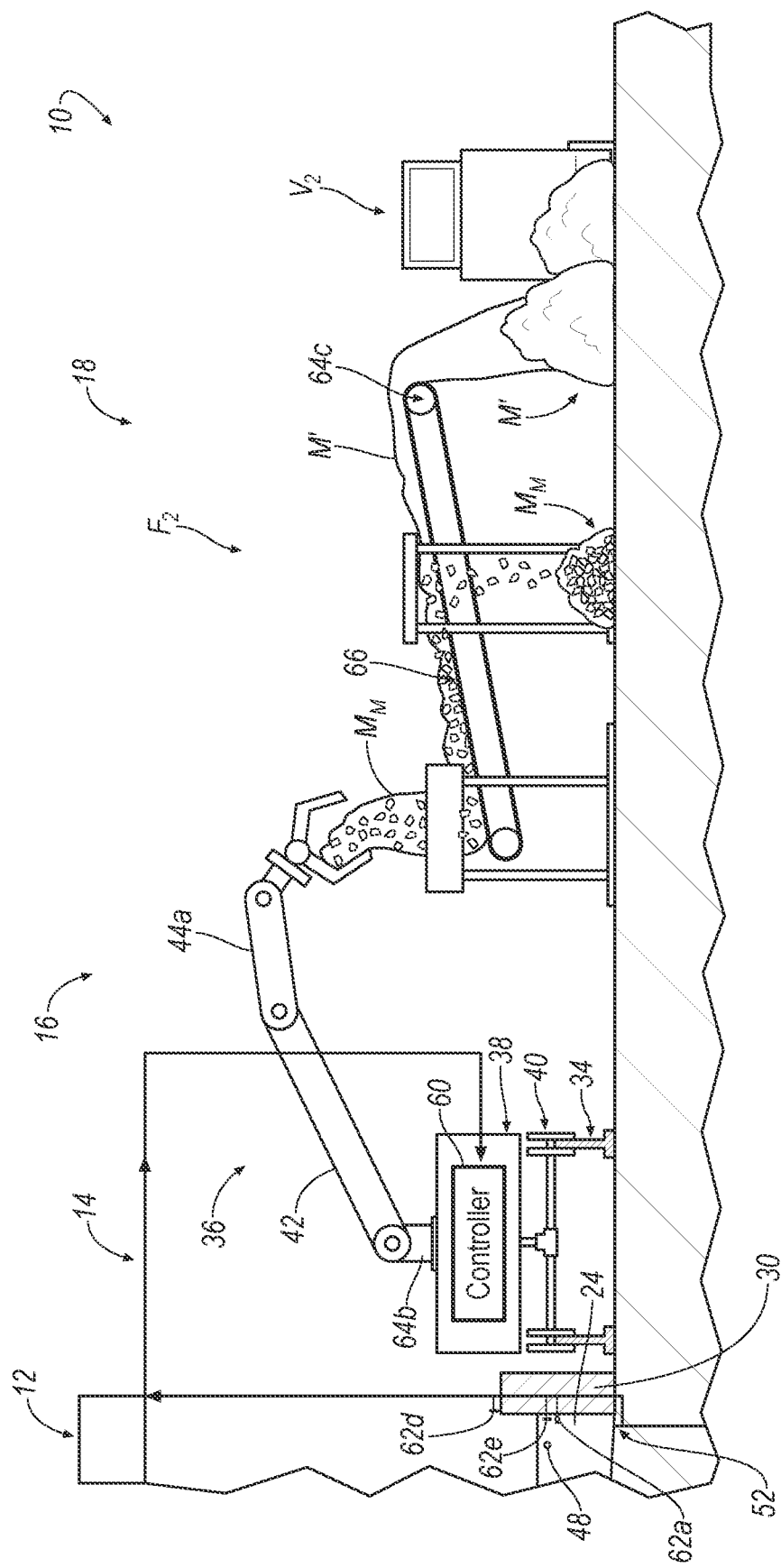
FIG. 4 is a side, partial cross-sectional view of the material processing system that correspond to FIGS. 1Q-1R and 2Q-2R.

The providing 102 step of the method 100 may further include steps associated with loading or pouring 102a the non-solidified/liquid or molten quantity of unprocessed material M. With reference to FIGS. 1B, 2B, and 3B, in some examples, a poured material sensor 62a (e.g., an optical sensor) of the plurality of sensors 62 scans the first primary material containing bay 20a for determining 102b if the first primary material containing bay 20a has been filled with a predetermined amount of the hot H quantity of unprocessed material M for instituting further processing of the hot H quantity of unprocessed material M. In an example, upon determining 102b that the first primary material containing bay 20a has been sufficiently filled with the predetermined amount of the hot H quantity of unprocessed material M, the poured material sensor 62a may send 102c a "filled bay" signal to the controller 60.

After the controller 60 has received the "filled bay" signal, the system 10 executes a first processing step 104 (see, e.g., FIG. $5B_1$, $5B_2$) for processing the hot H quantity of unprocessed material M. In some examples, the first processing step may include the step of cooling 104 the hot H quantity of unprocessed material M by one or more of atmospherically cooling (see, e.g., FIG. $5B_1$) and quenching or spraying water W (see, e.g., FIG. $5B_2$) on the hot H quantity of unprocessed material M.

Referring to FIGS. 1B-1D and 2B-2D, the act of cooling 104 the hot H quantity of unprocessed material M is graphically inferred by the dissipation of 'wavy lines' H that infers "heat" associated with the hot H quantity of unprocessed material M. With reference to FIG. 1B, the taller or higher 'wavy lines' H seen rising from the hot H quantity of unprocessed material M that is located within the first primary material containing bay 20a may infer that the hot H quantity of unprocessed material M has not yet been cooled 104. With reference to FIGS. 1C and 1D, the comparatively shorter 'wavy lines' H (with respect to taller or longer 'wavy lines' H of FIG. 1B) seen rising from the hot H quantity of unprocessed material M that is located within the first primary material containing bay 20a may infer that the hot H quantity of unprocessed material M has been at least partially cooled 104 to the desired predetermined temperature (e.g., less than about 200° F.). As seen at FIG. 1E, an absence or lack of 'wavy lines' H rising from a cooled quantity of partially processed material that is located within the first primary material containing bay 20a may infer that the H quantity of unprocessed material M was sufficiently cooled 104 to the desired predetermined temperature.

In some examples, the first processing step of cooling 104 the hot H quantity of unprocessed material M with sprayed water W may be defined by quenching $104_2$ (see, e.g., FIG. $5B_2$) the hot H quantity of unprocessed material M with a predetermined amount of water W (e.g., in terms of, e.g., gallons or liters). In another example, the cooling 104 of the hot H quantity of unprocessed material M with quenched $104_2$ water W may be defined by the controller 60 providing a period of time that a sprinkler system 48 is actuated for quenching $104_2$ an undetermined amount of water W upon the hot H quantity of unprocessed material M. In yet another example, the cooling 104 of the hot H quantity of unprocessed material M with quenched $104_2$ water W may be defined by sensing a temperature of the hot H quantity of unprocessed material M that exceeds the predetermined temperature and actuating the sprinkler system 48 for quenching $104_2$ water W upon the hot H quantity of unprocessed material M until a subsequently detected temperature of the hot H quantity of unprocessed material M has been cooled 104 to a temperature that is approximately equal to or less than the predetermined temperature.

Although the hot H quantity of unprocessed material M may be quenched $104_2$ with water W that may be sourced from a well or city water, the hot H quantity of unprocessed material M may be alternatively quenched $104_2$ with or exposed to atmospheric precipitation (e.g., rain water, humidity, or snow). As will be described in the following disclosure, a controller 60 may algorithmically take into account an amount (e.g., in terms of, e.g., gallons or liters) or a period of time that water W has been quenched $104_2$ upon the hot H quantity of unprocessed material M. In other examples, the controller 60 may algorithmically take into account the mass or weight of the quantity of unprocessed material M loaded into one or more of the plurality of primary material containing bays 20a-20h for calculating or determining an amount of water W (e.g. 0 gallons to 500 gallons) per, for example, ton of the unprocessed material M loaded into one or more of the plurality of primary material containing bays 20a-20h. The mass or weight of the quantity of unprocessed material M may be determined by, for example, a scale (not shown) associated with one or more of the vehicle pot carrier vehicle $V_1$ or one or more of the plurality of primary material containing bays 20a-20h.

In yet other instances, further processing 104 conducted on the hot H quantity of unprocessed material M includes a combination of atmospherically cooling $104_1$ (see, e.g., FIG. $5B_1$) the hot H quantity of unprocessed material M and quenching $104_2$ (see, e.g., FIG. $5B_2$) water W on the hot H quantity of unprocessed material M. Accordingly, in some examples, the step of cooling 104 the hot H quantity of unprocessed material M may include firstly atmospherically cooling 104$_1$ the hot H quantity of unprocessed material M utilizing any of the exemplary steps described above and then secondly quenching 104$_2$ water W upon the hot H quantity of unprocessed material M utilizing any of the exemplary steps described above. In other examples, the step of cooling 104 the hot H quantity of unprocessed material M may include firstly quenching 104$_2$ water W upon the hot H quantity of unprocessed material M utilizing any of the exemplary steps described above and then secondly atmospherically cooling 104$_1$ the hot H quantity of unprocessed material M utilizing any of the exemplary steps described above.

With continued reference to FIGS. 1B-1D and 2B-2D, in some examples, cooling 104 (see, e.g., FIG. 5B$_1$ and/or 5B$_2$) the hot H quantity of unprocessed material M within the first primary material containing bay 20a of the plurality of primary material containing bays 20a-20h may include one or more of the following steps. In some examples, cooling 104 the hot H quantity of unprocessed material M may include, for example, atmospherically cooling 104$_1$ (FIG. 5B$_1$) the hot H quantity of unprocessed material M. In other implementations, cooling 104 the hot H quantity of unprocessed material M may include, for example, quenching 104$_2$ (FIG. 5B$_2$) the hot H quantity of unprocessed material M with water W. In yet other implementations, cooling 104 the hot H quantity of unprocessed material M may include, for example, a combination of atmospherically cooling 104$_1$ and quenching 104$_2$ the hot H quantity of unprocessed material M.

Referring to FIG. 5B$_1$, atmospherically cooling 104$_1$ the hot H quantity of unprocessed material M of the cooling step 104 may include one or more of the following steps. In some examples, firstly, the controller 60 may: (1) send a signal 104a$_{1_A}$ to the atmospheric temperature sensor 62d (see, e.g., FIG. 3B) of the plurality of sensors 62 arranged at least proximate the first primary material containing bay 20a for requesting the ambient temperature where the system 10 is geographically located; and/or (2) send a signal 104a$_{1_B}$ to a material temperature sensor 62e (see, e.g., FIG. 3B) of the plurality of sensors 62 arranged at least proximate the first primary material containing bay 20a for requesting the temperature of the hot H quantity of unprocessed material M within the first primary material containing bay 20a.

If, for example, the atmospheric temperature sensor 62d detects 104a$_{2_A}$ an ambient temperature of 37.8° C./100.0° F. (e.g., a hot summer day), the atmospheric temperature sensor 62d may communicate 104a$_{3_A}$ the detected atmospheric temperature back to the controller 60 such that the controller 60 may calculate 104b a period of time for atmospherically cooling 104$_1$ the hot H quantity of unprocessed material M. If, for example, the atmospheric temperature sensor 62d detects 104a$_{2_A}$ an ambient temperature of 0.0° C./32.0° F. (e.g., a cold winter day), the controller 60 may calculate 104b a shorter period of time for atmospherically cooling 104$_1$ the hot H quantity of unprocessed material M (in comparison to a higher detected temperature of 37.8° C./100.0° F. as explained above).

Additionally, the material temperature sensor 62e may detect 104a$_{2_B}$ and then communicate 104a$_{3_B}$ the detected hot H quantity of unprocessed material M temperature back to the controller 60 such that the controller 60 may calculate 104b a period of time for atmospherically cooling 104$_1$ the hot H quantity of unprocessed material M. After the period of time has been calculated 104b, the controller 60 sets 104c a timer associated with the controller 60 and then subsequently starts 104d the timer to permit atmospheric cooling 104$_1$ of the hot H quantity of unprocessed material M for a predetermined period of time.

Upon the controller 60 determining 104e that the timer reaches zero seconds, the controller 60 sends a follow-up signal 104f to the material temperature sensor 62e for detecting the temperature of the atmospherically cooled 104$_1$ hot H quantity of unprocessed material M such that the controller 60 may determine 104g if the atmospherically cooled 104$_1$ hot H quantity of unprocessed material M has been atmospherically cooled 104$_1$ to a predetermined temperature. If the controller 60 determines 104g that the atmospherically cooled 104$_1$ hot H quantity of unprocessed material M has been atmospherically cooled 104$_1$ to the predetermined temperature, the atmospherically cooling 104$_1$ methodology ends 104h. However, if the controller 60 determines 104g that the atmospherically cooled 104$_1$ hot H quantity of unprocessed material M has not been atmospherically cooled 104$_1$ to the predetermined temperature, the atmospherically cooling methodology 104$_1$ is returned to steps 104a$_{1_A}$, 104a$_{1_B}$.

Referring FIG. 5B$_2$, quenching 104$_2$ the hot H quantity of unprocessed material M with water W of the cooling step 104 may include one or more of the following steps. In some examples, after either of the communicating 104a$_{3_A}$ the ambient temperature and/or communicating 104a$_{3_B}$ the temperature of the hot H quantity of unprocessed material M to the controller 60 as described above, the controller 60 may then determine, calculate or monitor water quenching data 104i and subsequently limit (see, e.g., steps 104n, 104q) an amount of water W that quenches the hot H quantity of unprocessed material M.

In some instances, at step 104i, the controller 60 may calculate 104i water quenching data by determining how long an actuator 64 (e.g., a valve at FIG. 3B) of the plurality of actuators 64 should be actuated (see, e.g., steps 104k-104l). In an example, the valve 64a may be connected to a component of or is otherwise associated with the sprinkler system 48. Accordingly, upon determining 104i how long the valve 64a should be actuated (i.e., opened), the controller 60 may send 104j a signal to the valve 64a for transitioning 104k the valve 64a from a closed orientation (see, e.g., FIG. 3B) to an open orientation (see, e.g., FIG. 3C) in order to permit water W to be communicated from the water reservoir 46, through the water source pipe 50, and out of the sprinkler system 48 for spraying 104l the water W upon the hot H quantity of unprocessed material M. Once the amount of time that the valve 64a should be opened has lapsed 104l', the controller 60 sends a signal to the valve 64a for transitioning 104m the valve 64a from the opened orientation (see, e.g., FIG. 3C) back to the closed orientation (see, e.g., FIG. 3D) for ceasing 104n spraying of the water W from the sprinkler system 48. The method may then be advanced to step 104p.

In other instances, the controller 60 does not calculate water quenching data for determining a period of time that the valve 64a is to be transitioned 104k from the closed orientation to the open orientation. Rather, in some instances, in response to the controller 60 obtaining temperature data (see, e.g., one or both of steps 104a$_{3_A}$, 104a$_{3_B}$), the quenching 104$_2$ method includes determining 104i that the temperature of the hot H quantity of unprocessed material M is greater than a predetermined temperature and thereafter the controller 60 may send a signal 104j for transitioning 104k the valve 64a from the closed orientation to the open orientation for an undetermined period of time in order to permit water W to be communicated from the water reservoir 46, through the water source pipe 50, and out of the sprinkler system 48 for spraying 104*l* the water W upon the hot H quantity of unprocessed material M.

After the valve 64*a* is returned to the closed orientation 104*m* for ceasing 104*n* flow of the water W from the sprinkler system 48 at as described in either of the exemplary methodologies above, the quenching method 104$_2$ is advanced to step 104*p* whereby the material temperature sensor 62*e* may detect and then communicate the detected hot H quantity of unprocessed material M temperature back to the controller 60 such that the controller 60 may determine if the sprinkler system 48 should further quench the hot H quantity of unprocessed material M with more water W as described above in order to further cool the hot H quantity of unprocessed material M to the predetermined temperature. If the controller 60 determines 104*p* that the water cooled hot H quantity of unprocessed material M has been quenched and cooled to the predetermined temperature, the quench cooling methodology 104$_2$ is advanced from step 104*p* to step 104*m* where the quenching methodology 104$_2$ is ceased. However, if the controller 60 determines 104*p* that the water cooled hot H quantity of unprocessed material M has not been quench cooled to the predetermined temperature, the quench cooling methodology 104$_2$ is returned to step 104*j* to permit continued spraying of water W on the hot H quantity of unprocessed material M.

Although the water W associated with quenching 104$_2$ the hot H quantity of unprocessed material M is sourced from the water reservoir 46 as described above, the water W may be obtained from other sources. In an example, the water W may be obtained naturally from atmospheric precipitation such as, for example, rain water, snow, or humidity. Accordingly, in such circumstances when the system 10 is exposed to the elements (e.g., rain water), the controller 60 may optionally not operate (i.e. open or close) the valve 64*a*. Accordingly, in such circumstances, the controller 60 may send a signal to the vehicle 36 for placing the lid 59 that may at least partially cover the first primary material containing bay 20*a*; alternatively, the controller 60 may send a signal to a lid actuator (not shown) associated with driving movement of a bay lid (not shown) that may at least partially cover the first primary material containing bay 20*a*. Accordingly, by arranging 104*q* the lid (e.g., the lid 59 or the bay lid) over the first primary material containing bay 20*a*, the lid (e.g., the lid 59 or the bay lid) may at least partially prevent rain water or snow from contacting the hot H quantity of unprocessed material M if it is determined by the controller 60 that a predetermined amount of atmospherically-sourced water flows through, for example, a water flow sensor or by receiving an amount of rainfall or snowfall from a weather report. Thereafter, the quenching method 104$_2$ may be returned to step 104*p* in order to determine if the atmospherically-sourced water has cooled the hot H quantity of unprocessed material M to the predetermined temperature; if the hot H quantity of unprocessed material M has not been cooled to the predetermined temperature, the quenching method 104$_2$ may be returned to step 104*q* whereby the bay lid or lid 59 is removed from the first primary material containing bay 20*a* in order to permit the rain or snow to continue cooling the hot H quantity of unprocessed material M. If, however, a weather pattern changes such that the rain or snow ceases, step 104*q* may return to step 104*j* for sourcing water W from the sprinkler 48 for cooling the hot H quantity of unprocessed material M.

Furthermore, as seen at FIGS. 1F-1K and 2F-2K, sometime during or after loading and processing (e.g., cooling 104) the hot H quantity of unprocessed material M within the first primary material bay 20*a*, the remaining primary material bays 20*b*-20*h* of the plurality of primary material containing bays 20*a*-20*h* may be similarly successively filled with quantities of hot H unprocessed material M, and, over a period of time, may be similarly cooled 104, which results in a similar graphical dissipation of 'wavy lines' H for inferring cooling 104 of the "hot" H quantities of unprocessed material M. The period of time for cooling 104 the hot H quantity of material M loaded into any of the plurality of primary material containing bays 20*a*-20*h* may be, for example, less than one day (i.e., less than twenty-four (24) hours); in other examples, the period of time for cooling 104 the hot H quantity of material M to a predetermined temperature (e.g., less than about 200° F.) may be equal to or less than approximately about twelve (12) hours.

Figure 2E:
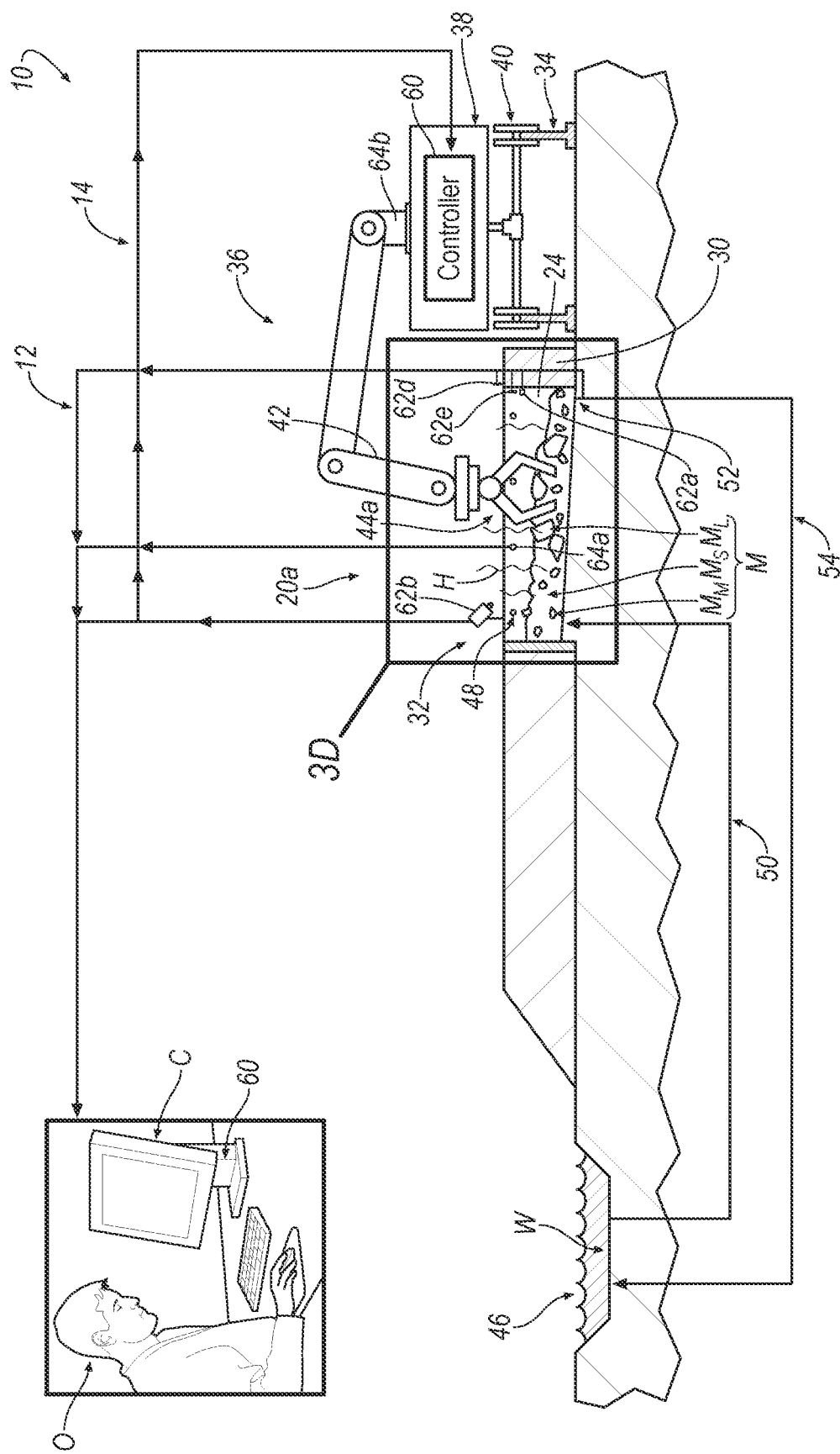
Figure 3D:
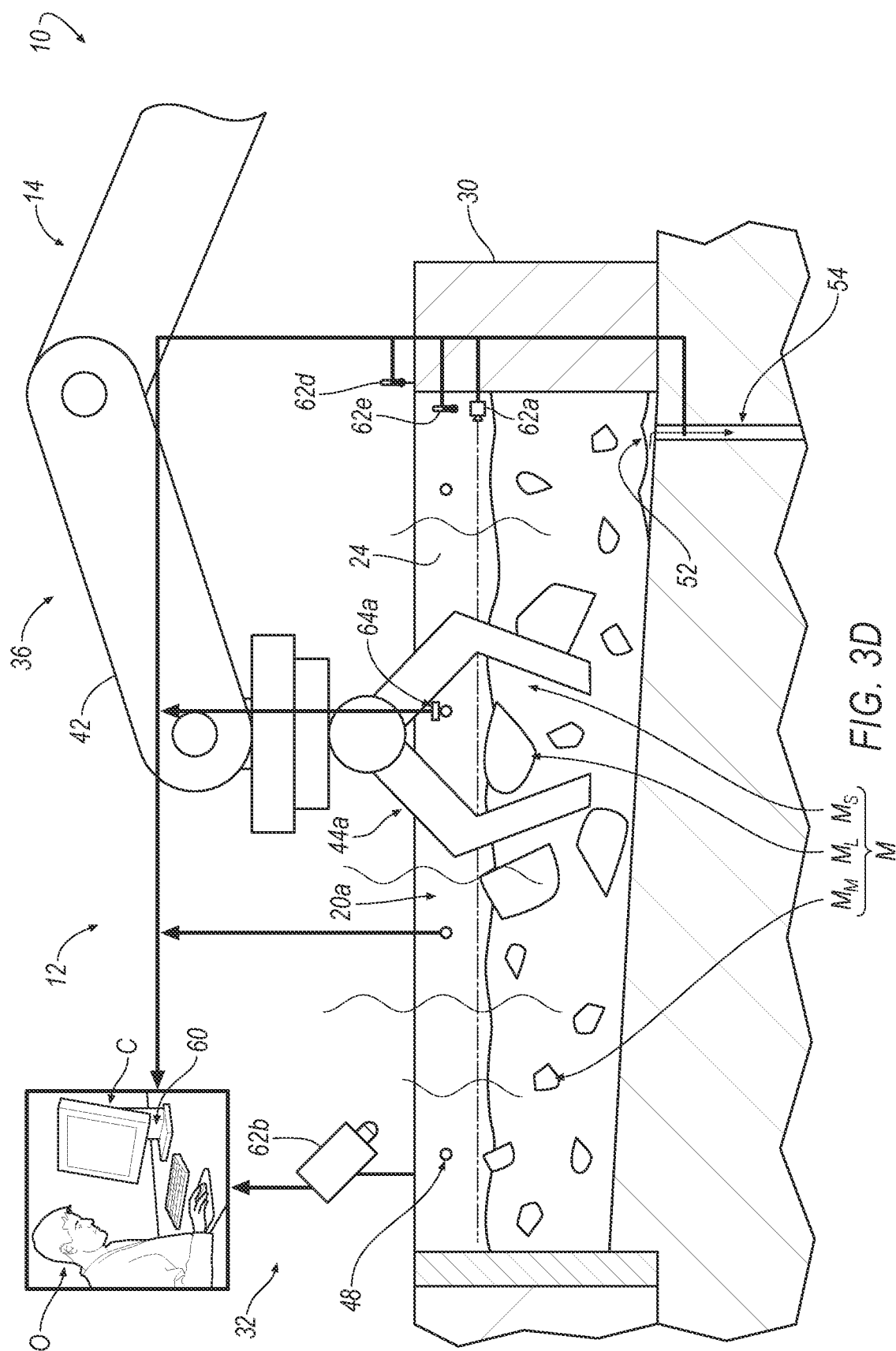
FIG. 3D is another enlarged view of the portion of the material processing system according to line 3D of FIG. 2E.
Figure 5C:
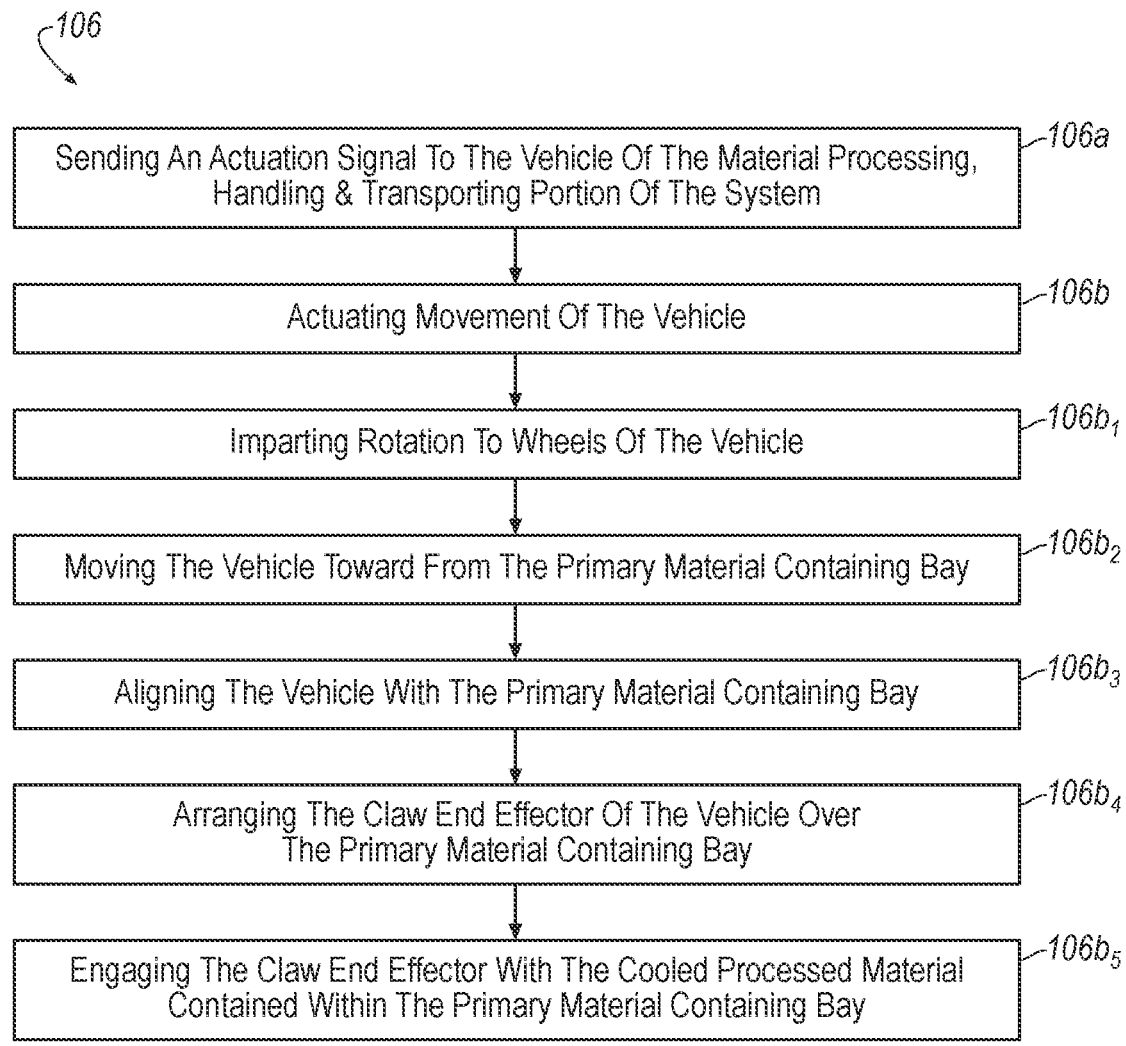

With reference to FIGS. 1E, 2E, and 3D, once the material temperature sensor 62*e* has detected that the hot H quantity of unprocessed material M has been sufficiently cooled 104 to the desired predetermined temperature, the material temperature sensor 62*e* sends a signal to the controller 60 for advancing the method 100 to a "digging" 106 step (see, e.g., FIG. 5C). Accordingly, the hot H quantity of unprocessed material M may be referred to as a "cooled quantity of partially processed material" that is contained within the first primary material containing bay 20*a*. In some instances, as seen at FIG. 3D the cooled quantity of partially processed material M will no longer be in a non-solid or liquid state (i.e., the cooled quantity of partially processed material M may be a solidified mass contained within the first primary material containing bay 20*a*). Accordingly, as seen at FIG. 3D, the digging 106 step may include the act of "digging" or "breaking up" the cooled quantity of partially processed material M for breaking down the cooled quantity of partially processed material M into differently sized pieces of material (see, e.g., $M_S$, $M_L$).

Prior to describing the digging 106 step, reference is made to FIGS. 1E, 2E, and 3D where exemplary aspects of the vehicle 36 is further described. As seen at FIG. 1E, the arm portion 42 of the vehicle 36 may be defined by a distal end 42D that includes a coupling magnet that permits, for example, each of the grapple end effector portion 44*a* and the drop ball end effector portion 44*b* to be selectively coupled to or selectively-decoupled from the arm portion 42 of the vehicle 36. Operation of the coupling magnet associated with the distal end 42D of the arm portion 42 of the vehicle 36, which may include selective de/coupling of the end effector portions 44*a*, 44*b* may be conducted manually (e.g., by the operator O operating a switch or lever), automatically (as a result of, e.g., signals sent to the vehicle 36 from the controller 60), or a combination of manual and automatic control.

Referring to FIGS. 1E, 2E, and 3D, in some examples, upon the controller 60 receiving the signal from the material temperature sensor 62*e* indicating that the hot H quantity of unprocessed material M has been sufficiently cooled 104 to the desired predetermined temperature, the controller 60 initiates the "digging" 106 step by sending 106*a* an actuation signal to the electric motor 64*b* of the vehicle 36 for actuating movement 106*b* of one or more of the body portion 38, the plurality of wheels 40, the arm portion 42. Responsive to the sent 106*a* actuation signal, the electric motor 64*b* of the vehicle 36 imparts rotation 106$b_1$ to the plurality of wheels 40 for moving 106$b_2$ (see, e.g., FIGS. 1D-1E and 2D-2E) the vehicle 36 (with the grapple end effector portion 44*a* magnetically attached to the distal end 42D of the arm portion 42) proximate the first primary material containing bay 20*a*; aligning 106$b_3$ (see, e.g., FIGS. 1E and 2E) the vehicle 36 with the first primary material containing bay 20a; arranging 106b₄ the arm portion 42 of the vehicle 36 over the first primary material containing bay 20a; and subsequently "digging" or breaking-up 106b5 (see, e.g., FIGS. 1E, 2E and 3D) the cooled quantity of partially processed material M with the grapple end effector portion 44a for reducing the substantially solidified mass of the cooled quantity of partially processed material M into differently-sized pieces (e.g., small pieces and large pieces) of cooled material $M_S$, $M_L$ (noting that pieces of magnetic material $M_M$ may also be included within the cooled quantity of partially processed material M and may be optionally magnetically separated as seen at FIGS. 1Q-1R and 2Q-2R). The differently-sized pieces of cooled material $M_S$, $M_L$ may include, for example: a first portion of cooled material $M_S$ defined by cooled small material pieces; and a second portion of cooled material $M_L$ defined by cooled large material pieces. Because the cooled small material pieces $M_S$ and the cooled large material pieces $M_L$ are contained together within the first primary material containing bay 20a, collectively, the cooled small material pieces $M_S$ and the cooled large material pieces $M_L$ may be referred to as a mixed quantity of cooled, partially processed material $M_S+M_L$.

During and/or after the "digging" 106 step, the material classification locating sensor 62b (e.g., an optical sensor) of the plurality of sensors 62 arranged at least proximate the first primary material containing bay 20a may periodically or constantly scan the mixed quantity of cooled, partially processed material $M_S+M_L$ and send signals to the controller 60 representative of the imaged mixed quantity of cooled, partially processed material $M_S+M_L$. The controller 60 may contain software that analyzes the mixed quantity of cooled, partially processed material $M_S+M_L$ for determining if a sufficient amount of cooled large material pieces $M_L$ are represented within the mixed quantity of cooled, partially processed material $M_S+M_L$ for advancing the method 100 to the next step.

Figure 2F:
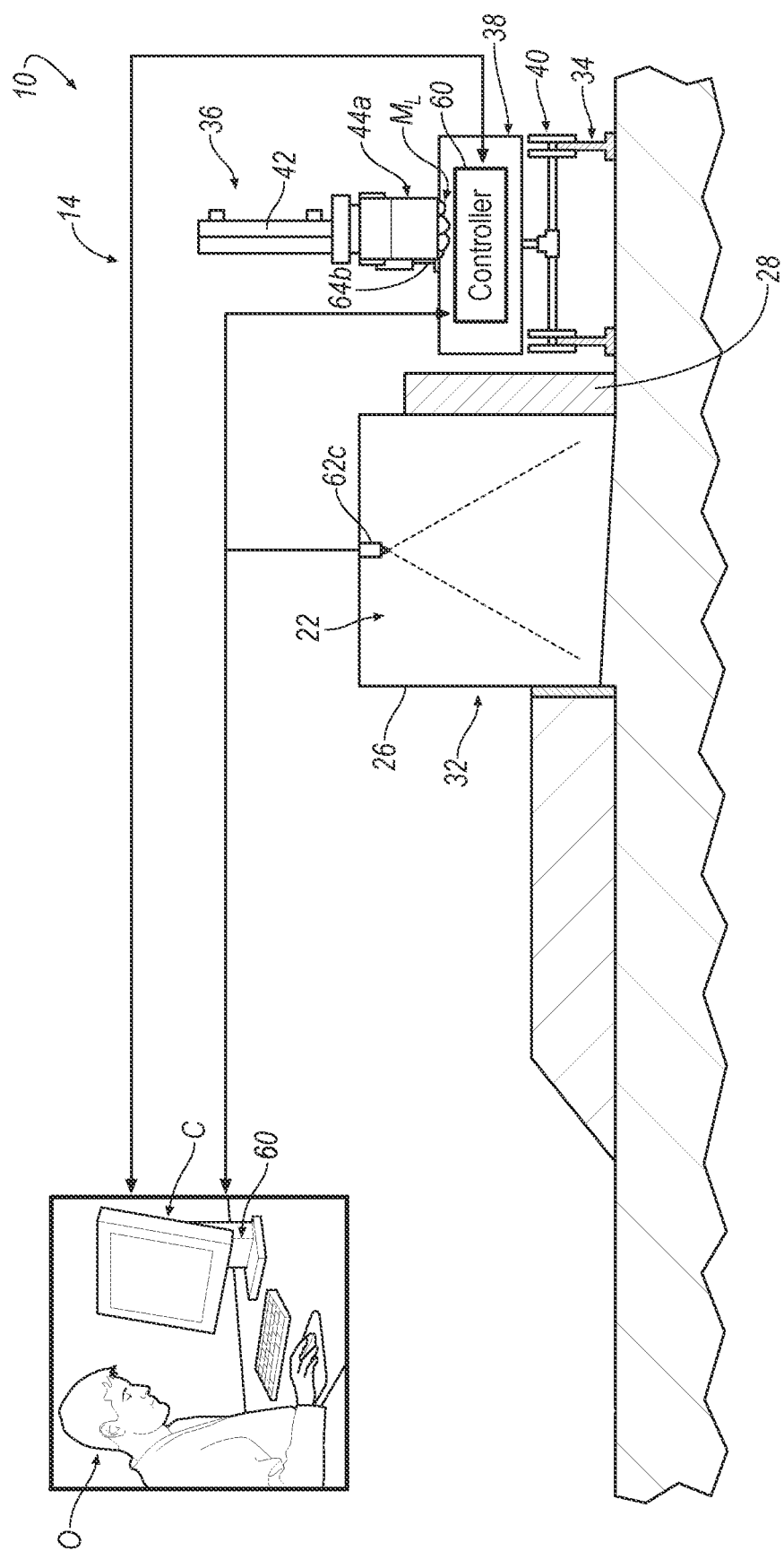
Figure 5D:
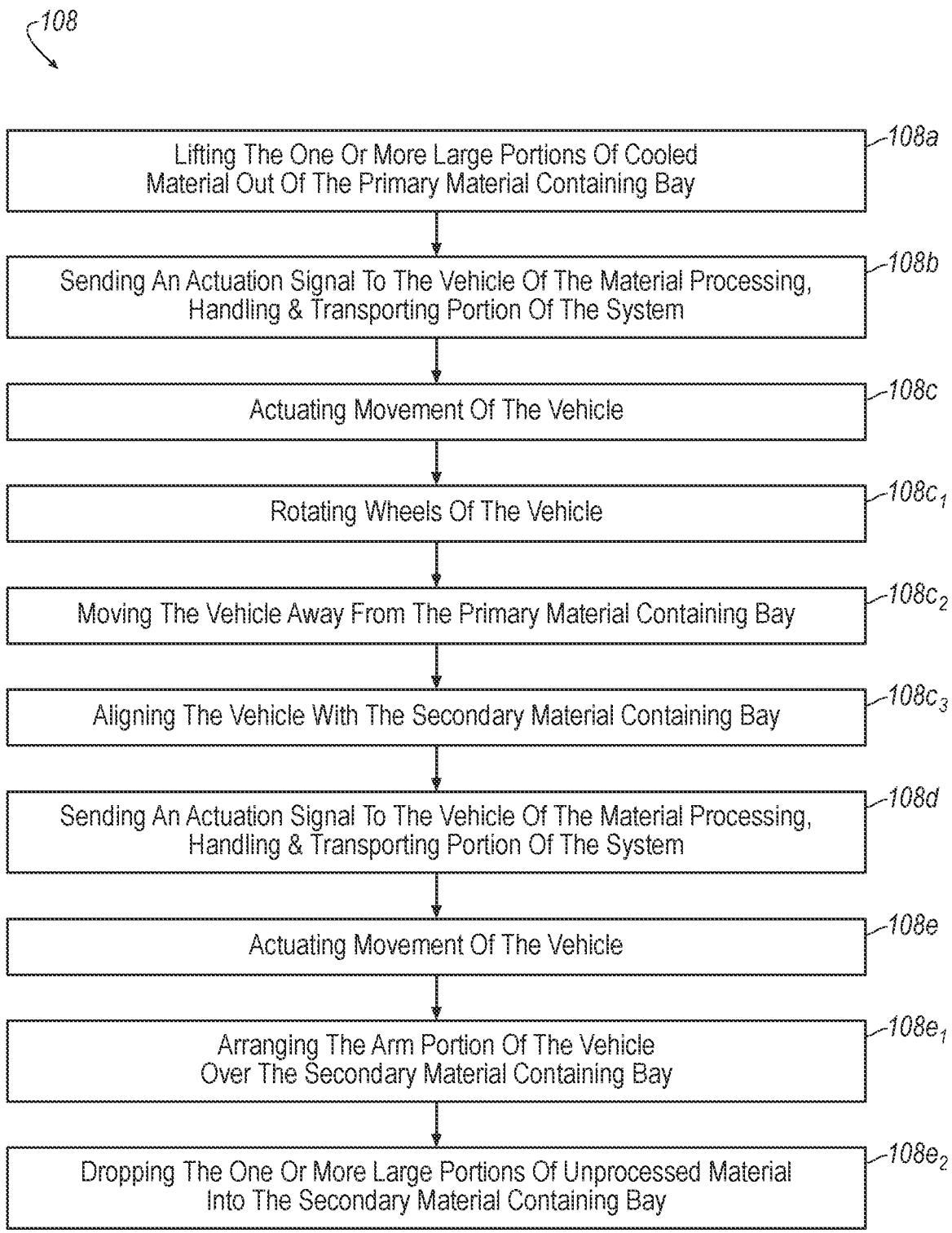

Referring to FIGS. 1F and 2F, in some examples, the method 100 may further include the step of removably-transporting 108 (see, e.g., FIG. 5D) the cooled large material pieces $M_L$ from the first primary material containing bay 20a of the plurality of primary material containing bays 20a-20h toward the one secondary material containing bay 22. In some examples, after lifting 108a the cooled large material pieces $M_L$ out of the first primary material containing bay 20a, the controller 60 sends 108b an actuation signal to the electric motor 64b of the vehicle 36 for actuating movement 108c of one or more of the body portion 38, the plurality of wheels 40, the arm portion 42, and the grapple end effector portion 44a of the vehicle 36. Responsive to the sent 108b actuation signal, the electric motor 64b of the vehicle 36 imparts rotation $108c_1$ to the plurality of wheels 40 for moving $108c_2$ the vehicle 36 away from the first primary material containing bay 20a of the plurality of primary material containing bays 20a-20h and toward the one secondary material containing bay 22 for aligning $108c_3$ (see, e.g., FIG. 1F) the vehicle 36 with the one secondary material containing bay 22.

Figure 2G:
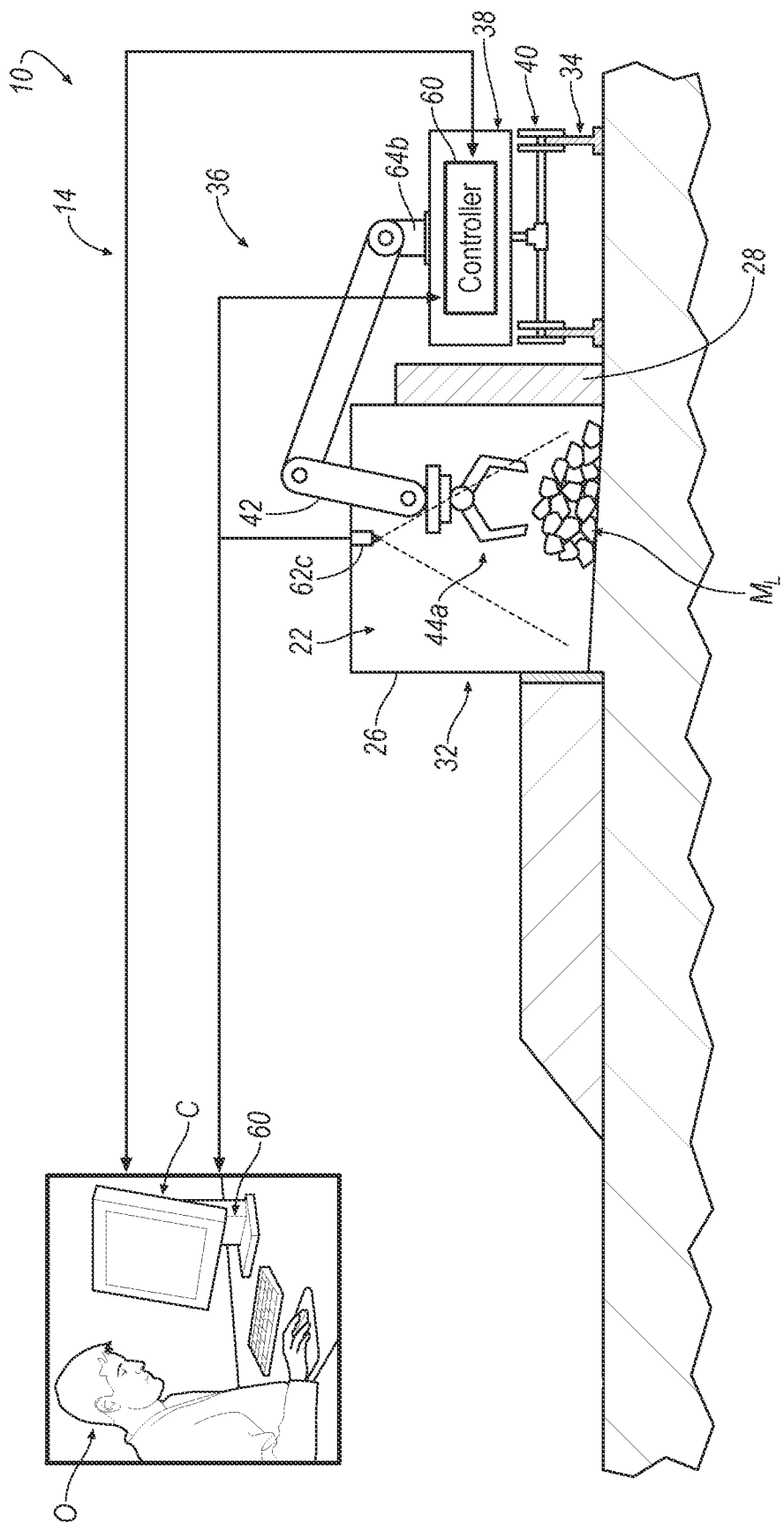
Figure 2H:
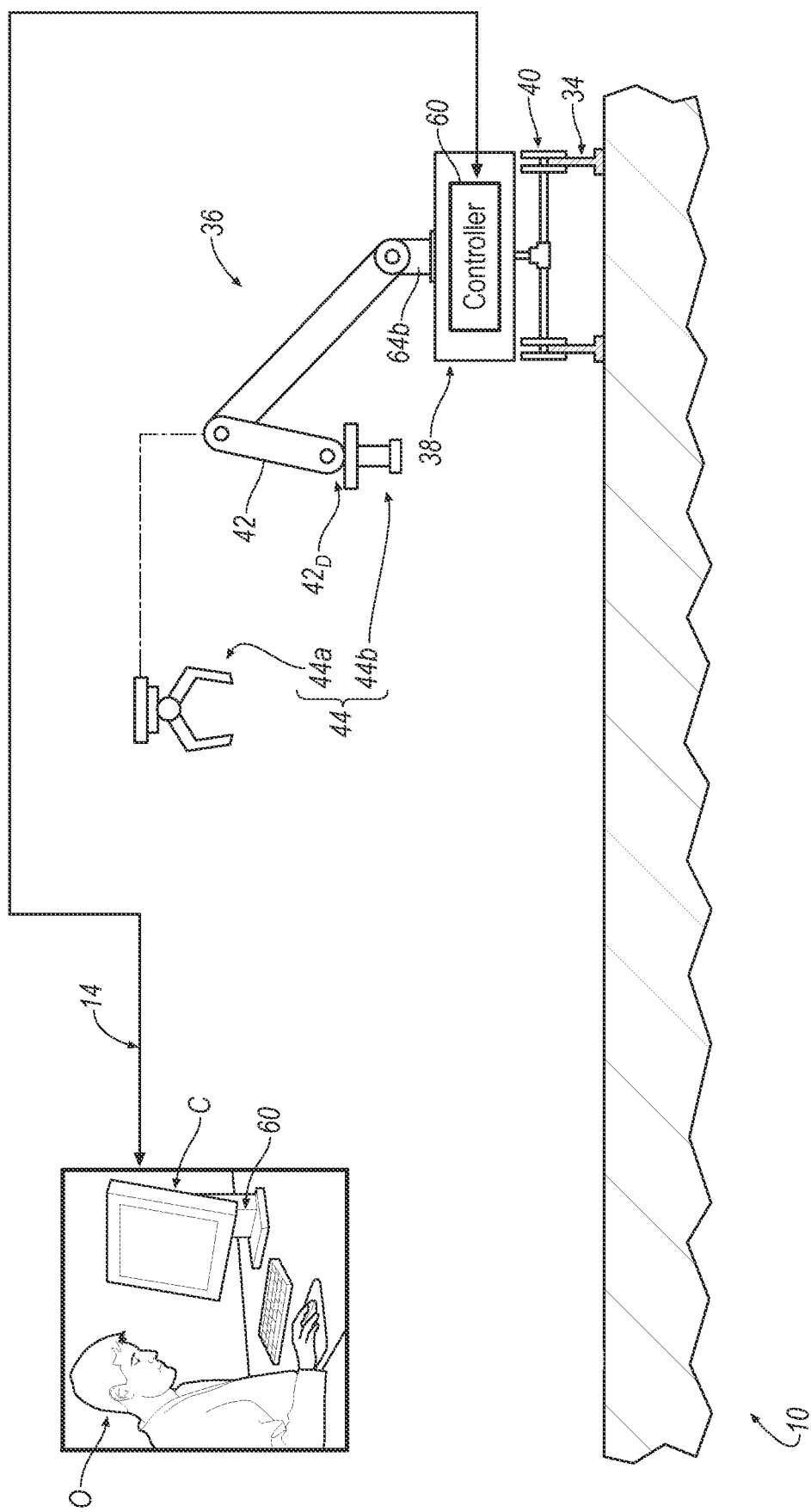
Figure 2I:
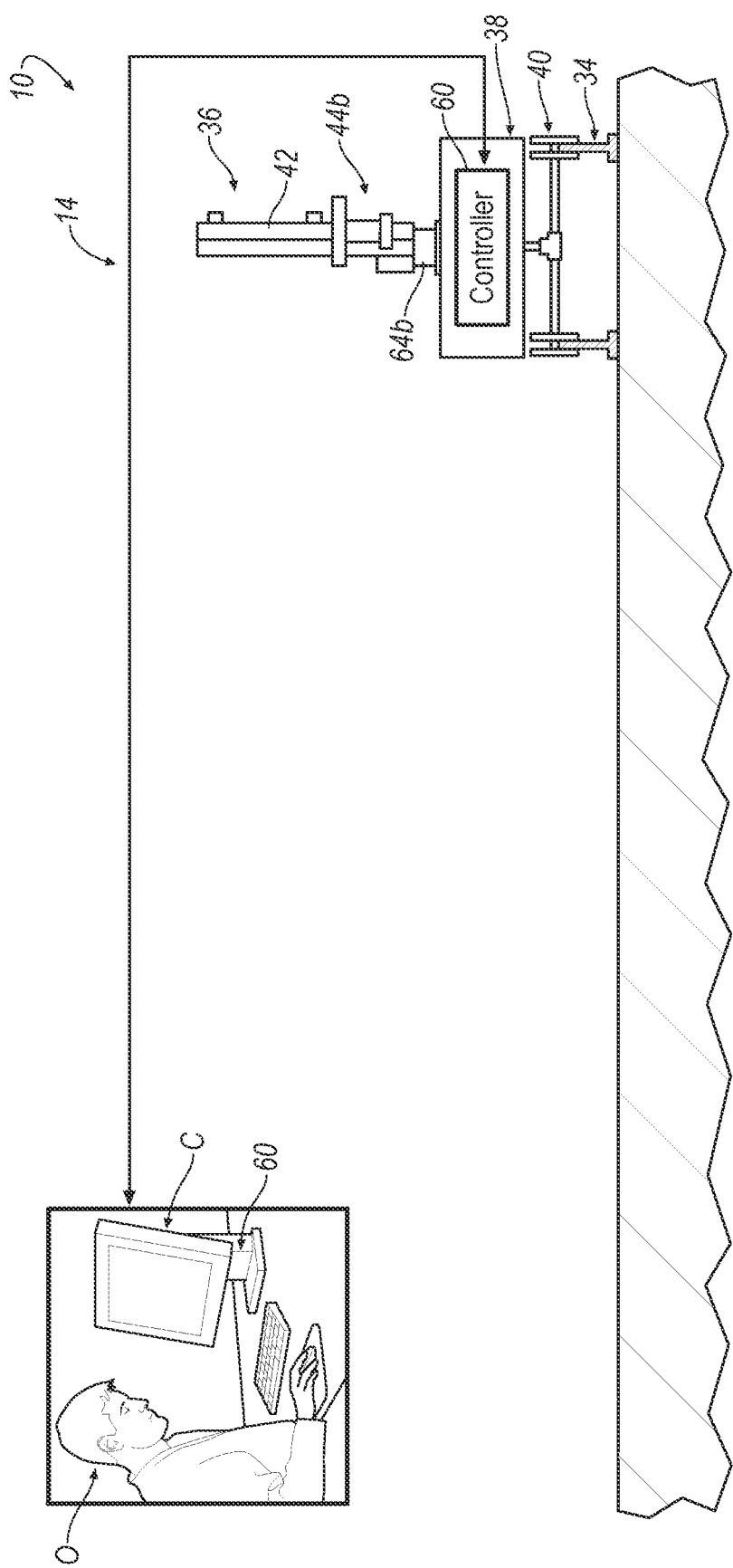
Figure 2J:
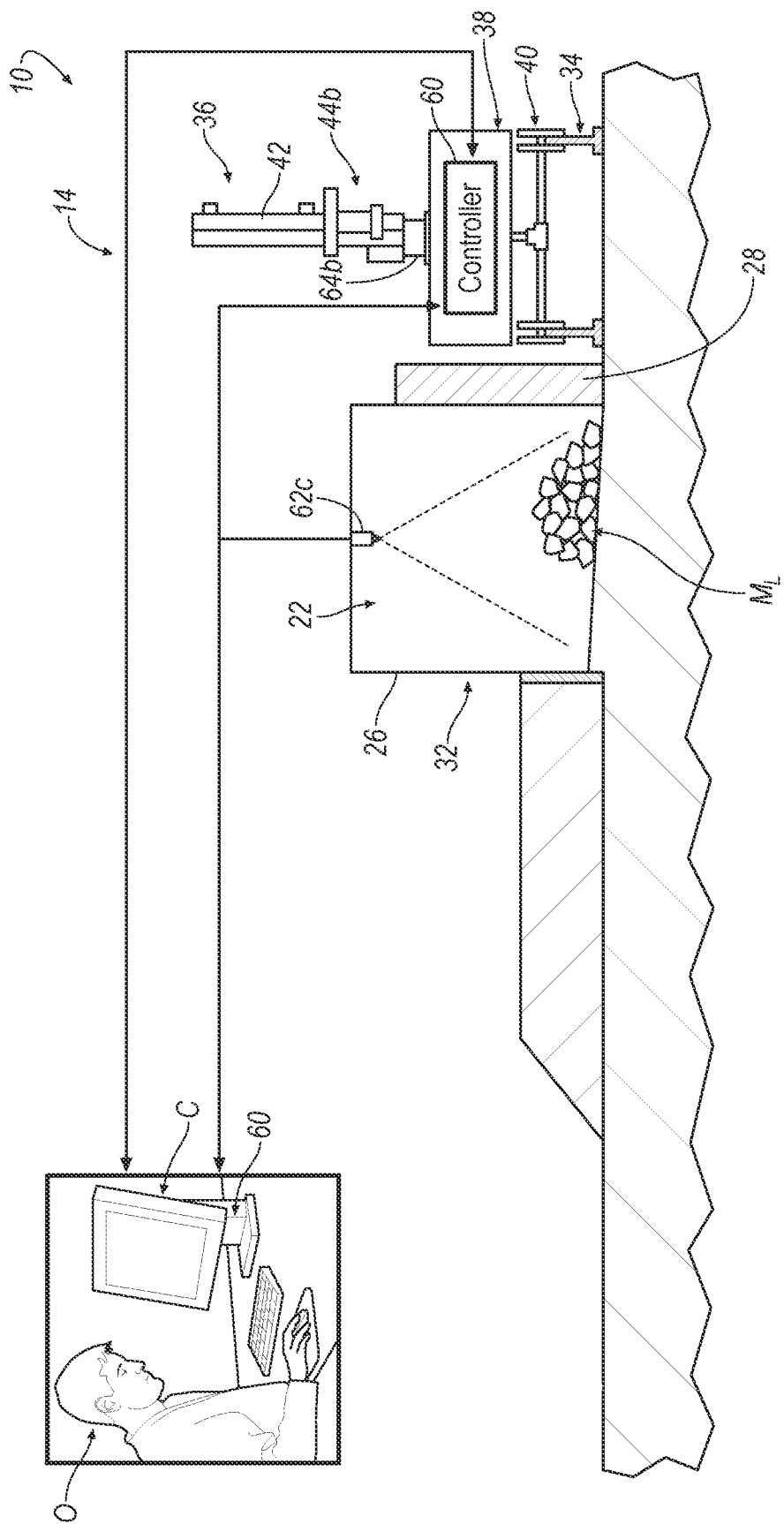
Figure 2K:
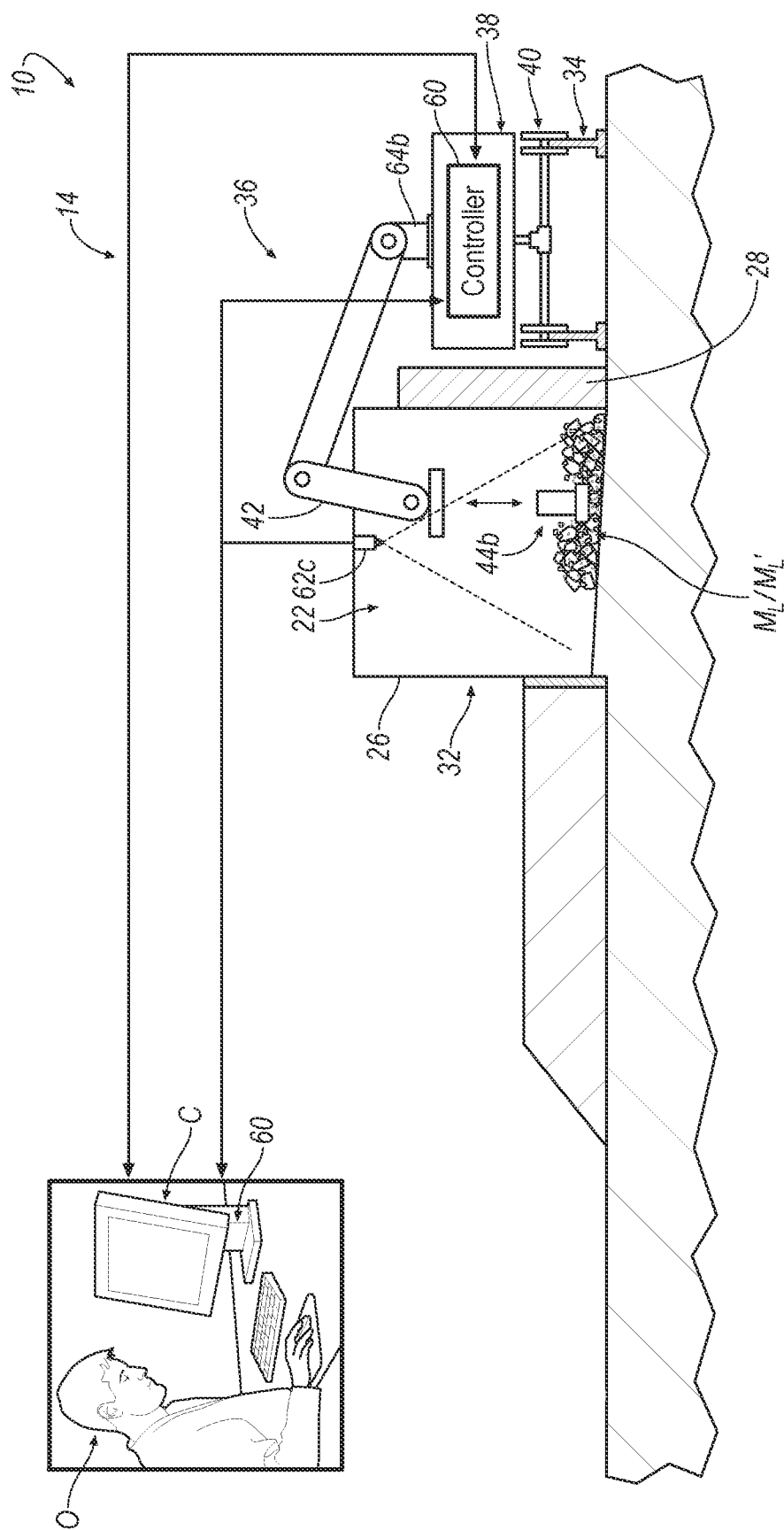
Figure 2L:
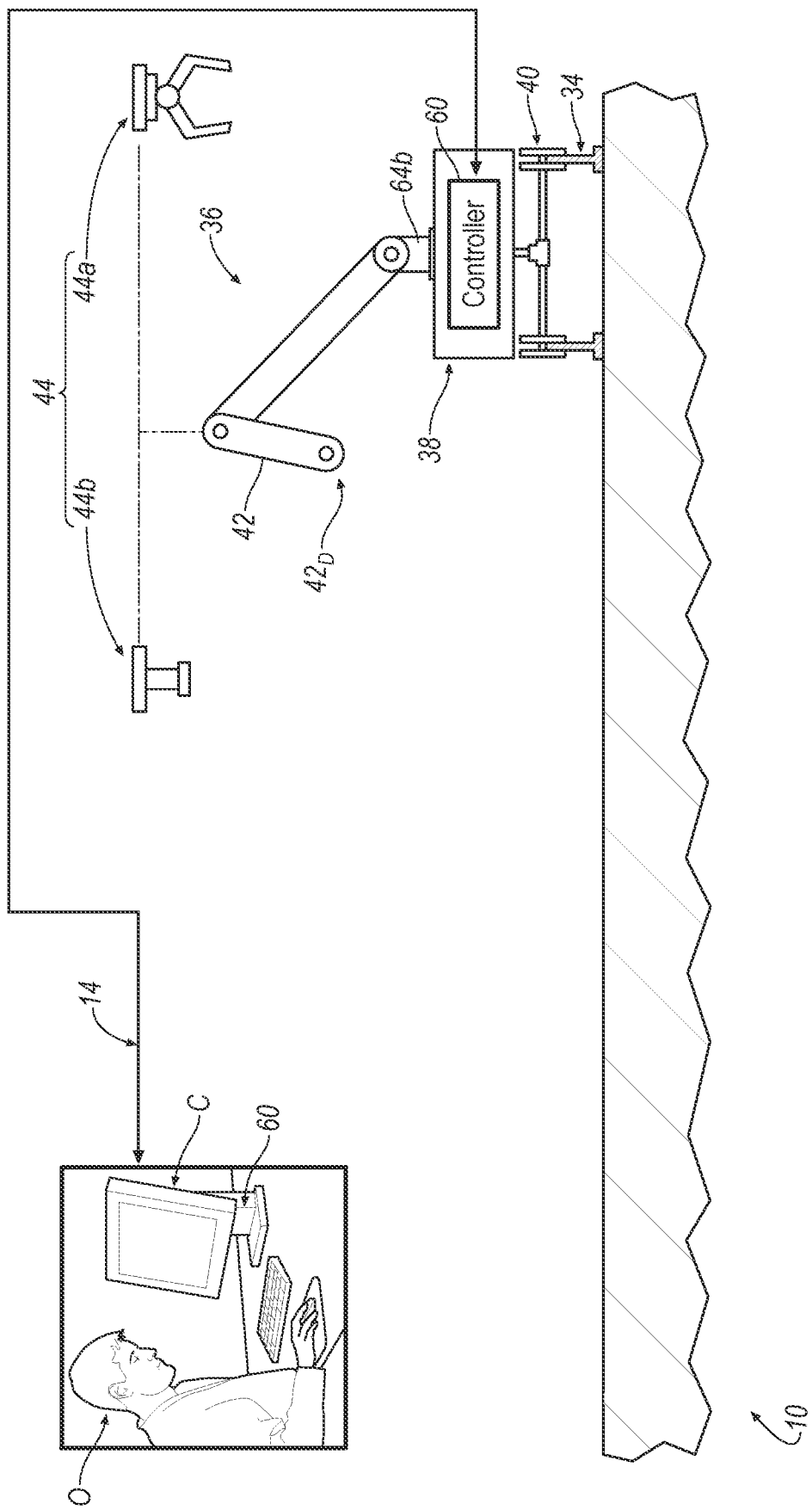
Figure 2M:
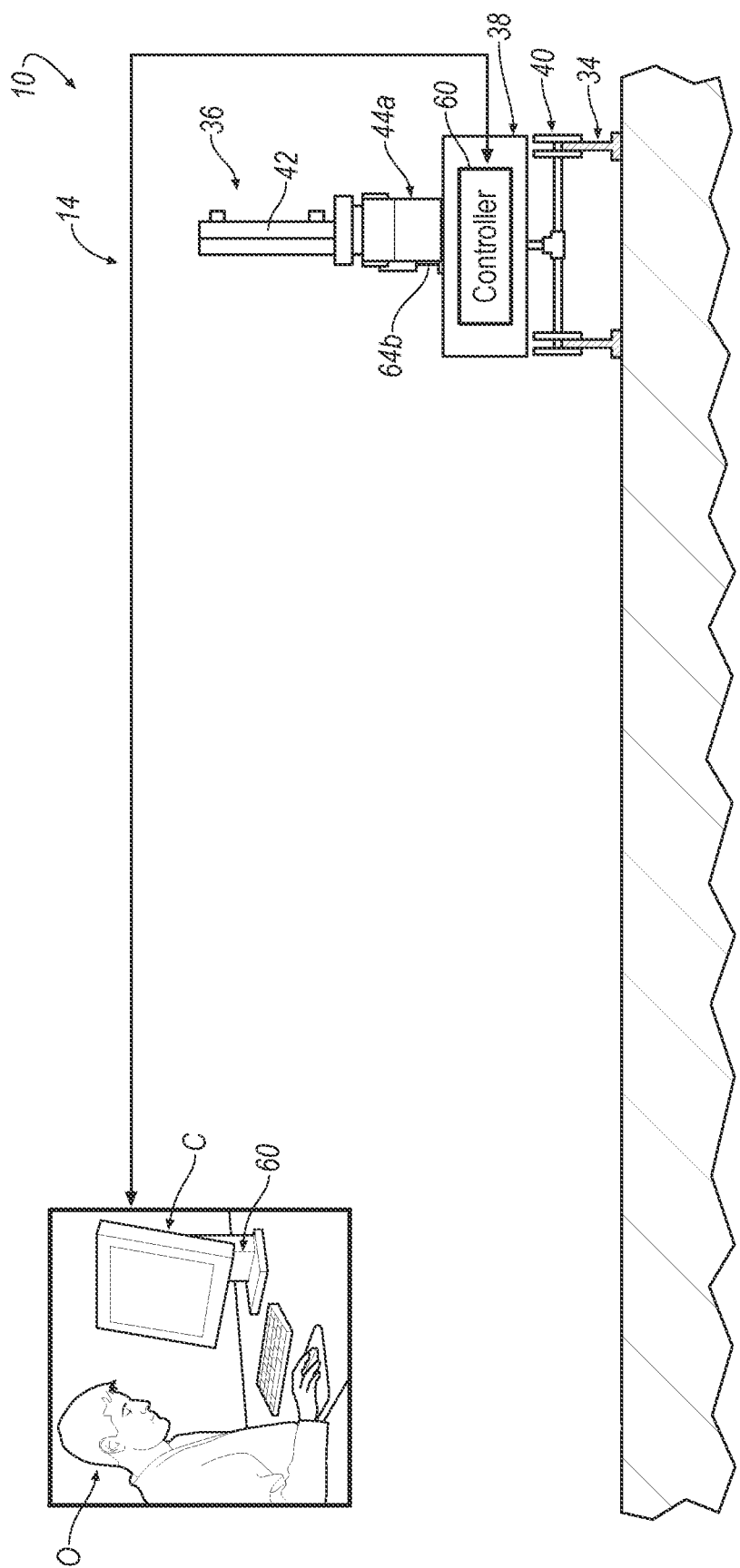
Figure 2N:
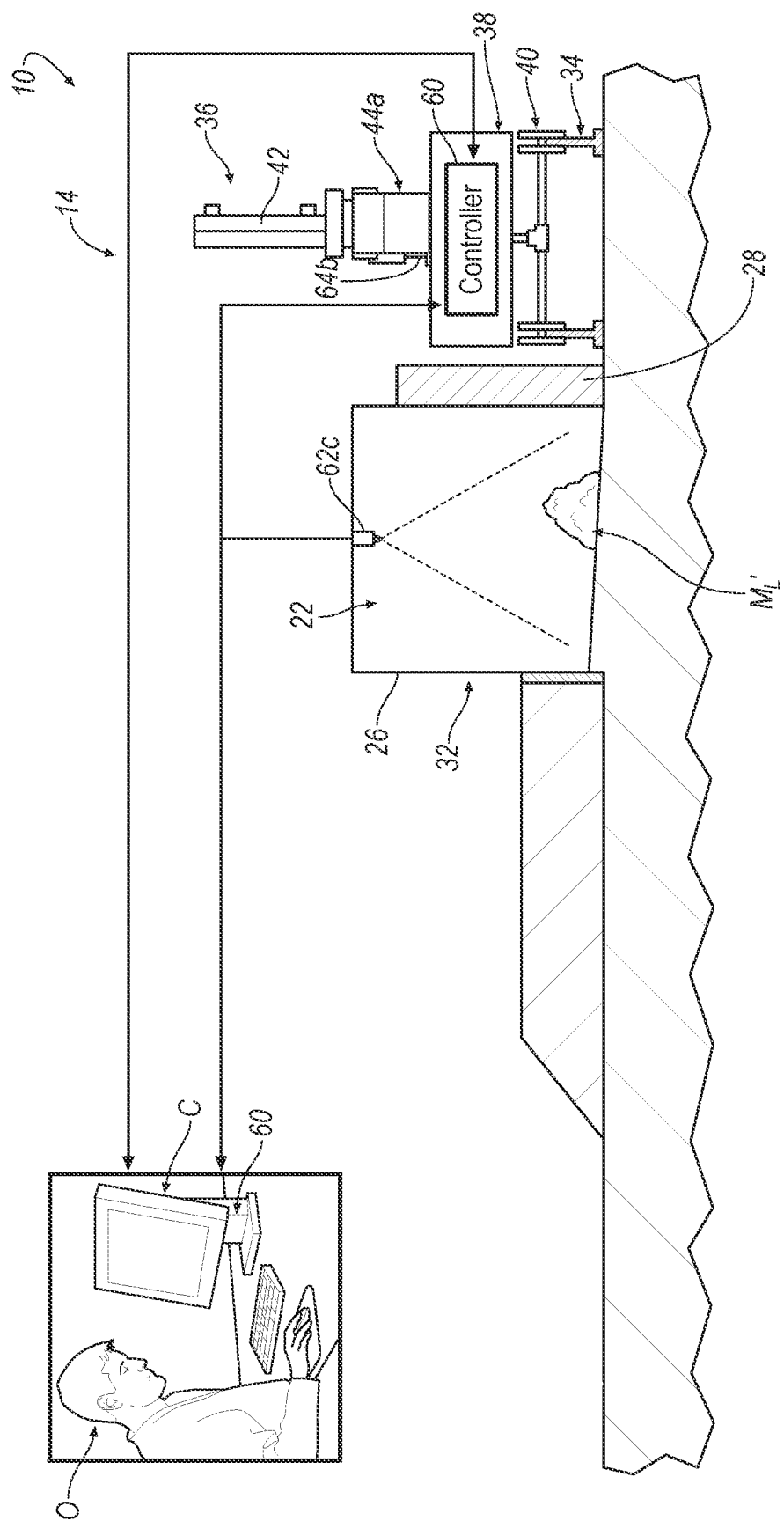
Figure 20:
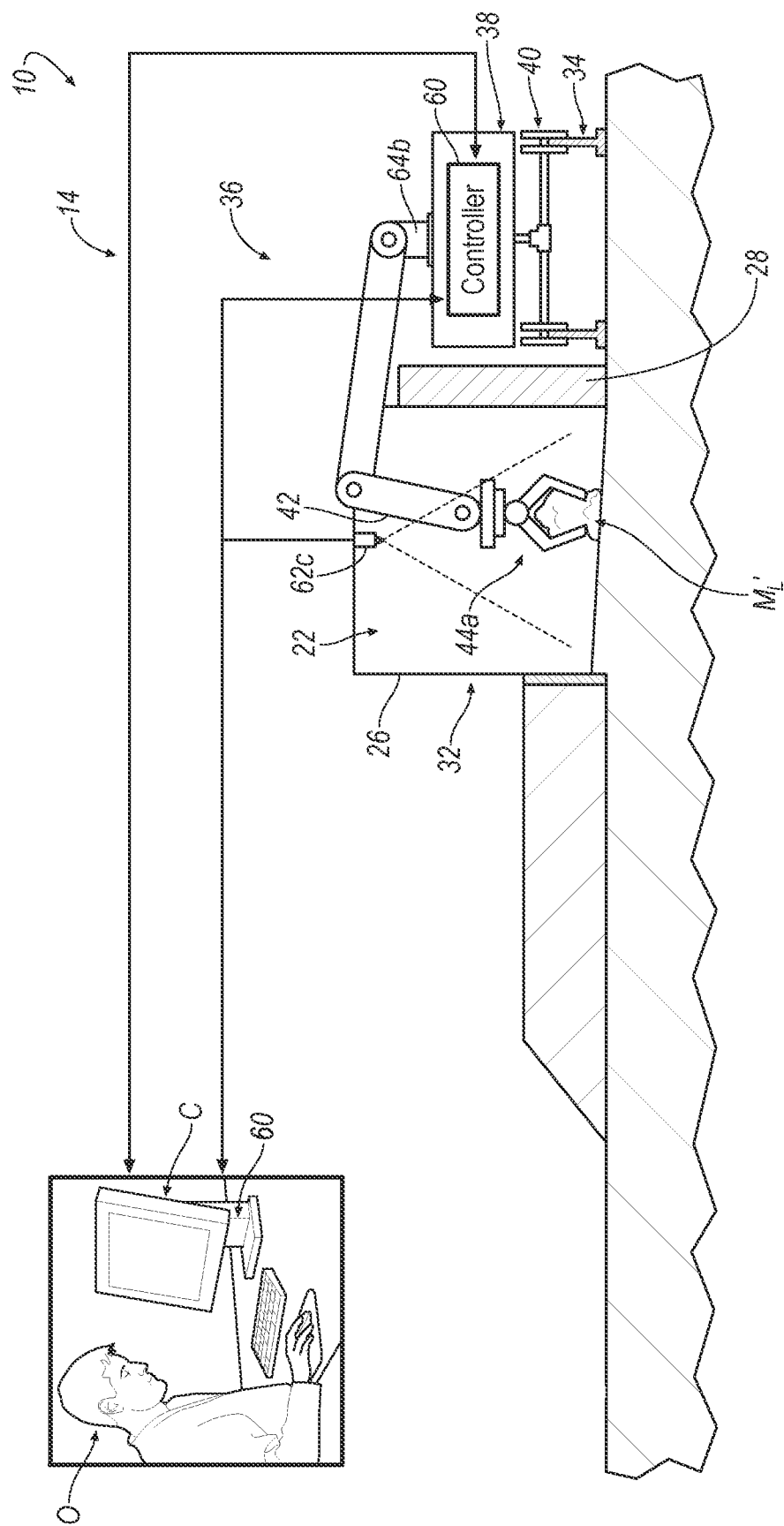
Figure 2P:
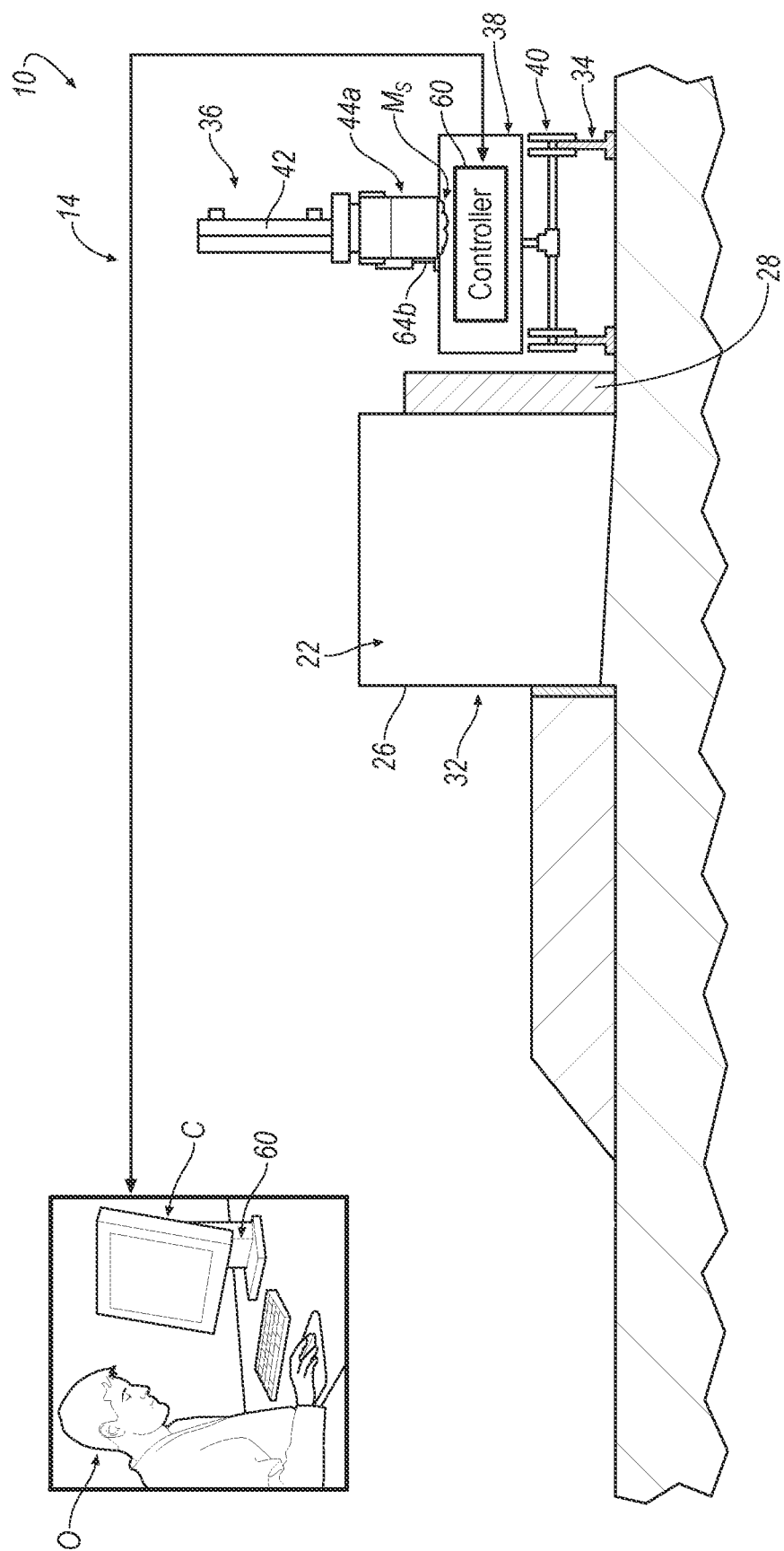

Referring to FIGS. 1G and 2G, in some examples, the method 100 may further include the step of depositing the cooled large material pieces $M_L$ into the one secondary material containing bay 22. In some examples, after aligning $108c_3$ the vehicle 36 with the one secondary material containing bay 22, the controller 60 sends 108d an actuation signal to the electric motor 64b of the vehicle 36 for actuating movement 108e of one or more of the body portion 38, the plurality of wheels 40, the arm portion 42, and the grapple end effector portion 44a of the vehicle 36. The actuated movement 108e of the vehicle 36 results in: arranging $108e_1$ the arm portion 42 of the vehicle 36 over the one secondary material containing bay 22; dropping $108e_2$ the cooled large material pieces $M_L$ into the one secondary material containing bay 22.

Referring to FIGS. 1H-1K and 2H-2K, in some examples, the method 100 may further include the step of processing 110 (see, e.g., FIG. 5E) the cooled large material pieces $M_L$ within the one secondary material containing bay 22 into broken material pieces $M_L'$. In some examples, after dropping $108e_2$ the cooled large material pieces $M_L$ into the one secondary material containing bay 22, the controller 60 sends 110a an actuation signal to the electric motor 64b of the vehicle 36 for actuating movement 110b of one or more of the body portion 38, the plurality of wheels 40, the arm portion 42, and the grapple end effector portion 44a of the vehicle 36. Responsive to the sent 110a actuation signal, the electric motor 64b of the vehicle 36 imparts rotation $110b_1$ to the plurality of wheels 40 for moving $110b_2$ (see, e.g., FIGS. 1H-1I and 2H-2I) the vehicle 36 away from the one secondary material containing bay 22 and toward the unattached drop ball end effector portion 44b. Thereafter, the controller 60 sends 110c an actuation signal to the electric motor 64b of the vehicle 36 for actuating movement 110d of one or more of the body portion 38, the plurality of wheels 40, the arm portion 42, and the grapple end effector portion 44a of the vehicle 36 for detaching $110d_1$ the grapple end effector portion 44a from the arm portion 42 and then subsequently attaching $110d_2$ the drop ball end effector portion 44b to the arm portion 42. Thereafter, the controller 60 sends 110e an actuation signal to the electric motor 64b of the vehicle 36 for actuating movement 110f of one or more of the body portion 38, the plurality of wheels 40, the arm portion 42, and the drop ball end effector portion 44b of the vehicle 36 for imparting rotation to the plurality of wheels 40 for moving the vehicle 36 toward the one secondary material containing bay 22. The actuated movement 110f of the vehicle 36 results in: imparting rotation $110f_1$ of the plurality of wheels 40 of the vehicle 36; aligning $110f_2$ (see, e.g., FIGS. 1J-1K and 2J-2K) the vehicle 36 with the one secondary material containing bay 22; arranging $110f_3$ the arm portion 42 of the vehicle 36 over the one secondary material containing bay 22; and subsequently repeatably engaging $110f_4$ (see, e.g., FIGS. 1O-1P and 2O-2P) the drop ball end effector portion 44b with the cooled large material pieces $M_L$ contained within the one secondary material containing bay 22 for reducing the size 110f5 of the cooled large material pieces $M_L$ into small material pieces defined by the broken material pieces $M_L'$ (see, e.g., FIGS. 1Q and 2Q) such that both of the broken material pieces $M_L'$ and the cooled small material pieces $M_S$ may be defined by substantially similarly sized small material pieces.

The step of repeatably engaging $110f_4$ the drop ball end effector portion 44b with the cooled large material pieces $M_L$ contained within the one secondary material containing bay 22 may occur, in some instances, for a predetermined period of time, or, in other instances, until the cooled large material pieces $M_L$ contained within the one secondary material containing bay 22 are reduced to a size sufficiently small enough to be defined as broken material pieces $M_L'$. In other examples, the step of repeatably engaging $110f_4$ the drop ball end effector portion 44b with the cooled large material pieces $M_L$ contained within the one secondary material containing bay 22 may occur until the controller 60 determines that the cooled large material pieces $M_L$ has been sufficiently reduced in size for defining the small material pieces defined by the broken material pieces $M_L'$; accordingly, in some examples, the controller 60 may send an actuation signal to a material classification locating sensor 62c (e.g., an optical sensor) of the plurality of sensors 62 arranged at least proximate the one secondary material containing bay 22 for scanning 110g one or more large material pieces of material defined by the cooled large material pieces $M_L$ contained within the one secondary material containing bay 22 for determining 110h if the large material pieces of the cooled large material pieces $M_L$ has been sufficiently reduced in size for defining the small material pieces defined by the broken material pieces $M_L'$. The material classification locating sensor 62c may send a detection signal back to the controller 60, and, responsive to receipt of the detection signal, the controller 60 will determine 110h if the large material pieces of the cooled large material pieces $M_L$ has been sufficiently reduced in size for defining the small material pieces defined by the broken material pieces $M_L'$. If the controller 60 determines 110h that the cooled large material pieces $M_L$ have been sufficiently reduced in size for defining the small material pieces defined by the broken material pieces $M_L'$, then the controller 60 sends an actuation signal to the electric motor 64b of the vehicle 36 for ceasing engagement 110i of the drop ball end effector portion 44b of the vehicle 36 with the broken material pieces $M_L'$. However, if the controller 60 determines 110h that the large material pieces of the cooled large material pieces $M_L$ have not been sufficiently reduced in size for defining the small material pieces defined by the broken material pieces $M_L'$, then the step of repeatably engaging 110$f_4$ the drop ball end effector portion 44b with the one or more large material pieces of the cooled large material pieces $M_L$ continues.

Referring to FIGS. 1L-1P and 2L-2P, in some examples, the method 100 may further include the step of removing 112 (see, e.g., FIG. 5F) the broken material pieces $M_L'$ from the one secondary material containing bay 22. In some examples, with reference to FIGS. 1L and 2L, after ceasing engagement 110i of the drop ball end effector portion 44b of the vehicle 36 with the broken material pieces $M_L'$, the controller 60 sends 112a an actuation signal to the electric motor 64b of the vehicle 36 for actuating movement 112b of one or more of the body portion 38, the plurality of wheels 40, the arm portion 42, and the grapple end effector portion 44a of the vehicle 36. Responsive to the sent 112a actuation signal, the electric motor 64b of the vehicle 36 imparts rotation $112b_1$ to the plurality of wheels 40 for moving $112b_2$ the vehicle 36 away from the one secondary material containing bay 22 and toward the unattached grapple end effector portion 44a. Thereafter, further actuating movement of one or more of the body portion 38, the plurality of wheels 40, the arm portion 42, and the drop ball end effector portion 44b of the vehicle 36 includes detaching $112b_3$ the drop ball end effector portion 44b from the arm portion 42 and then subsequently attaching $112b_4$ (see, e.g., FIGS. 1M and 2M) the grapple end effector portion 44a to the arm portion 42. Thereafter, the controller 60 sends 112c an actuation signal to the electric motor 64b of the vehicle 36 for actuating movement 112d of one or more of the body portion 38, the plurality of wheels 40, the arm portion 42, and the grapple end effector portion 44a of the vehicle 36 for imparting rotation $112d_1$ to the plurality of wheels 40 for moving the vehicle 36 toward the one secondary material containing bay 22. The actuated movement 112i of the vehicle 36 results in: aligning $112d_2$ (see, e.g., FIGS. 1N and 2N) the vehicle 36 with the one secondary material containing bay 22; arranging $112d_3$ the arm portion 42 of the vehicle 36 over the one secondary material containing bay 22 and subsequently engaging $112d_4$ (see, e.g., FIGS. 1O and 2O) the grapple effector portion 44a with the broken material pieces $M_L'$; and lifting $112d_5$ (see, e.g., FIGS. 1P and 2P) the broken material pieces $M_L'$ out of the one secondary material containing bay 22.

Figure 2Q:
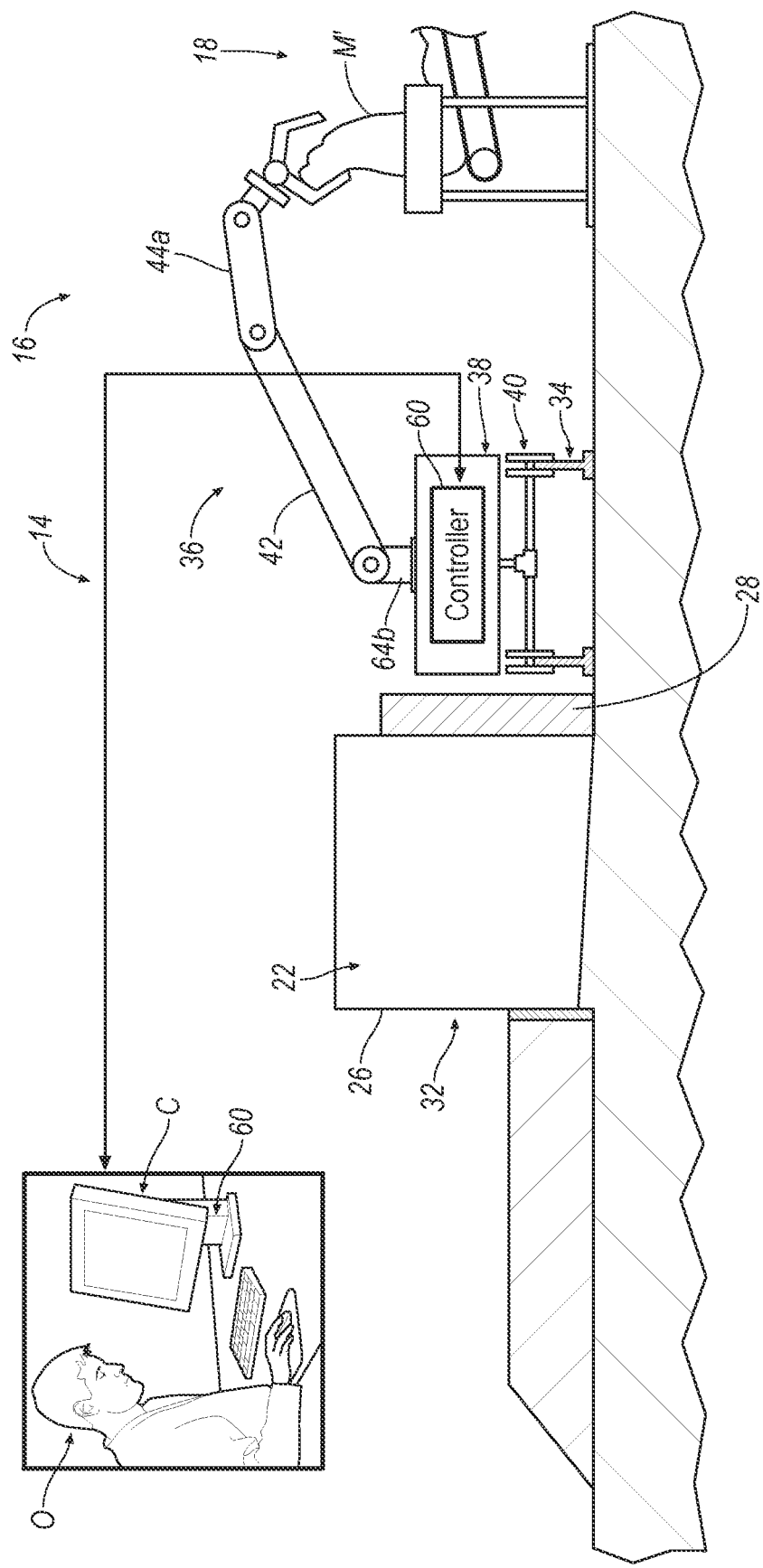
Figure 2R:
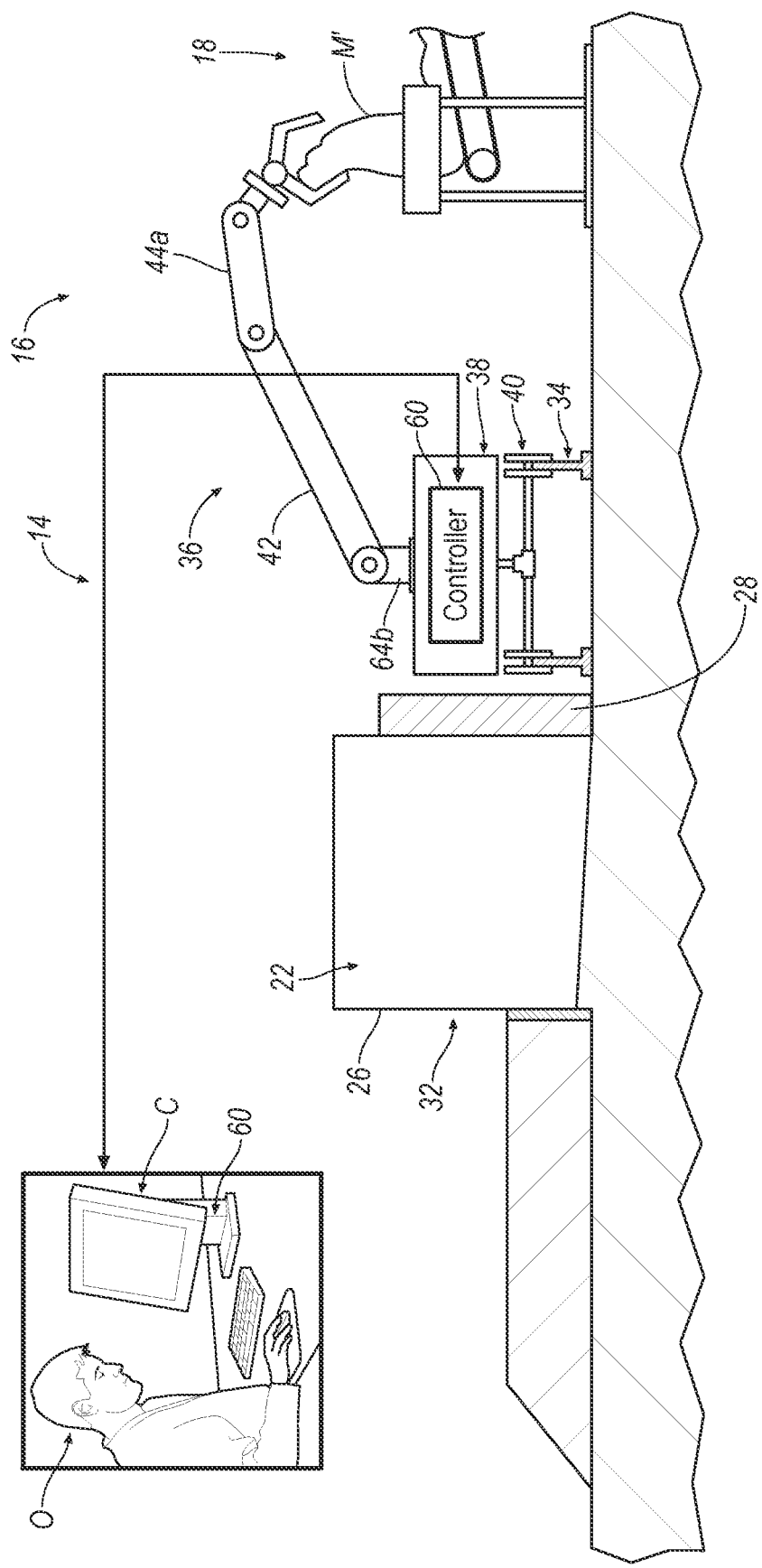
Figure 5G:
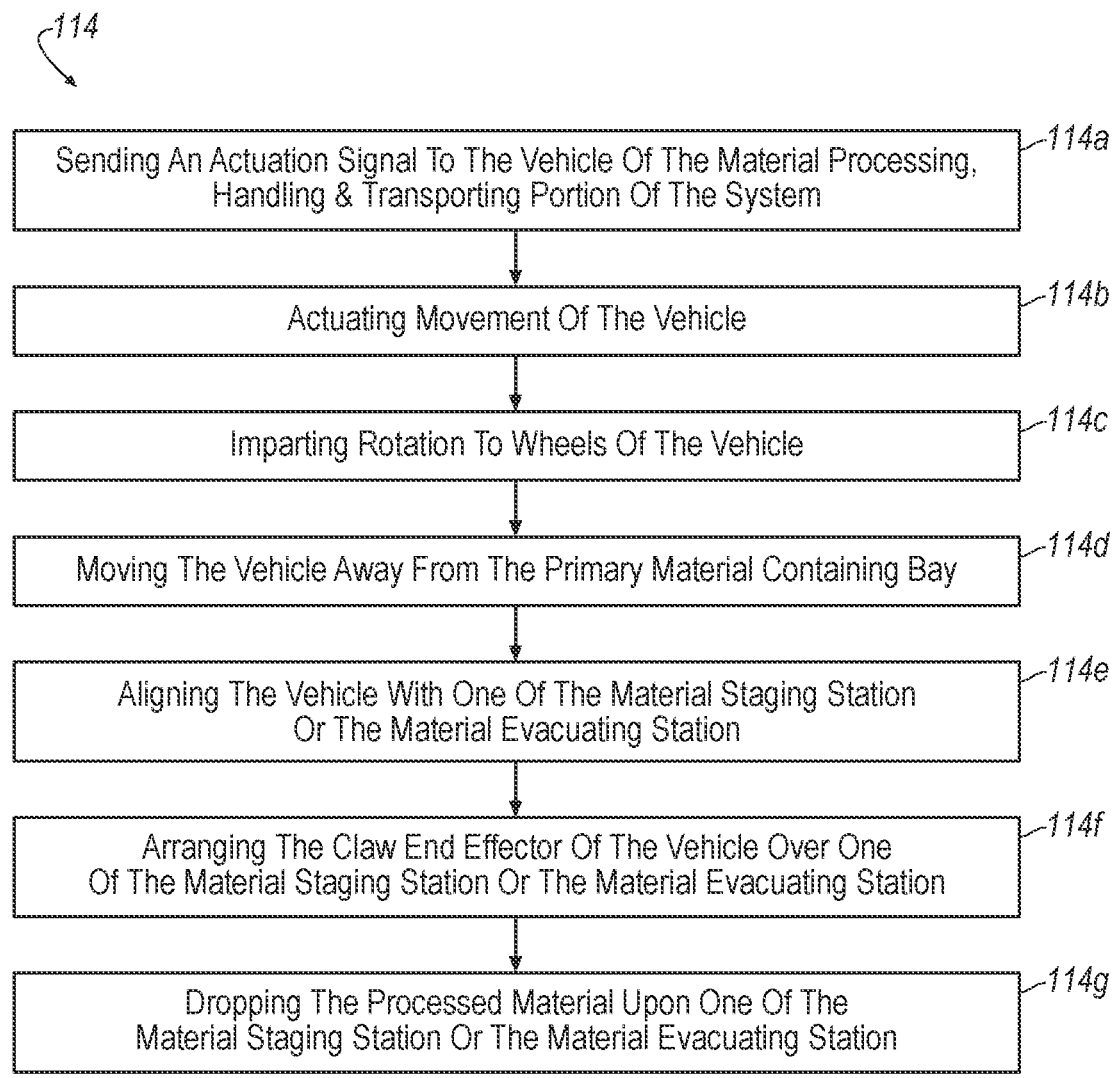

Referring to FIGS. 1Q and 2Q, in some examples, the method 100 may further include the step of transporting one or more of: (1) the second portion of processed material $M_L'$ from the one secondary material containing bay 22; and (2) the cooled small material pieces $M_S$ from the first primary material containing bay 20a. In some examples, after lifting $112d_5$ one or more of: (1) the broken material pieces $M_L'$ out of the one secondary material containing bay 22; and (2) the cooled small material pieces $M_S$ from the first primary material containing bay 20a, the controller 60 sends 114a (see, e.g., FIG. 5G) an actuation signal to the electric motor 64b of the vehicle 36 for actuating movement 114b of one or more of the body portion 38, the plurality of wheels 40, the arm portion 42, and the grapple end effector portion 44a of the vehicle 36. Referring to FIGS. 1Q and 2Q, in some examples, the method 100 may further include transporting 114c, 114d one or both of: (1) the broken material pieces $M_L'$ out of the one secondary material containing bay 22; and (2) the cooled small material pieces $M_S$ from the first primary material containing bay 20a. The actuated movement 114c, 114d of the vehicle 36 further results in: aligning 114e (see, e.g., FIGS. 1W and 4A) the vehicle 36 with one of the material staging station 16 and the material evacuating station 18; arranging 114f the arm portion 42 of the vehicle 36 over one of the material staging station 16 and the material evacuating station 18 and subsequently dropping 114g the processed quantity of material M' defined by cooled and/or processed material $M_S$, $M_L'$ from the claw effector portion 44a and subsequently directly upon the one of the material staging station 16 and the material evacuating station 18.

Figure 5H:
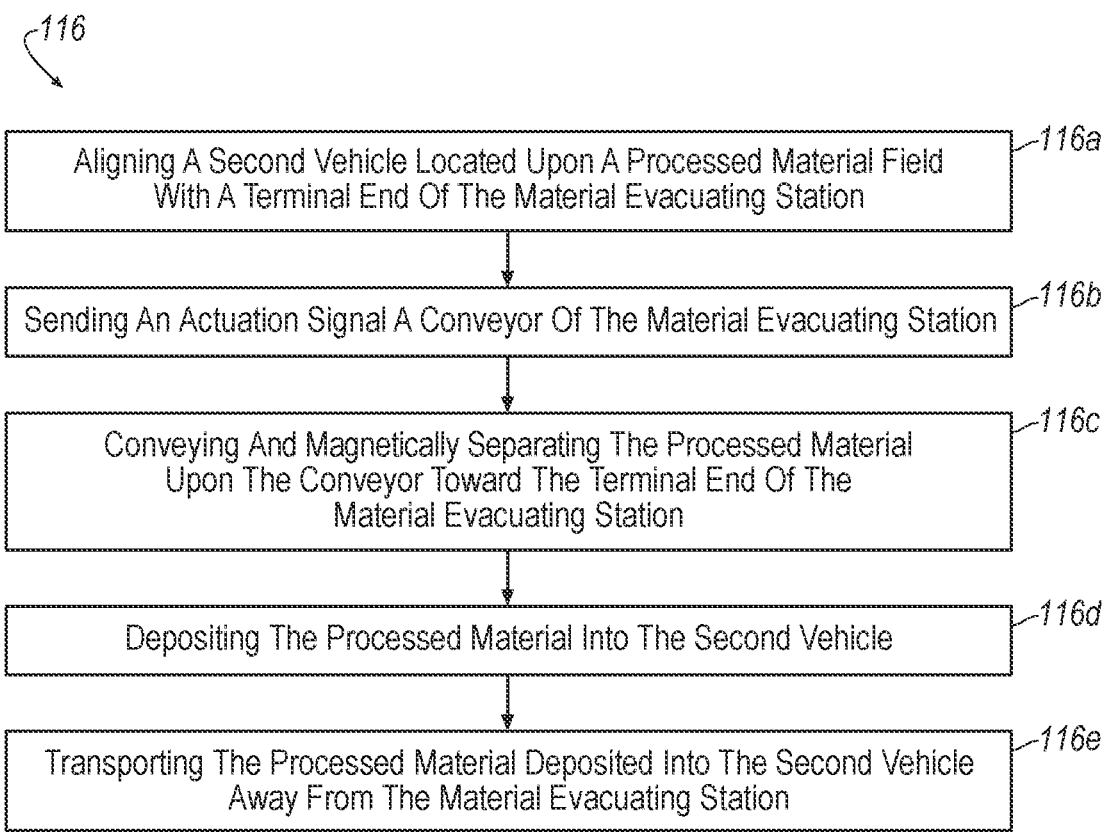

Referring to FIGS. 1Q-1R and 2Q-2R, in some examples, evacuating 116 (see, e.g., FIG. 5H) one or both of: (1) the broken material pieces $M_L'$; and (2) the cooled small material pieces $M_S$ from the material separating/evacuating station 18 may include one or more of the following steps. In some examples, after dropping 114g one or both of: (1) the broken material pieces $M_L'$; and (2) the cooled small material pieces $M_S$ from the grapple effector portion 44a upon the material separating/evacuating station 18, the step of evacuating 116 may firstly include: aligning 116a the second vehicle $V_2$ with a terminal end of the material separating/evacuating station 18. Thereafter, the controller 60 sends 116b an actuation signal to an electric motor 64c of, for example, a conveyor 66 of the material separating/evacuating station 18 for conveying 116c one or both of: (1) the broken material pieces $M_L'$; and (2) the cooled small material pieces $M_S$ toward the terminal end of the material separating/evacuating station 18. As one or both of: (1) the broken material pieces $M_L'$; and (2) the cooled small material pieces $M_S$ is transported along the conveyor 66, pieces of magnetic material $M_M$ may be separated from one or both of: (1) the broken material pieces $M_L'$; and (2) the cooled small material pieces $M_S$; thereafter, a processed quantity of material M' defined by one or both of: (1) the broken material pieces $M_L'$; and (2) the cooled small material pieces $M_S$ has been conveyed 116c to the terminal end of the material separating/evacuating station 18. Subsequently, a front loader $V_2$ may move the processed quantity of material M' to the material staging station 16 or directly deposit the processed quantity of material M' into a dump truck $V_2$. Similarly, the front loader $V_2$ may move the separated pieces of magnetic material $M_M$ into a dump truck $V_2$. Thereafter, the dump truck $V_2$ may transport 116e the processed quantity of material M' away from one or both of the material staging station 16 and the material separating/evacuating station 18 that are located upon the processed material field $F_2$.

Figure 6:
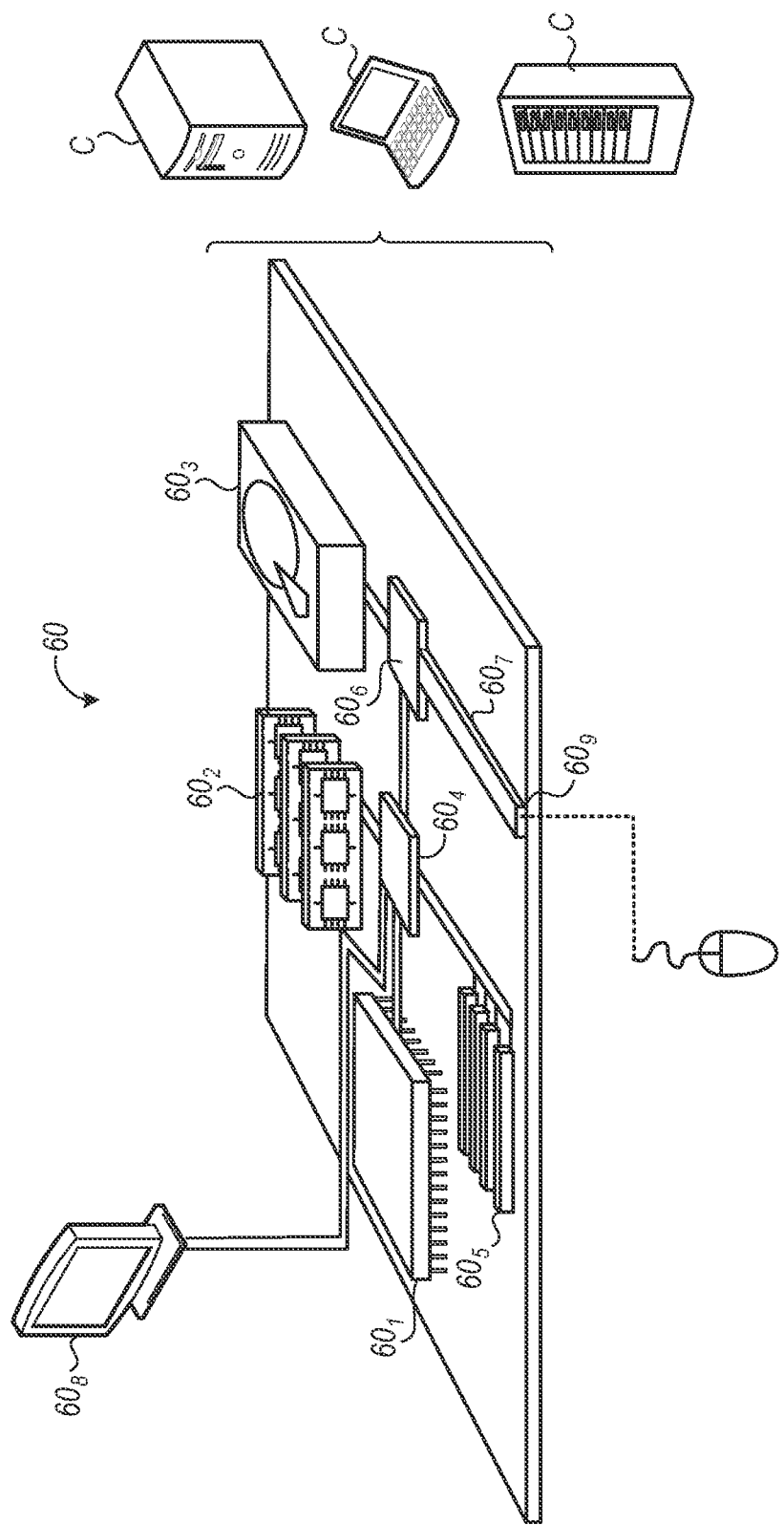
FIG. 6 is a schematic view of an example computing device.

With reference to FIG. 6, the controller 60 corresponds to data processing hardware that may include one or more general purpose processors, digital signal processors, and/or application specific integrated circuits (ASICs). In some implementations, the controller 60 is a purpose-built embedded device configured to perform specific operations with one or more subsystems of the system 10. The memory hardware $60_4$ is in communication with the controller 60 and may include one or more non-transitory computer-readable storage media such as volatile and/or non-volatile storage components. For instance, the memory hardware $60_4$ may be associated with one or more physical devices in communication with one another and may include optical, magnetic, organic, or other types of memory or storage. The memory hardware $60_4$ is configured to, inter alia, to store instructions (e.g., computer-readable program instructions), that when executed by the controller 60, cause the controller 60 to perform numerous operations, such as, any of the method steps described above at FIG. 5. Accordingly, the controller 60 may directly or indirectly interact with any of the plurality of sensors 62 and the plurality of actuators 64 for monitoring and controlling operation of the system 10.

FIG. 6 is schematic view of an example computing device C that may be used to implement the systems and methods described in this document. The computing device C is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device C includes a processor $60_1$ (also referred to as data processing hardware), memory $60_2$ (also referred to as memory hardware), a storage device $60_3$, a high-speed interface/controller $60_4$ connecting to the memory $60_2$ and high-speed expansion ports $60_5$, and a low speed interface/controller $60_6$ connecting to a low speed bus $60_7$ and a storage device $60_3$. Each of the components $60_1$, $60_2$, $60_3$, $60_4$, $60_5$, and $60_6$, are interconnected using various busses, and may be mounted on a common motherboard or in other manners as appropriate. The processor $60_1$ can process instructions for execution within the computing device C, including instructions stored in the memory $60_2$ or on the storage device $60_3$ to display graphical information for a graphical user interface (GUI) on an external input/output device, such as display $60_8$ coupled to high speed interface $60_4$. In other implementations, multiple processors and/or multiple buses may be used, as appropriate, along with multiple memories and types of memory. Also, multiple computing devices C may be connected, with each device providing portions of the necessary operations (e.g., as a server bank, a group of blade servers, or a multi-processor system).

The memory $60_2$ stores information non-transitorily within the computing device C. The memory $60_2$ may be a computer-readable medium, a volatile memory unit(s), or non-volatile memory unit(s). The non-transitory memory $60_2$ may be physical devices used to store programs (e.g., sequences of instructions) or data (e.g., program state information) on a temporary or permanent basis for use by the computing device C. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device $60_3$ is capable of providing mass storage for the computing device C. In some implementations, the storage device $60_3$ is a computer-readable medium. In various different implementations, the storage device $60_3$ may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory $60_2$, the storage device $60_3$, or memory on processor $60_1$.

The high speed controller $60_4$ manages bandwidth-intensive operations for the computing device C, while the low speed controller $60_6$ manages lower bandwidth-intensive operations. Such allocation of duties is exemplary only. In some implementations, the high-speed controller $60_4$ is coupled to the memory $60_2$, the display $60_8$ (e.g., through a graphics processor or accelerator), and to the high-speed expansion ports $60_5$, which may accept various expansion cards (not shown). In some implementations, the low-speed controller $60_6$ is coupled to the storage device $60_3$ and a low-speed expansion port $60_9$. The low-speed expansion port $60_9$, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device C may be implemented in a number of different forms, as shown in the figure. For example, it may be implemented as a standard server C or multiple times in a group of such servers C, as a laptop computer C, or as part of a rack server system C.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

As noted above, each of the embodiments described in the detailed description above may include any of the features, options, and possibilities set out in the present disclosure figures, including those under the other independent embodiments, and may also include any combination of any of the features, options, and possibilities set out in the present disclosure and figures. Further examples consistent with the present teachings described herein are set out in the following numbered clauses:

Clause 1: A system comprising: at least one rail that divides a field into an unprocessed material field and a processed material field; a vehicle movably-supported upon the at least one rail; and at least two material containing bays defined by: at least one primary material containing bay configured for receiving a quantity of unprocessed material; and a secondary material containing bay configured for receiving a portion of one or more of a first portion of processed material and a portion of partially processed material from the at least one primary material containing bay, wherein the vehicle is configured for movement upon the at least one rail for: transporting the portion of partially processed material from the at least one primary material containing bay to the secondary material containing bay; depositing into and then processing the portion of partially processed material within the secondary material containing bay for defining a portion of processed material; and depositing one or more of the first portion of processed material and the portion of processed material into a material separating or evacuating station.

Clause 2: The system of clause 1, wherein the at least two material containing bays at least partially define a material processing station of the system.

Clause 3: The system of any of clauses 1 or 2, wherein the at least one rail and the vehicle at least partially define a material handling portion of the system.

Clause 4: The system of clause 3, wherein the system further comprises: a material staging station that is configured for receiving one or more of the first portion of processed material and the portion of processed material after being processed by the material separating or evacuating station.

Clause 5: The system of any of clauses 1 through 4, wherein the vehicle includes an arm portion extending from a body portion supported by one or more wheels arranged upon the at least one rail, wherein the arm portion is configured for removable attachment of at least two end effector portions of a plurality of end effector portions.

Clause 6: The system of clause 5, wherein the at least two end effector portions include two or more: a grapple end effector portion that is configured for lifting, retaining, or releasing one or more of the first portion of processed material, the partially processed material, and the portion of processed material; and a drop ball end effector portion that is configured for breaking or reducing a size of the portion of partially processed material within the secondary material containing bay for defining the portion of processed material.

Clause 7: The system of any of clauses 1 through 6 further comprising: a sprinkler system supported by or arranged near the at least one primary material containing bay that is configured for spraying water upon the quantity of unprocessed material for cooling the quantity of unprocessed material.

Clause 8: The system of clause 7, further comprising: a water source pipe fluidly connected to the sprinkler system.

Clause 9: The system of any of clauses 1 through 8, further comprising: a controller communicatively coupled to the vehicle for controlling movement of the vehicle.

Clause 10: The system of clause 9, further comprising: at least one sensor communicatively-coupled to the controller.

Clause 11: The system of clause 10, wherein the at least one sensor includes a material height sensor arranged at least near or supported by the at least one primary material containing bay that is communicatively-coupled to the controller for detecting that the at least one primary material containing bay has been filled with a predetermined amount of the quantity of unprocessed material.

Clause 12: The system of any of clauses 10 through 11, wherein the at least one sensor includes a material classification locating sensor arranged at least near or supported by the at least one primary material containing bay that is communicatively-coupled to the controller.

Clause 13: The system of any of clauses 10 through 12, wherein the at least one sensor includes a material classification locating sensor arranged at least near or supported by the secondary material containing bay that is communicatively-coupled to the controller.

Clause 14: The system of any of clauses 10 through 13, wherein the at least one sensor includes an atmospheric temperature sensor arranged at least near or supported by the at least one primary material containing bay that is communicatively-coupled to the controller.

Clause 15: The system of clause 14, wherein the atmospheric temperature sensor arranged outside of the at least one primary material containing bay.

Clause 16: The system of any of clauses 10 through 15, further comprising a valve arranged at least near or supported by the at least one primary material containing bay that is communicatively-coupled to the controller, wherein the valve is connected to a sprinkler system supported by or arranged near the at least one primary material containing bay, wherein the controller is configured to open of close the valve for spraying water upon the quantity of unprocessed material.

Clause 17: The system of any of clauses 10 through 16, further comprising an electric motor of the vehicle that is communicatively-coupled to the controller that operates the motor for controlling movement of the vehicle.

Clause 18: A method for operating a system arranged on a field, the method comprising: arranging at least one rail upon the field for dividing the field into an unprocessed material field and a processed material field; movably-supporting a vehicle upon the at least one rail; receiving a quantity of unprocessed material within at least one primary material containing bay; cooling the quantity of unprocessed material within the at least one primary material containing bay; digging the quantity of unprocessed material within the at least one primary material containing bay; utilizing the vehicle for transporting one or more of a first portion of processed material and a cooled portion of partially processed material from the at least one primary material containing bay to a secondary material containing bay and depositing one or more of the first portion of processed material and the cooled portion of partially processed material into the secondary material containing bay; processing one or more of the first portion of processed material and the cooled portion of partially processed material within the secondary material containing bay for defining a processed material; utilizing the vehicle for transporting one or more of the first portion of processed material and the processed material from the secondary material containing bay and toward a material separating or evacuating station; and depositing one or more of the first portion of processed material and the processed material into the material separating or evacuating station.

Clause 19: The method of clause 18, wherein processing the cooled portion of partially processed material within the secondary material containing bay includes: reducing a size of the cooled portion of partially processed material for forming the processed material.

Clause 20: The method of any of clauses 18 through 19, wherein cooling the unprocessed material includes: atmospherically cooling the unprocessed material.

Clause 21: The method of any of clauses 18 through 20, wherein cooling the unprocessed material includes: quenching the unprocessed material with water.

Clause 22: The method of any of clauses 18 through 21, wherein cooling the unprocessed material includes a combination of: atmospherically cooling the unprocessed material; and quenching the unprocessed material with water.

Clause 23: The method of any of clauses 18 through 22 further comprising: utilizing the vehicle for removing the first portion of processed material from the at least one primary material containing bay; and transporting the first portion of processed material and from the at least one primary material containing bay to one or more of: a material staging station; and a material separating or evacuating station; and depositing the first portion of processed material and upon one or more of: the material staging station; and the material separating or evacuating station.

Clause 24: The method of clause 23 further comprising: evacuating one or more of the first portion of processed material and the processed material from the material separating or evacuating station.

Clause 25: The method of any of clauses 23 through 24 further comprising: utilizing the vehicle for removing one or more of the first portion of processed material and the processed material from the material staging station; and transporting one or more of the first portion of processed material and the processed material from the material staging station to the material separating or evacuating station.

Clause 26: The method of clause 25 further comprising: evacuating one or more of the first portion of processed material and the processed material from the material separating or evacuating station.

A number of implementations have been described. Nevertheless, it will be understood that various modifications may be made without departing from the spirit and scope of the disclosure. Accordingly, other implementations are within the scope of the following claims.

What is claimed is:

1. A material processing system comprising: at least one rail that divides a field into an unprocessed material field and a processed material field; a vehicle movably-supported upon the at least one rail, wherein the vehicle includes an arm portion extending from a body portion supported by one or more wheels arranged upon the at least one rail; and at least two material containing bays including: at least one primary material containing bay configured for receiving a quantity of unprocessed material; and a secondary material containing bay configured for receiving one or more of a first portion of processed material and a partially processed material from the at least one primary material containing bay; wherein the vehicle body portion and the arm portion are configured for: transporting the partially processed material from the at least one primary material containing bay to the secondary material containing bay;
- depositing partially processed material into the secondary material containing bays;
- processing the partially processed material within the secondary material containing bay for defining a second portion of processed material; and depositing one or more of the first portion of processed material and the second portion of processed material into a material separating or evacuating station.

2. The material processing system of claim 1, wherein the at least two material containing bays at least partially define a material processing station of the material processing system.

3. The material processing system of claim 1, wherein the at least one rail and the vehicle at least partially define a material handling portion of the material processing system.

4. The material processing system of claim 3, further comprising:
- a material staging station that is configured for receiving one or more of the first portion of processed material and the second portion of processed material after being processed by the material separating or evacuating station.

5. The material processing system of claim 1, wherein the arm portion is configured for removable attachment of at least two end effector portions of a plurality of end effector portions.

6. The material processing system of claim 5, wherein the at least two end effector portions include:
- a grapple end effector portion that is configured for lifting, retaining, or releasing one or more of the first portion of processed material, the partially processed material, and the second portion of processed material; and
- a drop ball end effector portion that is configured for processing the partially processed material within the secondary material containing bay for defining the second portion of processed material by breaking or reducing a size of the partially processed material.

7. The material processing system of claim 1, further comprising:
- a sprinkler system supported by or arranged near the at least one primary material containing bay that is configured for spraying water upon the quantity of unprocessed material for cooling the quantity of unprocessed material.

8. The material processing system of claim 1 further comprising:
- a controller communicatively coupled to the vehicle for controlling movement of the vehicle.

9. The material processing system of claim 8 further comprising:
- at least one sensor communicatively-coupled to the controller.

10. The material processing system of claim 9, wherein the at least one sensor includes a material height sensor arranged at least near or supported by the at least one primary material containing bay that is communicatively-coupled to the controller for detecting that the at least one primary material containing bay has been filled with a predetermined amount of the quantity of unprocessed material.

11. The material processing system of claim 9, wherein the at least one sensor includes a material classification locating sensor arranged at least near or supported by the at least one primary material containing bay that is communicatively-coupled to the controller.

12. The material processing system of claim 9, wherein the at least one sensor includes a material classification locating sensor arranged at least near or supported by the secondary material containing bay that is communicatively-coupled to the controller.

13. The material processing system of claim 9, wherein the at least one sensor includes an atmospheric temperature sensor arranged at least near or supported by the at least one primary material containing bay that is communicatively-coupled to the controller.

14. The material processing system of claim 9, further comprising a valve arranged at least near or supported by the at least one primary material containing bay that is communicatively-coupled to the controller, wherein the valve is connected to a sprinkler system supported by or arranged near the at least one primary material containing bay, wherein the controller is configured to open of close the valve for spraying water upon the quantity of unprocessed material.

15. The material processing system of claim 9, further comprising an electric motor of the vehicle that is communicatively-coupled to the controller that operates the motor for controlling movement of the vehicle.

\* \* \* \* \*